United States Patent
Inoue

(10) Patent No.: US 9,722,768 B2
(45) Date of Patent: Aug. 1, 2017

(54) RECEIVED SIGNAL PROCESSING DEVICE, COMMUNICATION SYSTEM, AND RECEIVED SIGNAL PROCESSING METHOD

(71) Applicant: National Institute of Advanced Industrial Science and Technology, Tokyo (JP)

(72) Inventor: Takashi Inoue, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 15/034,282

(22) PCT Filed: Nov. 13, 2014

(86) PCT No.: PCT/JP2014/080074
§ 371 (c)(1),
(2) Date: Jul. 14, 2016

(87) PCT Pub. No.: WO2015/072515
PCT Pub. Date: May 21, 2015

(65) Prior Publication Data
US 2016/0323091 A1 Nov. 3, 2016

(30) Foreign Application Priority Data

Nov. 15, 2013 (JP) .................................. 2013-236486
Dec. 19, 2013 (JP) .................................. 2013-263120

(51) Int. Cl.
*H04L 27/06* (2006.01)
*H04L 7/00* (2006.01)
(Continued)

(52) U.S. Cl.
CPC ....... *H04L 7/0016* (2013.01); *H04B 10/6164* (2013.01); *H04B 10/6165* (2013.01); *H04L 7/0079* (2013.01); *H04L 27/38* (2013.01)

(58) Field of Classification Search
CPC ..... H04L 7/0016; H04L 7/0079; H04L 27/38; H04B 10/6164; H04B 10/6165
(Continued)

(56) References Cited

U.S. PATENT DOCUMENTS 4,587,498 A * 5/1986 Bonnerot ............ H04L 27/3818
375/326
5,970,093 A * 10/1999 de Lantremange ... H04L 7/0029
375/232
(Continued)

FOREIGN PATENT DOCUMENTS

WO 2006/049628 5/2006

OTHER PUBLICATIONS

Viterbi et al., "Nonlinear Estimation of PSK-Modulated Carrier Phase with Application to Burst Digital Transmission," IEEE Transactions of Information Theory, vol. IT-29, No. 4, pp. 543-551 (Jul. 1983).
(Continued)

*Primary Examiner* — Helene Tayong
(74) *Attorney, Agent, or Firm* — Carmody Torrance Sandak & Hennessey LLP

(57) ABSTRACT

A carrier recovery unit is provided including: separation-and-output section that outputs separated symbol group formed into block; a priori state-estimation section that obtains a priori estimate acquired by estimating values processed this time from among values of intra-block frequency and central phase processed last time; provisional compensation section that provisionally compensates the phase of each separated symbol based on the a priori
(Continued)

estimation phase; decision section that performs decision based on the reference signal for the symbol before decision, and obtains symbol after decision; error-estimation section that calculates the frequency and phase errors; a posteriori state-estimation section that obtains a posteriori estimate based on the frequency and phase errors; actual compensation section that actually compensates the phase based on the a posteriori estimation phase; and feedback processing section that feeds back the a posteriori estimate as the values processed last time to the a priori state estimation section.

17 Claims, 44 Drawing Sheets

(51) Int. Cl.
*H04L 27/38* (2006.01)
*H04B 10/61* (2013.01)

(58) Field of Classification Search
USPC .......................................................... 375/341
See application file for complete search history.

(56) References Cited

U.S. PATENT DOCUMENTS 6,560,294 B1 5/2003 Gatherer
2012/0299629 A1 11/2012 Ogasahara

OTHER PUBLICATIONS

Shayan et al., "All Digital Phase-Locked Loop: Concepts, Design and Applications," IEEE Proceedings, vol. 136, LT. F (Radar and Signal Processing), No. 1, pp. 53-56 (Feb. 1989).
Pfau et al., "Hardware-Efficient Coherent Digital Receiver Concept with Feedforward Carrier Recovery for M-QAM Constellations," Journal of Lightwave Technology, vol. 27, No. 8, pp. 989-999 (Apr. 2009).

* cited by examiner $\zeta$: Damping factor (0.707), $\omega_n$: Natural frequency (Cutoff factor)
$T_s$: Sampling time period

RECEIVED SIGNAL PROCESSING DEVICE, COMMUNICATION SYSTEM, AND RECEIVED SIGNAL PROCESSING METHOD

TECHNICAL FIELD

The present invention relates to a received signal processing device and a received signal processing method that compensate the carrier frequency offset and phase offset of a modulated signal received. The present invention also relates to a received signal processing device that performs decision based on a reference signal updated according to a digitally modulated signal received, a communication system that includes the received signal processing device, and a received signal processing method.

BACKGROUND ART

For the sake of largely increasing the capacity of optical communication, transceiver systems that adopt multi-level modulation schemes have become increasingly widely available. More specifically, a scheme that is polarization-multiplexed QPSK (quadrature phase shift keying) or QAM (quadrature amplitude modulation) has been adopted or being discussed. Since the optical phase of signals in these schemes have been modulated, coherent reception that utilizes interference with light emitted from a local oscillator (LO) embedded in a receiver is required to perform the demodulation.

A laser diode (LD) used as a signal source and the local oscillator has oscillatory frequencies stabilized to some extent. However, the frequencies fluctuate independently of each other. A received signal acquired by making signal light interfere with light emitted from the local oscillator thus has $\exp[i2\pi f_o t]$, which is a phase modulation component corresponding to the difference between these oscillatory frequencies. Here, t is time, $f_o$ is $f_o=f_s-f_{LO}$, and $f_s$ and $f_{LO}$ denote the oscillatory frequencies of the signal light and LO, respectively. Furthermore, $f_o$ is called a carrier frequency offset, and has a value randomly varying according to the frequency fluctuation of each laser.

A process of compensating the phase component (carrier phase offset) fluctuating owing to the random carrier frequency offset $f_o$ and only picking out the phase modulation component that the transmission signal originally has is called carrier recovery. The carrier recovery is a necessary process in order to demodulate a signal modulated according to the QPSK or QAM formats.

As a method used as means for carrier recovery in recent years, a method has been known that causes an optical detector to receive the in-phase component and quadrature phase component of an optical signal respectively and converts the acquired analog electric signal into a digital signal through AD conversion, and subsequently performs a digital signal processing. Meanwhile, at the receiver, various processes including a carrier recovery process are performed through various types of digital signal processing.

As a carrier recovery method based on the digital signal processing, means has been known that, in the case where the received signal is QPSK, calculates the M-th power of the complex amplitude of the received signal to remove phase information on an M-ary PSK signal, and subsequently calculates the 1/M-th power of the multiplied amplitude to obtain the phase error, and subtracts the phase error from the phase of the signal, thus achieving carrier recovery (see NPL 1). However, this means is applicable to the M-ary PSK whose amplitude has not been modulated (QPSK in the case of M=4), but it is difficult to apply this means to a QAM signal.

As a carrier recovery method in the case where the received signal is a QAM signal, means for performing carrier recovery using a Phase Locked Loop (PLL) digital circuit has been known (see NPL 2). The operation principle of the PLL necessarily requires a feedback process for each received symbol. In this respect, in wireless communication or the like, the symbol rate is, for example, on the order of megahertz, and the feedback process for each received symbol can be performed using a digital signal processor (DSP) that operates at a clock frequency higher than the symbol rate. However, in optical communication, the symbol rate reaches, for example, several tens of gigahertz. Since there is not any DSP as described above operating at a clock frequency higher than the symbol rate, the current technology has a problem in that carrier recovery of performing the feedback process for each received symbol cannot be performed. The optical communication causes necessity of performing circuit design for executing serial-to-parallel converting of the string of received symbols for the DSP and applying a parallel process to a converted signal. Thus, use of the PLL for the carrier recovery process causes difficulty also in a principle aspect.

As another carrier recovery method in the case where the received signal is a QAM signal, the following method has been known (see NPL 3). First, the string of received symbols having been temporally sequentially input is serial-to-parallel converted. In this process, received symbols arranged in parallel each include temporally disposed sequential symbols, and are processed. Next, the symbols to be processed in parallel are regarded as targets. Carrier recovery is attempted for these symbols using multiple phase compensation candidate values. Decision on the received symbols is performed for each attempted result. The symbols are integrated, and the phase compensation candidate value with the minimum decision error is adopted. Phase compensation for the symbols is thus performed. However, this method assumes that the frequency difference $f_o$ between the symbol and the local oscillator is approximately zero, and this assumption thus causes difficulty of causing a large error in carrier recovery and the like in the case of a frequency difference where $f_o$ is large to some extent (e.g., several hundred megahertz or more).

When the carrier recovery method in the case where the received signals are QAM signals is used, the carrier recovery is typically performed with the phase error after decision being adopted as the error signal. However, since a QAM modulation scheme with a large number of modulation levels, such as 64QAM, has a small code distance, the scheme is prone to cause a decision error, and the accuracy of the error signal falls. Consequently, the carrier recovery cannot be performed in some cases. Furthermore, in the case where additive white Gaussian noise (AWGN) is added, the expected value of noise amplitude added to every symbol is the same. Meanwhile, the smaller the amplitude of the symbol, the larger the actual phase error that occurs for noise with a certain amplitude is. Consequently, the carrier recovery based on the phase error is difficult.

Another method of compensating the carrier frequency offset through certain means and subsequently compensating the carrier phase offset through other means has also known. The method has, however, problems in that the circuit size is large, and the carrier frequency offset residual error degrades the carrier phase offset compensation.

In the case of demodulating a polarization-multiplexed QPSK signal or QAM signal, for the sake of polarization separation, an adaptive equalizer including a finite impulse response (FIR) filter with a 2×2 butterfly configuration is used. Furthermore, for the sake of carrier recovery, feedforward digital signal processing such as a method of performing compensation by calculating the fourth power of the received complex amplitude and then calculating the one-fourth power thereof to derive the phase error (see NPL 1) or a method of performing blind phase estimation (see NPL 3), or a feedback digital signal processing using a phase locked loop (NPL 2) is performed.

A decision-directed algorithm is used for an equalization process through the adaptive equalizer, and a method of accurately performing the carrier recovery. A signal processing method using this algorithm is a method that performs decision for the received symbol, acquires the difference between an estimated transmission symbol and the received symbol before decision and adopts the difference as the error signal, and processes the received signal so as to minimize the expected value of the error with respect to the error signal. For the carrier recovery, a decision-directed section of calculating the amount of phase correction is used (e.g., see NPL 3).

The decision on the received symbol selects, from among the reference signals, a symbol having the shortest Euclidean distance with the received symbol on the complex plane using the reference signal including all the possible complex amplitude values that are of the received symbol, and adopts the selected symbol as a decision result.

Such a method is described, exemplifying a signal process applied to the QAM signal. An ideal state of the QAM is a state where the possible complex amplitude values are arranged in a rectangular grid pattern on the complex plane at regular intervals. When the waveform of the transmission signal is in such an ideal state, the reference signal in the ideal state is considered and decision is made. That is, an ideal state of the reference signal is decided according to the digital modulation scheme used, and decision based on the reference signal is made. FIGS. 13A to 13C show ideal arrangements of complex amplitude points (constellation) of the QAM signals. FIG. 13A illustrates a case of 4QAM (QPSK). FIG. 13B illustrates a case of 16QAM. FIG. 13C illustrates a case of 64QAM.

However, in a case where the QAM signal is not ideal owing to any reason, such as a case where a signal generator including a modulator has a malfunction, a distortion occurs in the constellation of the QAM signal. FIGS. 14A to 14C show the constellations of the 16QAM signals where distortions occur. FIG. 14A illustrates a case of an error with the quadrature component having a smaller amplitude than the in-phase component. FIG. 14B illustrates a case of an error where the angle between the in-phase component and the quadrature component deviates from 90 degrees. FIG. 14C illustrates a case of having both the errors shown in FIGS. 14A and 14B.

When the equalization process and the process of calculating the amount of phase correction which are based on the decision-directed algorithm are performed on the receiving side in a situation where the distortion described above occurs on the transmission side, use of the constellation in the ideal state shown in any of FIGS. 13A to 13C as the reference signal for decision causes a problem in that decision errors frequently occur even in a case where the received signal includes a low noise power, the processing operations of the adaptive equalizer and the section of calculating the amount of phase correction become unstable, and the signal quality is degraded.

CITATION LIST

Non-Patent Literature

NPL 1: A. J. Viterbi et al., "Nonlinear estimation of PSK-modulated carrier phase with application to burst digital transmission," IEEE Trans. Inf. Theory, Vol. IT-29, No. 4, pp. 543-551, (1983).

NPL 2: Y. R. Shayan et al., "All digital phase-locked loop: concepts, design and applications," IEE Proceedings, Vol. 136, Pt. F (Radar and Signal Processing), No. 1, pp. 53-56 (1989).

NPL 3: T. Pfau et al., "Hardware-efficient coherent digital receiver concept with feedforward carrier recovery for M-QAM constellations," J. Lightwave Technol., Vol. 27, No. 8, pp. 989-999 (2009).

SUMMARY OF INVENTION

Technical Problem

The present invention is made to solve the above problems in the related art and achieve the following objects. That is, the present invention has objects to provide a received signal processing device and a received signal processing method that can be applied to optical communication with a high symbol rate and achieve accurate carrier recovery even for a multi-level signal, such as QAM signal.

Furthermore, the present invention secondarily has objects to provide a received signal processing device, a communication system and a received signal processing method that normally operate a decision-directed adaptive equalizer and carrier recovery unit even when the transmission signal has a distortion, and can receive the signal without degrading the signal quality.

Solution to Problem

Means for solving the problems are as follows. That is,

<1> A received signal processing device that regards, as one process, phase compensation for one separated symbol group acquired by separating every certain number of symbols of a modulated received signal and making the symbols form a block, and sequentially performs the process multiple times according to the number of the separated symbol group, the device including: a carrier recovery unit that includes: a separation and output section that temporally separates the symbols input into the block in a constant time interval, for every constant number of symbols to obtain the separated symbol group, and outputs the group in a sequence of the separated symbols constituting the separated symbol group; an a priori state estimation section that obtains an intra-block a priori estimation frequency and an intra-block a priori estimation central phase, as a priori estimates that are estimates of values processed this time, from values processed last time of one intra-block frequency determined based on phase variation of each of the separated symbols with respect to time, and one intra-block central phase determined as a temporal center of each phase of each of the separated symbols; a provisional compensation section that calculates an a priori estimation phase of each of the separated symbols from the a priori estimate, and provisionally compensates the phase of each of the separated symbols based on the a priori estimation phase; a decision section that regards, as a symbol before decision, each of the separated symbols whose phase has been provisionally compensated, performs decision for the symbol before decision based on the reference signal set according to a modulation scheme of the received signal, and obtains a symbol after decision that coincides with a reference point of the reference signal; an error estimation section that calculates a frequency error between an observed value of the intra-block frequency and the intra-block a priori estimation frequency which are determined based on the symbol before decision and the symbol after decision, and calculates a phase error between an observed value of the intra-block central phase and the intra-block a priori estimation central phase which are determined based on the symbol before decision and the symbol after decision; an a posteriori state estimation section that corrects the a priori estimates based on the frequency error and the phase error, and obtains an intra-block a posteriori estimation frequency and an intra-block a posteriori estimation central phase as a posteriori estimates obtained by estimating most likely values processed this time that are of the intra-block frequency and the intra-block central phase; an actual compensation section that calculates an a posteriori estimation phase of each of the separated symbols from the a posteriori estimate, and actually compensates the phase of each of the separated symbols based on the a posteriori estimation phase; and a feedback processing section that performs a feedback process so that the a priori state estimation section can adopt the a posteriori estimates as the values processed last time of the intra-block frequency and the intra-block central phase, and obtains the a priori estimates for the separated symbol group in the next phase compensation.

<2> The received signal processing device according to <1>, wherein the number of symbols of the separated symbol group obtained in the separation and output section is 2 to 1,024.

<3> The received signal processing device according to <1> or <2>, wherein the error estimation section calculates the frequency error and the phase error through maximum likelihood estimation.

<4> The received signal processing device according to any one of <1> to <3>, wherein the a posteriori state estimation section includes a Kalman filter that outputs the a posteriori state vector as the a posteriori estimate and the a posteriori error covariance matrix where the a priori estimate and the value of the a priori error covariance matrix have been corrected, based on an input of the a priori error covariance matrix for controlling the frequency error, the phase error, the a priori state vector as the a priori estimate, and the gain, and the feedback processing section performs the feedback process so as to input the a posteriori estimate and the a posteriori error covariance matrix into the a priori state estimation section to allow the a priori state estimation section to output, to the Kalman filter, these items as the a priori estimate and the a priori error covariance matrix for the next phase compensation.

<5> A received signal processing method that regards, as one process, phase compensation for one separated symbol group acquired by separating every certain number of symbols of a modulated received signal and making the symbols form a block, and sequentially performs the process multiple times according to the number of the separated symbol group, the method including: separating and outputting of temporally separating symbols input into the block in a constant time interval, for every constant number of the symbols to obtain the separated symbol group, and outputting the group in a sequence of the separated symbols constituting the separated symbol group; a priori state estimating of obtaining an intra-block a priori estimation frequency and an intra-block a priori estimation central phase, as a priori estimates that are estimates of values processed this time, from values processed last time of one intra-block frequency determined based on phase variation of each of the separated symbols with respect to time, and one intra-block central phase determined as a temporal center of each phase of each of the separated symbols; provisional compensation of calculating an a priori estimation phase of each of the separated symbols from the a priori estimate, and provisionally compensating the phase of each of the separated symbols based on the a priori estimation phase; decision of regarding, as a symbol before decision, each of the separated symbols whose phase has been provisionally compensated, performing decision for the symbol before decision based on the reference signal set according to a modulation scheme of the received signal, and obtaining a symbol after decision that coincides with a reference point of the reference signal; an error estimation of calculating a frequency error between an observed value of the intra-block frequency and the intra-block a priori estimation frequency which are determined based on the symbol before decision and the symbol after decision, and calculating a phase error between an observed value of the intra-block central phase and the intra-block a priori estimation central phase which are determined based on the symbol before decision and the symbol after decision; a posteriori state estimating of correcting the a priori estimates based on the frequency error and the phase error, and obtaining an intra-block a posteriori estimation frequency and an intra-block a posteriori estimation central phase as a posteriori estimates obtained by estimating most likely values processed this time that are of the intra-block frequency and the intra-block central phase; actual compensating of calculating an a posteriori estimation phase of each of the separated symbols from the a posteriori estimate, and actually compensating the phase of each of the separated symbols based on the a posteriori estimation phase; and feedback processing of performing a feedback process so that the a priori state estimating can adopt the a posteriori estimates as the values processed last time of the intra-block frequency and the intra-block central phase, and obtaining the a priori estimates for the separated symbol group in the next phase compensation.

<6> The received signal processing method according to <5>, wherein the number of symbols of the separated symbol group obtained in the separating and outputting is 2 to 1,024.

<7> The received signal processing method according to <5> or <6>, wherein the error estimating calculates the frequency error and the phase error through maximum likelihood estimation.

<8> The received signal processing method according to any one of <5> to <7>, wherein the a posteriori state estimating is executed by a Kalman filter that outputs the a posteriori state vector as the a posteriori estimate and the a posteriori error covariance matrix where the a priori estimate and the value of the a priori error covariance matrix have been corrected, based on an input of the a priori error covariance matrix for controlling the frequency error, the phase error, the a priori state vector as the a priori estimate, and the gain, and the feedback processing performs the feedback process so as to provide the a posteriori estimate and the a posteriori error covariance matrix for an execution section for the a priori state estimating to allow the a priori state estimating to provide the Kalman filter with these items as the a priori estimate and the a priori error covariance matrix for the next phase compensation.

<9> The received signal processing device according to any one of <1> to <4>, further including an actual decision section that includes: a decision element that decides a reference point having a shortest Euclidean distance on a complex plane among multiple reference points constituting a reference signal determined according to a modulation scheme for digital modulation with respect to one received symbol of a digitally modulated received signal output from the carrier recovery unit; and a reference signal update section that corrects a position of the decided reference point so as to approach a position of the received symbol, based on a following expression [1], and updates the reference point of the reference signal used in the decision element to the corrected reference point, $$r_{n+1} = r_n + \mu(x_n - r_n) \quad [1]$$

where in the expression [1], n denotes the number of updating the reference point, $r_n$ denotes a two-dimensional vector representing the position of the reference point on the complex plane subjected to an n-th updating, $x_n$ denotes a two-dimensional vector representing the position of the received symbol on the complex plane subjected to the n-th updating, $\mu$ represents an infinitesimal numerical value that is $10^{-10}$ or more and 0.1 or less, and $r_{n+1}$ denotes a two-dimensional vector representing the position of the corrected reference point on the complex plane.

<10> The received signal processing device according to <9>, further including a section of calculating the amount of phase correction that adopts, as a control signal, the phase difference between the received signal and the decision signal that is a decision result of the decision element based on the reference signal updated by the reference signal update section with respect to the received signal, and calculates the amount of phase correction according to the phase variation of the received signal occurring owing to the fluctuation of the frequency difference between the carrier frequency and the local oscillatory frequency.

<11> The received signal processing device according to <9> or <10>, further including an adaptive equalizer that adopts, as the error signal, the difference between the received signal whose noise component has been filtered out according to a tap coefficient and the decision signal that is a decision result of the decision element based on the reference signal updated by the reference signal update section with respect to the received signal, controls the tap coefficient so that the error signal can have a minimum intensity, and performs the equalization process for the subsequent received signal.

<12> The received signal processing device according to <11>, wherein the adaptive equalizer includes a polarization separation processing section that applies a polarization separation process to a polarization-multiplexed received signal.

<13> A communication system including: a receiver that includes the received signal processing device according to any one of <9> to <12>; a transmitter that transmits a transmission signal to the receiver; and a transmission path for transmitting the transmission signal transmitted from the transmitter, to the receiver, wherein the transmitter adopts, as the distortion of the transmission signal, information based on the difference between the received signal received by the receiver and the decision signal as the decision result by the decision element based on the reference signal updated by the reference signal update section, and performs a feedback process to achieve the state with no distortion.

<14> The received signal processing method according to any one of <5> to <8>, further including: actual deciding of deciding a reference point having a shortest Euclidean distance on a complex plane among multiple reference points constituting a reference signal determined according to a modulation scheme for digital modulation with respect to one received symbol of a digitally modulated received signal with an actually compensated phase; and reference signal updating of correcting a position of the decided reference point so as to approach a position of the received symbol, based on a following expression [1], and updates the reference point of the reference signal used in the actual deciding to the corrected reference point, $$r_{n+1} = r_n + \mu(x_n - r_n) \quad [1]$$

wherein in the expression [1], n denotes the number of updating the reference point, $r_n$ denotes a two-dimensional vector representing the position of the reference point on the complex plane subjected to the n-th updating, $x_n$ denotes a two-dimensional vector representing the position of the received symbol on the complex plane subjected to the n-th updating, $\mu$ represents an infinitesimal numerical value that is $10^{-10}$ or more and 0.1 or less, and $r_{n+1}$ denotes a two-dimensional vector representing the position of the corrected reference point on the complex plane.

<15> The received signal processing method according to <14>, further including calculating of the amount of phase correction that adopts, as a control signal, the phase difference between the received signal and the decision signal that is a decision result of the actual deciding based on the reference signal updated by the reference signal updating with respect to the received signal, and calculates the amount of phase correction according to the phase variation of the received signal occurring owing to the fluctuation of the frequency difference between the carrier frequency and the local oscillatory frequency.

<16> The received signal processing method according to <14> or <15>, further including adaptive equalizing of adopting, as the error signal, the difference between the received signal whose noise component has been filtered out according to a tap coefficient and the decision signal that is a decision result of the actual deciding based on the reference signal updated by the reference signal updating with respect to the received signal, controlling the tap coefficient so that the error signal can have a minimum intensity, and performing the equalization process for the subsequent received signal.

<17> The received signal processing method according to <16>, wherein the adaptive equalizing includes polarization separation processing of applying a polarization separation process to a polarization-multiplexed received signal.

Advantageous Effects of Invention

The present invention can provide a received signal processing device and a received signal processing method that can solve the above problems in the related art, be applied to optical communication with a high symbol rate and achieve accurate carrier recovery even for a multi-level signal, such as a QAM signal.

Secondarily, the present invention can provide a received signal processing device, a communication system and a received signal processing method that normally operate the decision-directed adaptive equalizer and section of calculating the amount of phase correction even when the transmission signal has a distortion, and can receive the signal without degrading the signal quality.

DESCRIPTION OF EMBODIMENTS (Received Signal Processing Device)

A received signal processing device of the present invention is a received signal processing device that regards, as one process, phase compensation for one separated symbol group acquired by separating every certain number of symbols of a modulated received signal and making the symbols form a block, and sequentially performs the process multiple times according to the number of the separated symbol group, the device including a carrier recovery unit that includes a separation and output section, an a priori state estimation section, a provisional compensation section, a decision section, an error estimation section, an a posteriori state estimation section, an actual compensation section, and a feedback processing section.

The configurations and signal processing of the sections of the received signal processing device are hereinafter described with reference to the drawings.

<Basic Configuration>

Figure 1:
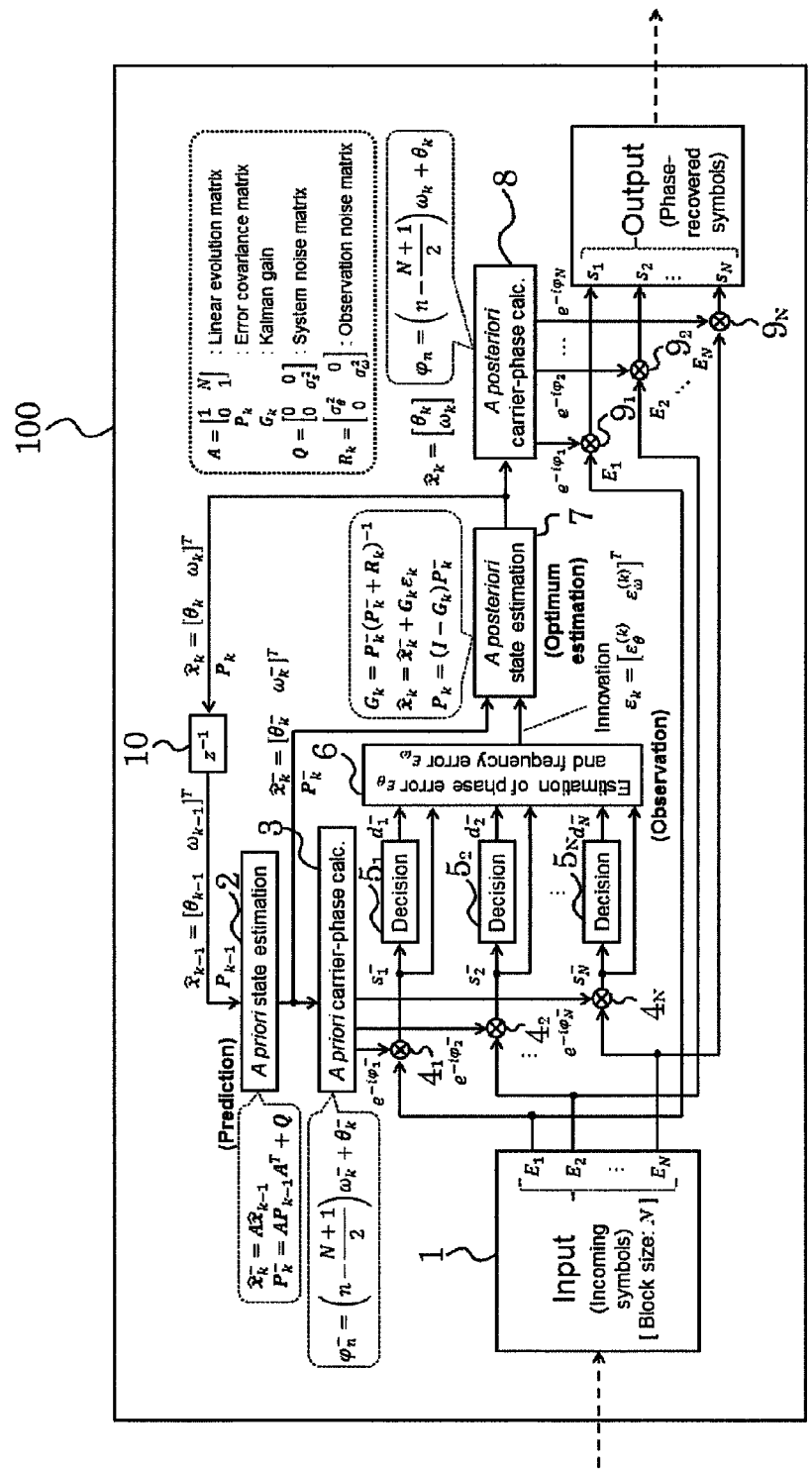
FIG. 1 is a diagram illustrating a circuit configuration of a received signal processing device according to one embodiment of the present invention.

FIG. 1 illustrates a circuit configuration of a received signal processing device according to one embodiment of the present invention. As shown in FIG. 1, the received signal processing device (carrier recovery unit) 100 includes: a separation and output section 1; an a priori state estimation section 2; an a priori estimation phase calculation section 3 and multipliers $4_1, 4_2, \ldots, 4_N$, which serve as the provisional compensation section; decision sections $5_1, 5_2, \ldots, 5_N$; an error estimation section 6; an a posteriori state estimation section 7; an a posteriori estimation phase calculation section 8 and multipliers $9_1, 9_2, \ldots, 9_N$, which serve as an actual compensation section; and a feedback processing section 10.

It is assumed that the received signal processing device 100 knows a modulation scheme for a received signal input, and can decide which symbol is transmitted for a symbol included in the received signal.

The received signal processing device 100 makes temporally sequential N symbols $E_1, E_2, \ldots, E_N$ in the input received signal form a block to integrate the symbols into one separated symbol group. The device obtains the carrier frequencies and phases of the separated symbol group in an integral manner to perform the carrier recovery, and outputs finally obtained signals $s_1, s_2, \ldots, s_N$. This process is repeated multiple times according to the number of the separated symbol group having been sequentially input.

Parameters to be estimated in signal processing for the separated symbol group to be input at the k-th time are two, namely, an intra-block frequency $\omega_k$ decided on the basis of phase variation according to temporal change of the separated symbols $E_1, E_2, \ldots, E_N$ that configure the separated symbol group, and an intra-block central phase $\theta_k$ decided as a temporal center of the phases of the separated symbols $E_1, E_2, \ldots, E_N$. Here, k is any integer, which represents the number of processes of the phase compensation for the respective separated symbol groups.

Figure 2:
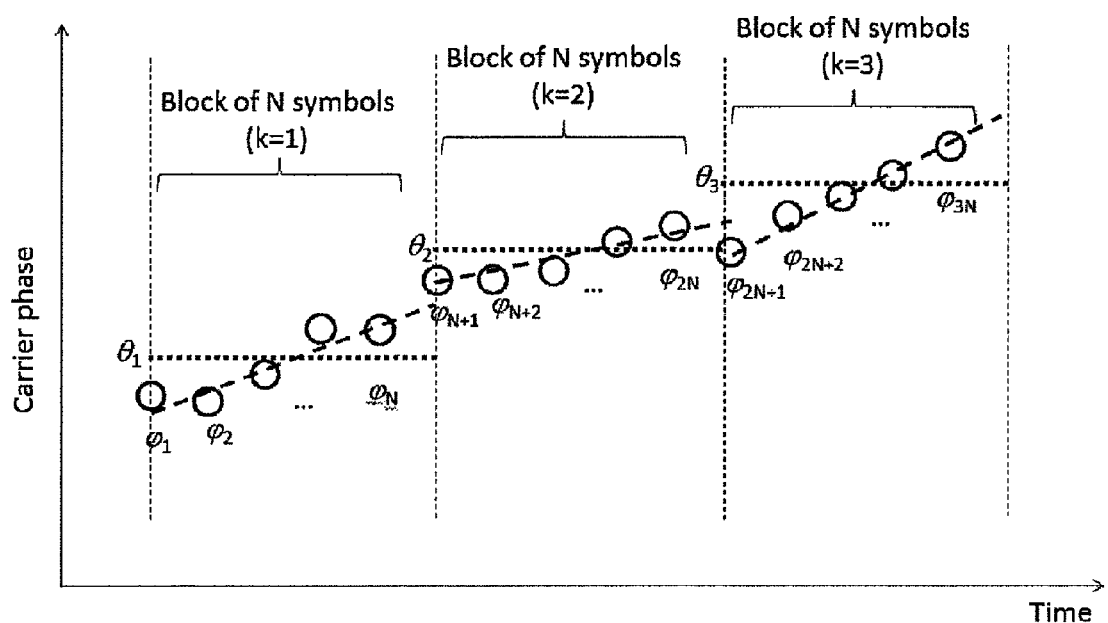
FIG. 2 is a diagram illustrating the relationship between the carrier phase and the intra-block frequency and intra-block central phase of a separated symbol group formed into a block.

FIG. 2 shows the relationship between the carrier phase and the intra-block frequency and intra-block central phase of the separated symbol group formed into a block. In FIG. 2, each point represents the carrier phase $\phi$, and represents characteristics of temporally varying according to the carrier frequency offset. Broken lines are straight lines that most appropriately approximate the phase of each of the separated symbols constituting the separated symbol group formed into a block. The slope of the line is the intra-block frequency $\omega_k$. Dotted lines are the intra-block central phases $\theta_k$ of the respective separated symbol groups.

Optical communication has a symbol rate of several tens of gigahertz, and the amount of frequency fluctuation of laser used for a signal source and a local oscillator is normally 1 MHz or less (e.g., 100 kHz or less) in the short term (a time period corresponding to several tens of symbols; an order of nanoseconds). Consequently, the block containing several tens of separated symbols has an approximately constant intra-block frequency $\omega_k$. Furthermore, the value of carrier phase $\phi$ can be regarded to vary approximately linearly with respect to time.

When the two items that are intra-block frequency $\omega_k$ and the intra-block central phase $\theta_k$ are obtained, the phases $\phi$ of all the symbols in the separated symbol group formed into a block can be accurately estimated through linear prediction.

More specifically, provided that n=1, 2, . . . N, the phases $\phi_{k,n}$ can be obtained by the following calculation expression (1).

$$\varphi_{k,n} = \left(n - \frac{N+1}{2}\right)\omega_k + \theta_k \quad (1)$$

A method of accurately estimating the two items, or the intra-block frequency $\omega_k$ and the intra-block central phase $\theta_k$, is described. Procedures in an outline view first obtain an a priori estimate ($\omega_k^-$, $\theta_k^-$) this time (k-th time) from the estimation result of the intra-block frequency and intra-block central phase ($\omega_{k-1}$, $\theta_{k-1}$) obtained in the process last time ((k−1)-th time). Next, the procedures execute observation for the separated symbol group this time (k-th time), and observes the error ($\epsilon_\omega$, $\epsilon_\theta$) between the observed values ($\omega^\sim_k$, $\theta^\sim_k$) and the a priori estimates ($\omega_k^-$, $\theta_k^-$). The a priori estimate ($\omega_k^-$, $\theta_k^-$) is corrected by applying an appropriate weight to the obtained error information, and obtains the optimal a posteriori estimates ($\omega_k$, $\theta_k$). The a posteriori estimates ($\omega_k$, $\theta_k$) obtained here are subjected to a feedback process, and used to obtain the a priori estimates ($\omega_{k+1}^-$, $\theta_{k+1}^-$) next time ((k+1)-th time). The above procedures are repeated for the number of separated symbol groups, that is, the number of processes.

On the basis of the aforementioned basic configuration, more specific description is hereinafter made with reference again to FIG. 1.

<Separation and Output Section>

The separation and output section 1 temporally separates the symbols, having been input into the block in a constant time interval, for every constant number of the symbols to obtain the separated symbol group that includes the separated symbols $E_1$, $E_2$, . . . , $E_N$, and outputs the separated symbol group in a sequence of the separated symbols $E_1$, $E_2$, . . . , $E_N$.

Such a separation and output section 1 is not limited to a specific one. For example, this section can be configured adopting a publicly known serial-to-parallel converter.

Although the value of the number of symbols (block size) N in the separated symbol group obtained by the separation and output section 1 is not limited to a specific value, it is preferable that this value range from 2 to 1,024. The value within such a range of the number of symbols allows an existing estimation method to observe the error ($\epsilon_\omega$, $\epsilon_\theta$) between the observed values ($\omega^\sim_k$, $\theta^\sim_k$) and the a priori estimates ($\omega_k^-$, $\theta_k^-$) while allowing carrier recovery for the received signal at a high symbol rate using a practical digital signal processor (DSP).

<A Priori State Estimation Section>

The a priori state estimation section 2 obtains the intra-block a priori estimation frequency $\omega_k^-$ and intra-block a priori estimation central phase $\theta_k^-$, as a priori estimates that are estimates processed this time, from the values of the intra-block frequency and intra-block central phase ($\omega_{k-1}$, $\theta_{k-1}$) of the separated symbols $E_1$, $E_2$, . . . , $E_N$ processed last time.

Procedures of obtaining a specific intra-block a priori estimation frequency $\omega_k^-$ and intra-block a priori estimation central phase $\theta_k^-$, which are the a priori estimates, assume that the intra-block frequency $\omega_k$ varies little between blocks because the varying speed of the value of the carrier frequency offset is much lower than the symbol rate. The procedures then estimate the intra-block a priori estimation frequency $\omega_k^-$ and the intra-block a priori estimation central phase $\theta_k^-$ on the basis of the following expressions (2) and (3).

Calculation of the values ($\omega_{k-1}$, $\theta_{k-1}$) processed last time will be described later.

$$\omega_k^- = \omega_{k-1} \quad (2)$$

$$\theta_k^- = N\omega_{k-1} + \theta_{k-1} \quad (3)$$

<Provisional Compensation Section>

The provisional compensation section includes the a priori estimation phase calculation section 3, and the multipliers $4_1$, $4_2$, . . . , $4_N$.

The a priori estimation phase calculation section 3 calculates the a priori estimation phase $\phi_n^-$ of the separated symbols $E_1$, $E_2$, . . . , $E_N$, from the intra-block a priori estimation frequency $\omega_k^-$ and the intra-block a priori estimation central phase $\theta_k^-$, which are the a priori estimates, on the basis of the expression (1).

The multipliers $4_1$, $4_2$, . . . , $4_N$ multiply the respective separated symbols $E_1$, $E_2$, . . . , $E_N$ by $\exp(-i\phi_n^-)$ on the basis of an input of the a priori estimation phase $\phi_n^-$, thus provisionally compensating the aforementioned phase modulation component $\exp[i2\pi f_o t]$ included in the separated symbols $E_1$, $E_2$, . . . , $E_N$. That is, a provisionally phase-compensated symbol $s_n^-$ is obtained by the following expression (4).

$$s_n^- = E_n \exp[-i\phi_n^-] \quad (4)$$

<Decision Section>

The decision sections $5_1$, $5_2$, . . . , $5_N$ regard the provisionally phase-compensated symbols $s_n^-$ as symbols before decision, perform decision for the symbol before decision $s_n^-$ ($s_1^-$, $s_2^-$, . . . , $s_N^-$ in FIG. 1) on the basis of a reference signal (a set of all the possible complex amplitude values of the transmission symbols) set according to the modulation scheme for the received signal, and obtain symbols $d_n^-$ after decision ($d_1^-$, $d_2^-$, . . . , $d_N^-$ in FIG. 1) that coincide with those with the minimum Euclidean distance from the received signal (each of the separated symbols) on the complex plane among reference points of the reference signal. Such decision sections $5_1$, $5_2$, . . . , $5_N$ are not limited to specific ones. These sections can be configured by adopting publicly known decision elements based on any method.

<Error Estimation Section>

The error estimation section 6 calculates the frequency error $\epsilon_\omega$ between the observed value $\omega^\sim_k$ of the intra-block frequency decided on the basis of the symbol before decision $s_n^-$ and symbol after decision $d_n^-$ and the intra-block a priori estimation frequency $\omega_k^-$, and calculates the phase error co between the observed value $\theta^\sim_k$ of the intra-block central phase and the intra-block a priori estimation central phase $\theta_k^-$.

Procedures for calculating the frequency error and phase error $\epsilon_\theta$ are not limited to specific ones. The procedures may calculate, as the observed values, the average value of the phase variations against the temporal variations of the separated symbols $E_1$, $E_2$, . . . , $E_N$ and the average value of the temporally center of phases of the separated symbols $E_1$, $E_2$, . . . , $E_N$. In view of accurate error estimation, it is preferred to perform calculation according to maximum-likelihood phase estimation, described in the following Reference Literature 1, instead.

Reference Literature 1: J. G. Proakis et al., "Digital Communications," 2008, 5th ed., McGraw Hill.

The maximum-likelihood phase estimation calculates the phase error co according to the following expression (5). This phase error co represents the difference between the observed value ($\theta^\sim_k$) of the intra-block central phase and the intra-block a priori estimation central phase $\theta_k^-$, the difference being decided on the basis of the symbol before decision $s_n^-$ and the symbol after decision $d_n^-$.

$$\epsilon_\theta = -\tan^{-1}(Im[\Sigma_{n=1}^N s_n^-(d_n^-)^*]/Re[\Sigma_{n=1}^N s_n^-(d_n^-)^*]) \quad (5)$$

Likewise, the maximum-likelihood estimation calculates the frequency error $\epsilon_\omega$ according to the following expression (6). This frequency error $\epsilon_\omega$, represents the difference between the observed value ($\omega^-_k$) of the intra-block frequency and the intra-block a priori estimation frequency $\omega_k^-$, the difference being decided on the basis of the symbol before decision $s_n^-$ and the symbol after decision $d_n^-$.

$$\epsilon_\omega = -Im[\Sigma_{n=1}^N n s_n^-(d_n^-)^*]/Re[\Sigma_{n=1}^N n^2 s_n^-(d_n^-)^*] \tag{6}$$

To obtain the estimation result of the expression (6), it is provided that a likelihood function $\Lambda(\omega)$ is defined by the following expression (6)', exp($in\omega$) in the expression (6)' is approximated by the following expression (6)" under assumption that $\omega$ is infinitesimal, and $\omega$ with $d\Lambda/d\omega$ of zero is treated as the maximum likelihood estimate $\epsilon_\omega$.

$$\Lambda(\omega) = Re\left[\sum_{n=1}^N s_n^-(d_n^-)^* \exp(in\omega)\right] \tag{6)'}$$

$$\exp(in\omega) \sim 1 - \frac{(n\omega)^2}{2} + in\omega \tag{6)''}$$

<A Posteriori State Estimation Section>

The a posteriori state estimation section 7 corrects the a priori estimates ($\omega_k^-$, $\theta_k^-$) on the basis of the frequency error $\epsilon_\omega$ and phase error $\epsilon_\theta$, and obtains an intra-block a posteriori estimation frequency $\omega_k$ and intra-block a posteriori central phase $\theta_k$ as a posteriori estimates obtained by estimating the most likely values processed this time that are of the intra-block frequency and the intra-block central phase.

The method of obtaining the intra-block a posteriori estimation frequency $\omega_k$ and the intra-block a posteriori central phase $\theta_k$ is not specifically limited only if this is a method of correcting the a priori estimate ($\omega_k^-$, $\theta_k^-$) by applying appropriate weights to the frequency error $\epsilon_\omega$ and the phase error $\epsilon_\theta$. In view of obtaining the a posteriori value that is more accurate, it is preferred to obtain the value by a Kalman filter constructed with reference to Kalman filters described in the following Reference Literatures 2 to 4. The following Reference Literatures 3 and 4 describe methods of performing carrier recovery using Kalman filters. However, all of them are applied to a process for each symbol. Here, a Kalman filter is proposed as means for application to the multiple separated symbols constituting the separated symbol group formed into a block; the Kalman filter outputs the a posteriori state vector as the a posteriori estimates, and the a posteriori error covariance matrix where the a priori estimate and the value of the a priori error covariance matrix have been corrected, on the basis of inputs of the frequency error, the phase error, an a priori state vector that is the a priori estimates, and an a priori error covariance matrix for controlling the gain.

Reference Literature 2: Adachi et al. "Fundamentals of Kalman Filter," 2012, Tokyo Denki University Press.

Reference Literature 3: W.-T. Lin et al., "Adaptive Carrier Synchronization Using Decision-Aided Kalman Filtering Algorithms," IEEE Trans. Consumer Electron., Vol. 53, No. 4, pp. 1260-1267 (2007).

Reference Literature 4: T. Marshall et al., "Kalman filter carrier and polarization-state tracking," Opt. Lett., Vol. 35, No. 13, pp. 2203-2205 (2010).

First, for application of the Kalman filter, an evolution equation and an observation equation as models are defined by the following expressions (7) and (8).

$$x_{k+1} = Ax_k + Bn_s \tag{7}$$

$$y_k = Cx_k + n_o \tag{8}$$

Note that $x_k$ in the expressions (7) and (8) is the state vector at the k-th time process. Estimation of this value is an object of the Kalman filter. Here, $x_k$ is defined as a two-row and one-column vector using the intra-block central phase $\theta_k$ and the intra-block frequency $\omega_k$, according to the following expression (9).

$$x_k = [\theta_k, \omega_k]^T \tag{9}$$

Here, T in the expression (9) represents the transpose of the matrix.

The linear evolution matrix A in the expression (7) is defined by the following expression (10).

$$A = \begin{bmatrix} 1 & N \\ 0 & 1 \end{bmatrix} \tag{10}$$

The definition of this expression (10) corresponds to calculation of the aforementioned a priori estimate through the expressions (2) and (3).

B and $n_s$ in the expression (7) define parameters called system noise, and are a matrix and a vector that describe noise providing fluctuation intrinsic to the evolution of the system. Since the frequency of laser intrinsically fluctuates here, the fluctuation is regarded as system noise. However, the phase is not considered system noise from the standpoint that the phase accompanies the frequency fluctuation. B and $n_s$ are then defined by the following expressions (11) and (12).

$$B = \begin{bmatrix} 0 & 0 \\ 0 & 1 \end{bmatrix} \tag{11}$$

$$n_s = [0, n_f]^T \tag{12}$$

Here, it is assumed that $n_f$ in the expression (12) is a random variable that represents the carrier frequency fluctuation, the average value is zero, and the variance value, i.e., noise power, is $\sigma_f^2$.

$y_k$ in the expression (8) is an observed value vector, and is defined using the observed value of the intra-block central phase $\theta^-_k$ and the observed value of the intra-block frequency $\omega^-_k$, according to the following expression (13).

$$y_k = [\tilde{\theta}_k, \tilde{\omega}_k]^T \tag{13}$$

The state vector $x_k$ can be directly observed as $y_k$. C in the expression (8) is defined as a two-row and two-column unit matrix I. $n_o$ in the expression (8) is an observation noise vector, and is defined by the following (14).

$$n_o = [n_\theta, n_\omega]^T \tag{14}$$

It is assumed that, in the expression (14), $n_\theta$ and $n_\omega$ are random variables that represent noise for the observed values $\theta^-_k$ and $\omega^-_k$. The average value is zero, and the variance values, i.e., noise powers, are $\sigma_\theta^2$ and $\sigma_\omega^2$.

According to the definition, the optimal state vector $x_k$ is estimated by the following procedures.

First, the a priori estimate $\hat{x}_k^-$ of the state vector $x_k$ and the a priori error covariance matrix $P_k^-$ are provided by the following expressions (15) and (16).

$$\hat{x}_k^- = A\hat{x}_{k-1} \tag{15}$$

$$P_k^- = AP_{k-1}A^T + Q \tag{16}$$

Note that $\hat{x}_{k-1}$ in the expression (15) and $P_{k-1}$ in the expression (16) are the a posteriori estimate of the state vector and the a posteriori error covariance matrix, respectively, which have been obtained by the process last time.

Furthermore, Q indicated in the expression (16) is a matrix representing system noise, and is provided using the noise power $\sigma_f^2$ by the following expression (17).

$$Q = \begin{bmatrix} 0 & 0 \\ 0 & \sigma_f^2 \end{bmatrix} \quad (17)$$

The value of the noise power $\sigma_f^2$ is determined by the frequency fluctuation of the laser, which is the signal source and the light source of the local oscillator. Consequently, a fixed value is allowed to be used when the laser used in the system is determined.

Next, the Kalman gain $G_k$ is given by the following expression (18).

$$G_k = P_k^-(P_k^- + R_k)^{-1} \quad (18)$$

Note that, in the expression (18), $R_k$ is a matrix representing observation noise, and is given using the respective observation noise powers $\sigma_\theta^2$ and $\sigma_\omega^2$ with the phase and frequency with respect to the observed values $\tilde{\theta}_k$ and $\tilde{\omega}_k$, according to the expression (19).

$$R_k = \begin{bmatrix} \sigma_\theta^2 & 0 \\ 0 & \sigma_\omega^2 \end{bmatrix} \quad (19)$$

The expression (18) includes an inverse matrix operation. The size of the matrix is two rows and two columns. Consequently, the expression can be easily calculated.

The values of the observation noise powers $\sigma_\theta^2$ and $\sigma_\omega^2$ in the expression (19) depend on the quality of the received signal input. It is thus assumed that a preset initial value is used at the beginning of the repetitive process while a value obtained as the statistic of the observed value error obtained in the course of the repetitive process is used to appropriately update the value of the matrix $R_k$ after completion of a number of processes to some extent.

Consequently, even if the quality of the received signal varies during reception, the optimal estimation result can be always provided. This point is highly advantageous in comparison with the carrier recovery (see NPL 2) using the PLL. That is, the case of using the PLL causes necessity of optimizing a parameter, such as a loop filter band, in conformity with the quality of the received signal. The method is not simple. Consequently, when the quality of the received signal varies during reception, adaptation to the variation is not easy. On the contrary, adoption of the Kalman filter allows the optimal control parameter to be automatically obtained through the observation result.

The a posteriori estimate $\hat{x}_k$ of the state vector is given by the following expression (20) using the a priori estimate $\hat{x}_k^-$, the observed value vector $y_k$ and the Kalman gain $G_k$.

$$\hat{x}_k = \hat{x}_k^- + G_k(y_k - \hat{x}_k^-) \quad (20)$$

Here, the term $y_k - \hat{x}_k^-$ of the expression (20) is given by the following expression (21) called an innovation, and is the difference between the observed value and the a priori estimate which pertain to the intra-block central phase and the intra-block frequency. That is, the phase error $\epsilon_\theta$ and the frequency error so, given by the expressions (5) and (6) can be used.

$$y_k - \hat{x}_k^- = \begin{bmatrix} \tilde{\theta}_k - \theta_k^- \\ \tilde{\omega}_k - \omega_k^- \end{bmatrix} = \begin{bmatrix} \varepsilon_\theta \\ \varepsilon_\omega \end{bmatrix} \quad (21)$$

Finally, the a posteriori error covariance matrix $P_k$ is given using the a priori error covariance matrix $P_k^-$ and the Kalman gain $G_k$ by the following expression (22).

$$P_k = (I - G_k)P_k^- \quad (22)$$

As described above, the a posteriori state estimation section 7 can output the a posteriori estimate of the state vector $\hat{x}_k$ as the a posteriori estimate, that is, the intra-block a posteriori estimation frequency $\omega_k$ and the intra-block a posteriori estimation central phase $\theta_k$ (see the expression (9) etc.). The configuration in the case of using the Kalman filter allows the a posteriori error covariance matrix $P_k$ to be output (see the expression (22) etc.).

<Actual Compensation Section>

The actual compensation section includes the a posteriori estimation phase calculation section 8, and the multipliers 9$_1$, 9$_2$, ..., 9$_N$.

The a posteriori estimation phase calculation section 8 calculates the a posteriori estimation phase $\phi_n$ of the separated symbols $E_1, E_2, \ldots, E_N$, from the intra-block a posteriori estimation frequency $\omega_k$ and the intra-block a posteriori estimation central phase $\theta_k$, which are the a priori estimates, on the basis of the expression (1).

The multipliers 9$_1$, 9$_2$, ..., 9$_N$ multiply the respective separated symbols $E_1, E_2, \ldots, E_N$ by $\exp(-i\phi_n)$ on the basis of an input of the a posteriori estimation phase $\phi_n$, thus compensating the aforementioned phase modulation component $\exp[i2\pi f_o t]$ included in the separated symbols $E_1, E_2, \ldots, E_N$.

Thus, the carrier phases of the separated symbols $E_1, E_2, \ldots, E_N$ formed into a block can be integrally compensated and recovered. Subsequently, carrier recovery is performed for the next separated symbol group, and the process is repeated, thereby allowing the carrier recovery to be performed for all the received symbols.

Publicly known demodulation processes (decision and decoding) are performed for the received signal having been subjected to carrier recovery, thereby allowing the received signal to be demodulated.

<Feedback Processing Section>

The feedback processing section 10 performs a feedback process on the basis of the a posteriori estimates ($\omega_k$, $\theta_k$) obtained this time (the k-th time) so that the a priori state estimation section 2 can adopt the a posteriori estimates ($\omega_k$, $\theta_k$) as the values processed last time of the intra-block frequency and the intra-block central phase, and obtain the a priori estimates ($\omega_{k+1}^-$, $\theta_{k+1}^-$) for the separated symbol group in the next ((k+1)-th time) phase compensation.

In the case where the a posteriori state estimation section 7 includes the Kalman filter, another feedback process is further performed in addition to the aforementioned feedback process. The other process inputs the a posteriori estimate and the a posteriori error covariance matrix ($\hat{x}_k$, $P_k$) into the a priori state estimation section 2, and allows the a priori state estimation section 2 to output, to the Kalman filter, these items as the a priori estimate and the a priori error covariance matrix ($\hat{x}_{k+1}^-$, $P_{k+1}^-$) for the next phase compensation.

As to the values processed last time ((k−1)-th time) used to obtain the a posteriori estimates ($\omega_k$, $\theta_k$) this time (k-th time), the a posteriori estimate and the a posteriori error covariance matrix ($\hat{x}_k$, $P_k$), appropriate initial values are input into ($\hat{x}_0^-$, $P_0^-$) and the process is performed for the first time (k=1). At the beginning of the process, the initial values affect the process. Consequently, it is preferred to start a substantial process after a certain sufficient number of processes are performed.

As described above, the feedback process for each symbol as in PLL requires the digital signal processor (DSP) to operate at the same clock frequency as the symbol rate. Consequently, in the case with a symbol rate of several tens of gigahertz, as in optical communication, carrier recovery is difficult. On the contrary, the received signal processing device 100 allows the time interval for occurrence of feedback can be 1/N of the symbol interval in principle, where the number of symbols (block size) in the separated symbol group is assumed to be N. Consequently, a configuration with N having a large value of several tens or more can reduce the required clock frequency of the digital signal processor (DSP), and allows carrier recovery through a practical digital signal processor (DSP) even in the case with a symbol rate of several tens of gigahertz or more.

The received signal processing device 100 shown in FIG. 1 is an illustration as one embodiment of the present invention. The technical thought of the present invention is not limited to this example. For example, processes may be performed that combines an adaptive equalizer that performs polarization separation and waveform shaping for polarization-multiplexed signal light with the carrier recovery method of the present invention. Each element of the received signal processing device of the present invention including the received signal processing device 100 can be configured by adopting any integrated circuit, such as an IC or LSI, that has a circuit allowing the signal processing of the element to be executed according to the aforementioned configuration.

<Received Signal Processing Device (Configuration Example Including Actual Decision Section Etc.)>

Furthermore, the received signal processing device of the present invention can be configured by including an actual decision section. This section includes: a decision element that decides the reference point having the shortest Euclidean distance on the complex plane from multiple reference points constituting the reference signal determined according to the modulation scheme of the digital modulation to one received symbol of the digitally modulated received signal (here, each of the separated symbols output from the carrier recovery unit); and a reference signal update section that corrects the decided reference point so as to have a point approaching the position of the received symbol on the basis of the following expression [1], and updates the reference point of the reference signal used in the decision element to the corrected reference point.

Any times of repetition of updating the reference signal through such a reference signal update section can update all the reference points in the reference signal so as to coincide with the expected value of the possible complex amplitude values of the received symbol, and can normally operate various types of decision-directed signal processing section and perform the process without reducing the signal quality even in the case where the transmission signal has a distortion.

$$r_{n+1} = r_n + \mu(x_n - r_n) \quad [1]$$

In the expression [1], n denotes the number of updating the reference point, $r_n$ denotes a two-dimensional vector representing the position of the reference point on the complex plane subjected to the n-th updating process, $x_n$ denotes a two-dimensional vector representing the position of the received symbol on the complex plane subjected to the n-th updating, $\mu$ represents an infinitesimal numerical value that is $10^{-10}$ or more and 0.1 or less, and $r_{n+1}$ denotes a two-dimensional vector representing the position of the corrected reference point on the complex plane.

The decision element is not limited to a specific one. This element can be constructed by including an integrated circuit, such as an IC or LSI, that has a circuit allowing executing decision for the received symbol on the basis of the circuit configuration of a publicly known decision-directed decision element.

The reference signal update section is not limited to have a specific configuration. This section can be constructed by including an integrated circuit, such as an IC or LSI, that has a circuit allowing executing correction of the reference point of the reference signal.

Preferably, the actual decision section of the received signal processing device includes a section of calculating the amount of phase correction. This section adopts, as a control signal, the phase difference between the received signal and the decision signal that is a decision result of the decision element based on the reference signal updated by the reference signal update section with respect to the received signal, and calculates the amount of phase correction according to the phase variation of the received signal occurring owing to the fluctuation of the frequency difference between the carrier frequency and the local oscillatory frequency. Adoption of such a section of calculating the amount of phase correction can achieve the carrier recovery based on the control signal.

Preferably, the received signal processing device includes an adaptive equalizer (AEQ). This equalizer adopts, as the error signal, the difference between the received signal whose noise component has been filtered out through a finite impulse response (FIR) filter and the decision signal that is a decision result of the decision element based on the reference signal updated by the reference signal update section with respect to the received signal, and controls the tap coefficient of the FIR filter so that the error signal can have the minimum intensity. Adoption of such an adaptive equalizer can achieve the equalization process (filtering process) where the received signal has the maximum quality.

Preferably, the adaptive equalizer includes a polarization separation processing section that applies a polarization separation process to the polarization-multiplexed received signal. Adoption of such a polarization separation section can achieve the equalization process for the polarization-multiplexed received signal.

The section of calculating the amount of phase correction and the adaptive equalizer are not limited to have specific configurations. The former may have a configuration that includes a combination of a digital phase locked loop (DPLL) that is a publicly known decision-directed section of calculating the amount of phase correction with any phase correcting section, and the combination has a circuit allowing execution of correcting and updating the reference signal. The latter may have a configuration that includes a publicly known decision-directed adaptive equalizer that has a circuit allowing execution of correcting and updating the reference signal. Such a configuration can be constructed by including an integrated circuit, such as an IC or LSI, that has a circuit allowing executing the process of calculating the amount of phase correction based on the decision signal as a decision result of the decision element based on the reference signal updated by the reference signal update section, and the equalization process, in a state where the reference signal update section and the decision element are embedded.

Figure 15:
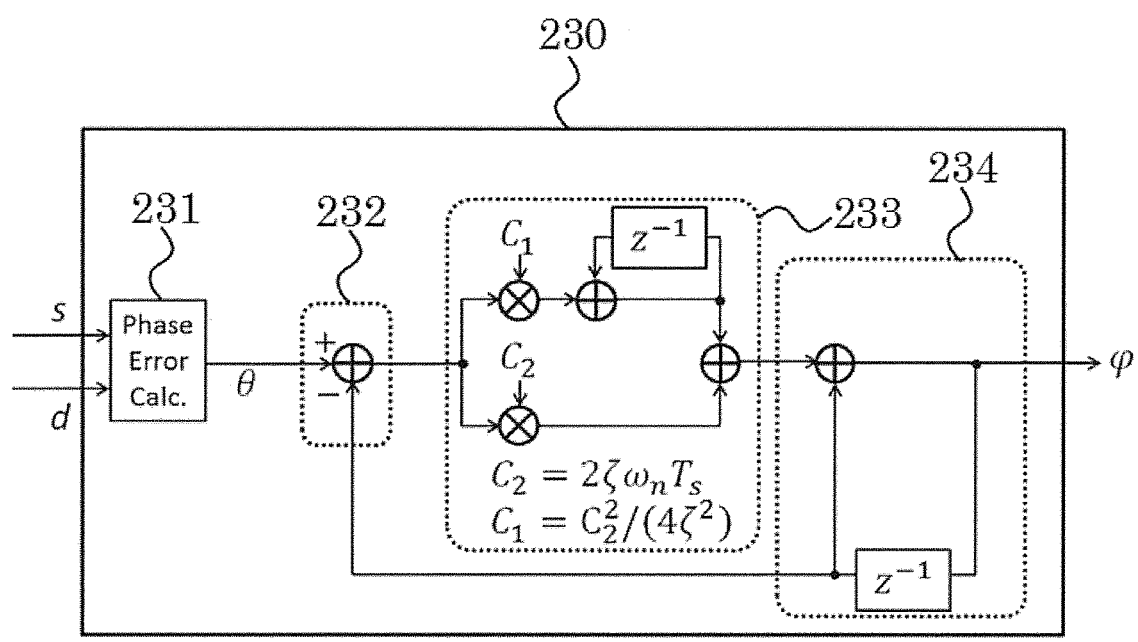
FIG. 15 is a circuit diagram showing a configuration example of DPLL.
Figure 16:
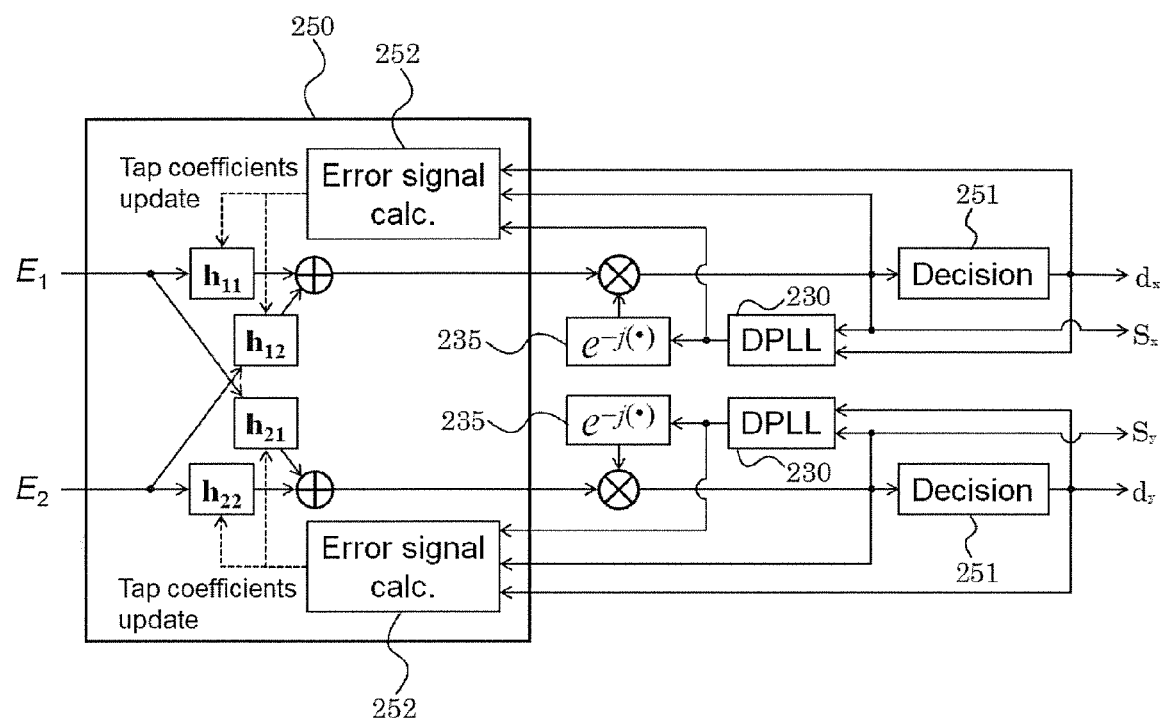
FIG. 16 is a circuit diagram showing a configuration example of a received signal processing device configured by including a DPLL, a phase correcting section ($e^{-j(\cdot)}$ operator), and an AEQ.

Here, circuit configuration examples of the publicly known decision-directed section of calculating the amount of phase correction and the adaptive equalizer, and signal processing examples executed by these elements are described with reference to FIGS. 15 and 16, and problems accompanying them are also described. The description is herein made assuming the circuit configuration shown in FIG. 16 to be one received signal processing device. FIG. 15 is a circuit diagram showing a configuration example of DPLL. FIG. 16 is a circuit diagram showing a configuration example of a received signal processing device configured by including a DPLL, a phase correcting section ($e^{-j(\cdot)}$ operator), and an AEQ.

As shown in FIG. 15, a digital phase locked loop 230 includes a phase error operation processing section 231, a phase difference calculation section 232, a loop filter section 233, and a numerically controlled oscillator 234.

The signal processing procedures of the digital phase locked loop 230 are described together with the signal processing of each element. Note that the digital phase locked loop 230 repeats the operation for outputting the amount of phase correction $\phi$ for each of the sequentially input received symbols and decided symbols. It is hereinafter assumed that the operation process for the j-th input received symbol and decided symbol (j is an integer of one or more) are described. Except for the case of j=1 that is for the startup, it is assumed that the one-symbol previous process, which is the (j−1)-th process, has been completed, and the feedback signal has been appropriately provided. Furthermore, $z^{-1}$ in the diagram means delay by one symbol, and represents that a value obtained in the one-symbol previous process is obtained through feedback.

The phase error operation processing section 231 calculates the phase error $\theta_j$ between an input $s_j$ that is a received symbol and an input $d_j$ that is a decided symbol. In this case, the phase error $\theta_j$ is obtained as $\theta_j = \text{Arg}(s_j \times d_j^*)$. Here, $d_j^*$ is the complex conjugate of the received symbol after decision, and Arg means a function that provides the phase angle of a complex number on the complex plane. The subscript j means that the value is obtained by the process applied to the j-th input symbol.

The phase difference calculation section 232 calculates $\theta'_j$ that is the difference between the phase error $\theta_j$ for the j-th input symbol and the after-mentioned amount of phase correction $\phi_{j-1}$ obtained for the (j−1)-th input symbol. In the case of j=1, $\phi_0=0$.

The loop filter section 233 performs the operation shown in the diagram using the damping factor $\zeta$ and natural frequency $\omega_n$, and the symbol time interval Ts, i.e., parameters $C_1$ and $C_2$ determined by the reciprocal of the symbol rate, and cuts off a high frequency component of $\theta'_j$.

The numerically controlled oscillator 234 calculates the sum with the amount of phase correction $\phi_{j-1}$ obtained for the (j−1)-th input symbol on the basis of the input of the value (the output of the loop filter section 233) with the high frequency component of $\theta'_j$ having been cut off, and outputs the sum as the amount of phase correction $\phi_j$ obtained for the j-th input symbol. In the case of j=1, $\phi_0=0$.

The above signal processing procedures allows the digital phase locked loop 230 to calculate the amount of phase correction $\phi$ for the next input symbol (the value for correcting the phase shift caused owing to the difference between the received signal carrier frequency and the random frequency of the local oscillator (LO)). The amount of phase correction $\phi_j$ output from the numerically controlled oscillator 234 is fed back to the phase difference calculation section 232, and the operation process for the subsequent inputs $s_{j+1}$ and $d_{j+1}$ as with the above case to calculate the amount of phase correction $\phi_{j+1}$.

The digital phase locked loop 230 repeats such signal processing each time the symbol is input, thereby achieving a decision-directed section of calculating the amount of phase correction that is controlled by the phase error between the received symbol and the decided symbol, and allowing output of the amount of phase correction $\phi$ for tracking the phase variation between received symbols.

Combination of the digital phase locked loop 230 with a publicly known phase correcting section (e.g., the phase correcting section ($e^{-j(\cdot)}$ operator) 235) allows a carrier-recovered demodulated signal to be obtained on the basis of the amount of phase correction.

Furthermore, integration of the digital phase locked loop 230 and the phase correcting section into a publicly known adaptive equalizer (e.g., see FIG. 16) can obtain a demodulated signal having been subjected to adaptive equalization and then to the carrier recovery.

The circuit configuration adopted for the carrier recovery is not limited to this example. The received signal processing device of the present invention can adopt a circuit configuration of every carrier recovery circuit that uses, as the error signal, the relationship between the decision result for the received symbol and this received symbol. For example, the circuit configuration of the carrier recovery circuit shown in NPL 3 may be adopted.

As shown in FIG. 16, an adaptive equalizer 250 optimally controls the tap coefficients of FIR filters h11, h12, h21 and h22, together with these FIR filters, a decision element 251, an error signal calculation section and tap coefficient control section 252. The adaptive equalizer 250 has a 2×2 butterfly configuration in order to execute the polarization separation process for the polarization-multiplexed received signal. The FIR filter constituting the adaptive equalizer 250 may be, for example, a 9-tap T/2 fractional interval FIR filter. However, the configuration is not limited to this embodiment. Alternatively, any FIR filter with a freely selected number of taps can be adopted.

Signals $E_1$ and $E_2$ input into the adaptive equalizer 250 are the complex amplitude values of X-polarization component and Y-polarization component of the received signal. The signals $E_1$ and $E_2$ do not necessarily coincide with the X-polarization component and Y-polarization component, respectively, of the transmission signal. The FIR filters h11 and h21 and h12 and h22 are provided with vectors (tap coefficient vectors) representing the tap coefficients determined by the error signal calculation section and tap coefficient control section 252. The outputs of the FIR filters are given by the inner product of the tap coefficient vector and the time-series input signal vector (convolution operation).

In this example, the adaptive equalizer 250, and the digital phase locked loop (DPLL) 230 shown in FIG. 15, the phase correcting section 235, and the decision element 251 for decision which are the decision-directed section of calculating the amount of phase correction are included, thus constituting the received signal processing device.

The phase of a signal output from the adaptive equalizer 250 is corrected (carrier-recovered) by the phase correcting section 235 according to the amount of phase correction output from the digital phase locked loop circuit 230 (DPLL) shown in FIG. 15, and input into the decision element 251.

The decision element 251 defines the reference signal determined by the digital modulation scheme for the received signal to be treated, and decides what reference point in the reference signal is the nearest to the received symbols $s_x$ and $s_y$. More specifically, the element selects the reference point with the shortest Euclidean distance to the received symbols $s_x$ and $s_y$ on the complex plane, and outputs the selected reference point as the decided symbols $d_x$ and $d_y$.

The received symbols $s_x$ and $s_y$ before decision by the decision element 251 and the decided symbols $d_x$ and $d_y$ after decision are used to control the signal processing in the adaptive equalizer 250 and the signal processing in the digital phase locked loop circuit 30.

The output of the digital phase locked loop (DPLL) 230 is input into the error signal calculation section and tap coefficient control section 252 in the adaptive equalizer 250. This is because when the error signal is calculated from the received symbols before and after decision, the corrected carrier phase is returned to the original state and then calculation of the tap coefficients is executed.

The tap coefficient control section 252 of the FIR filter controls the tap coefficients using a least mean square (LMS) algorithm that minimizes the expected value of square error on the basis of the error signal.

The tap coefficient control through use of the algorithm is, first, performed using the constant modulus algorithm (CMA) that utilizes the error from a constant value of the absolute amplitude of the signals $s_x$ and $s_y$ in a blind startup state not relying on a priori information pertaining the received signal, and next, is performed after transition to a decision-directed (DD) operation mode that utilizes, as the error signal, the difference between complex amplitudes before and after decision after the tap coefficients converge to some extent.

Thus, the difference between the received symbols $s_x$ and $s_y$ subjected to the polarization separation process and noise filtering through each of the FIR filters and the decided symbols $d_x$ and $d_y$ is adopted as the error signal, and the each of the tap coefficients is controlled so that the error signal can have the minimum intensity and the equalization process is thus performed for the subsequent received symbol, thereby maximizing the quality of the received signal.

The signal demodulated by the received signal processing device may be the signal obtained by demodulating, as it is, the decided symbols $d_x$ and $d_y$ output from the decision element 251, or the signal obtained by demodulating the signal acquired by performing decision again by a decision element separately provided outside for the signals $s_x$ and $s_y$ subjected to the equalization process. In the latter case, the decision element 251 and the decision element separately provided outside may execute decisions according to different decision rules.

In the case where the input signal is a single polarized signal and is only $E_1$, FIR filters pertaining to h21, h12 and h22 in FIG. 16 are not used and operation may be performed only in the upper half of the circuit pertaining to h11.

Figure 13A:
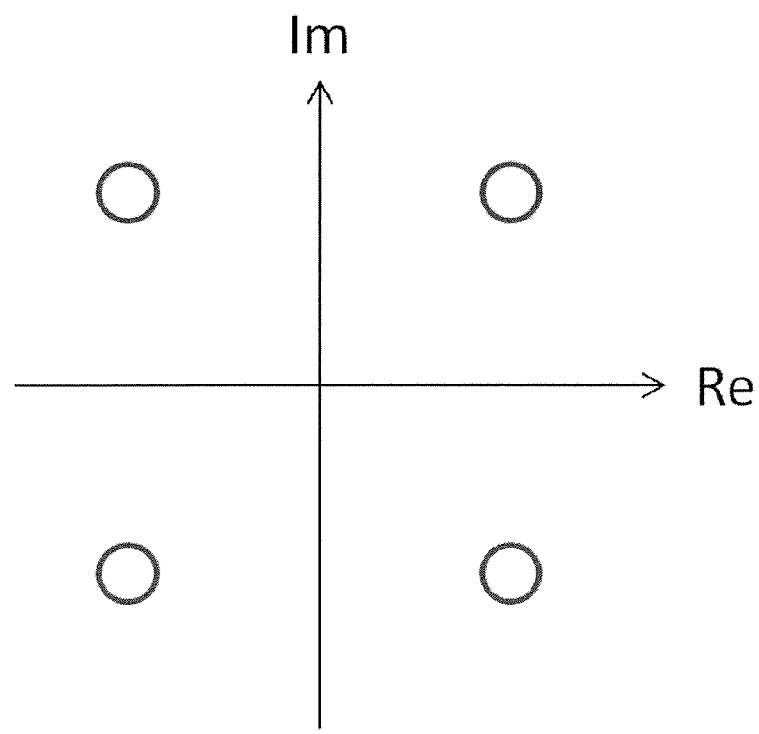
FIG. 13A is a diagram showing an ideal constellation in the case of 4QAM (QPSK).
Figure 13B:
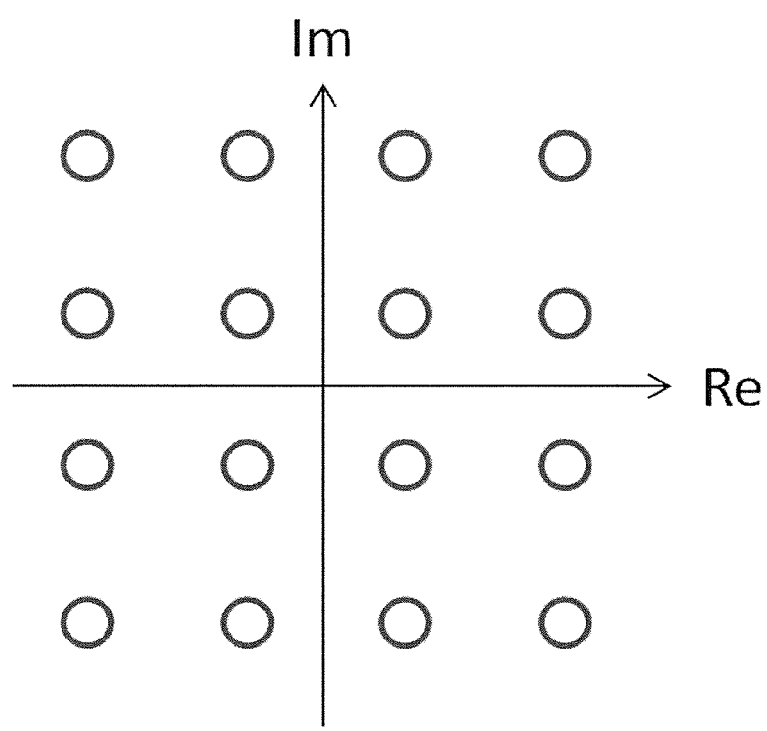
FIG. 13B is a diagram showing an ideal constellation in the case of 16QAM.
Figure 13C:
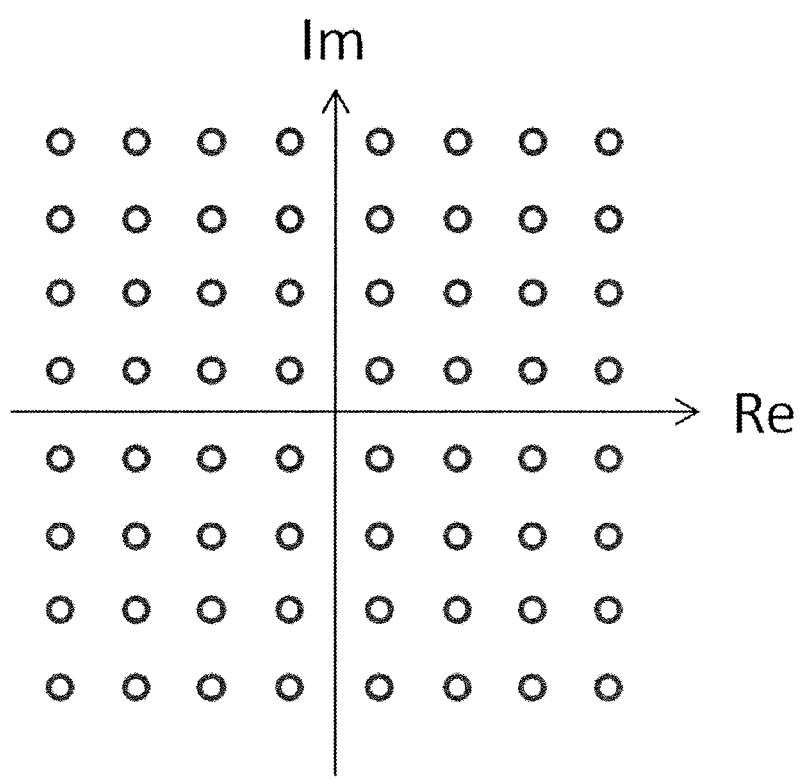
FIG. 13C is a diagram showing an ideal constellation in the case of 64QAM.

In the case where a certain transmission signal (here, a 16QAM signal is exemplified) has the ideal constellation waveform shown in FIG. 13B as with the reference signal, the decision causes no problem, and the section of calculating the amount of phase correction and the adaptive equalizer can be normally operated.

Figure 14A:
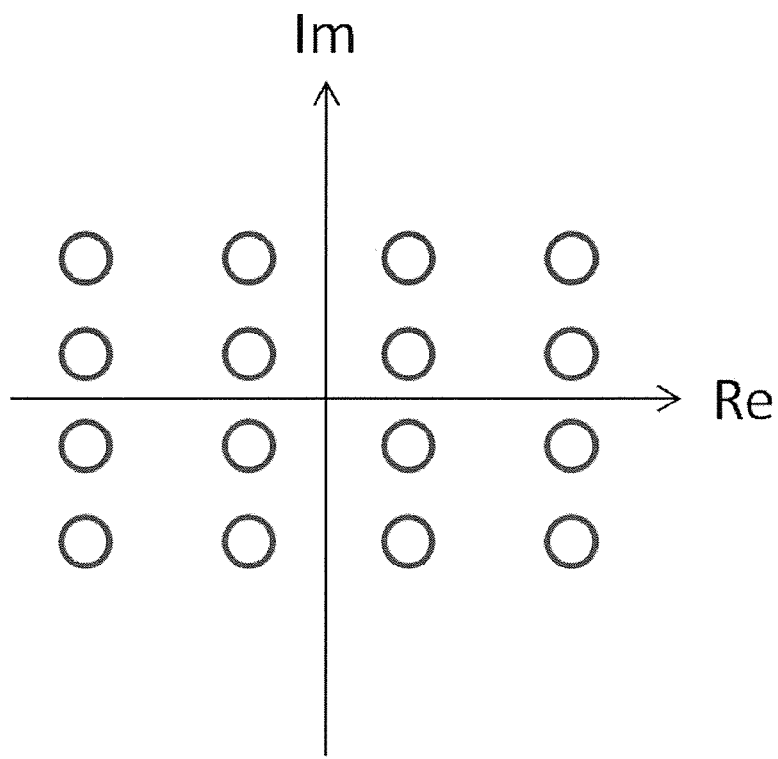
FIG. 14A is a diagram showing an example of a constellation of a 16QAM signal in the case with an error with the quadrature component having a smaller amplitude than an in-phase component.
Figure 14B:
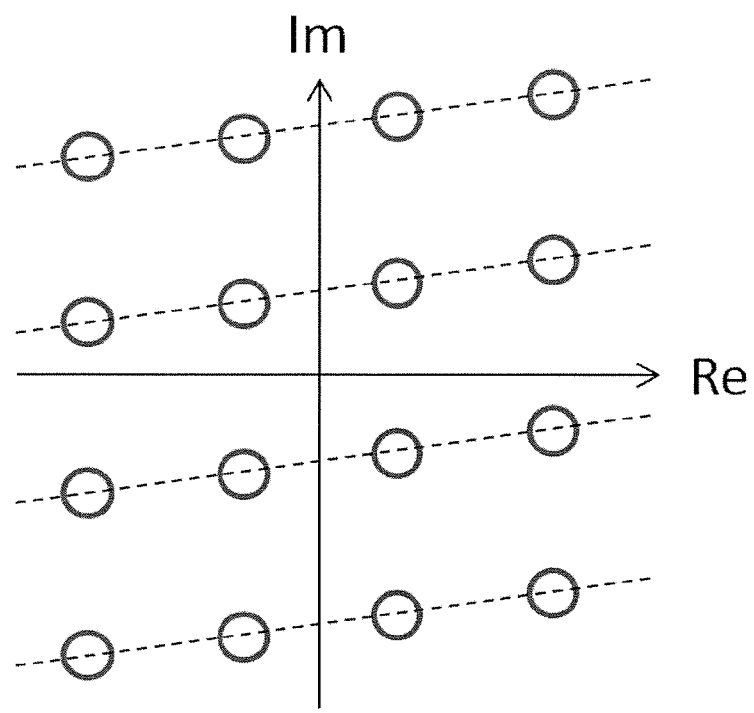
FIG. 14B is a diagram showing an example of a constellation of a 16QAM signal in the case with an error with the angle between the in-phase component and the quadrature component deviating from 90 degrees.
Figure 14C:
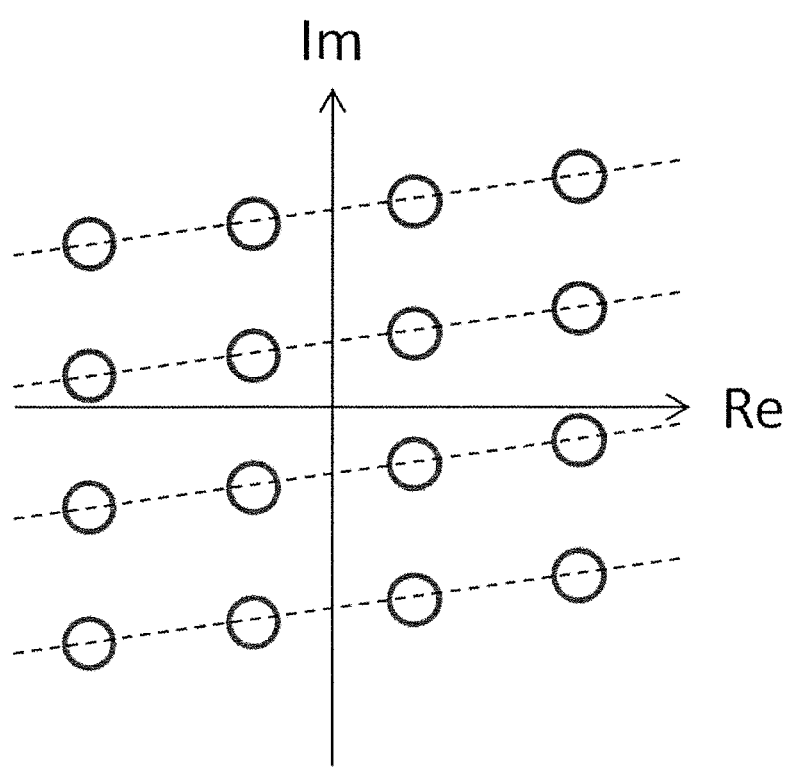
FIG. 14C is a diagram showing an example of a constellation of a 16QAM signal in the case with both the errors shown in FIGS. 14A and 14B.

However, in the case where the transmission signal has a distorted constellation waveform as shown in FIGS. 14A to 14C, decision of the ideal constellation through use of the reference signal causes many errors even in a state where the optical signal to noise ratio during reception is high. As a result, the section of calculating the amount of phase correction in the decision-directed operation mode and the adaptive equalizer malfunction, which causes signal degradation in the quality of the demodulated signal.

Even in the case where the transmission signal is distorted, the actual decision section of the received signal processing device of the present invention corrects the reference signal through the following signal processing, thereby allowing the section of calculating the amount of phase correction and the adaptive equalizer to normally operate. In this Description, the term "actual decision section" is used to have the meaning of a decision section that has a function of correcting the reference signal in the decision element that performs final decision in the received signal processing device. Thus, in the case where only one decision element residing in the received signal processing device performs decision for executing decision-directed carrier recovery and adaptive equalization and provides the final decision result, the decision element provided with a function of correcting the reference signal is called "actual decision section". On the other hand, in the case where a decision element for executing carrier recovery is provisionally provided and another decision element that separately performs the final decision for the carrier-recovered received signal is provided, the decision element that performs the final decision and is provided with the function of correcting the reference signal is called "actual decision section".

Figure 17A:
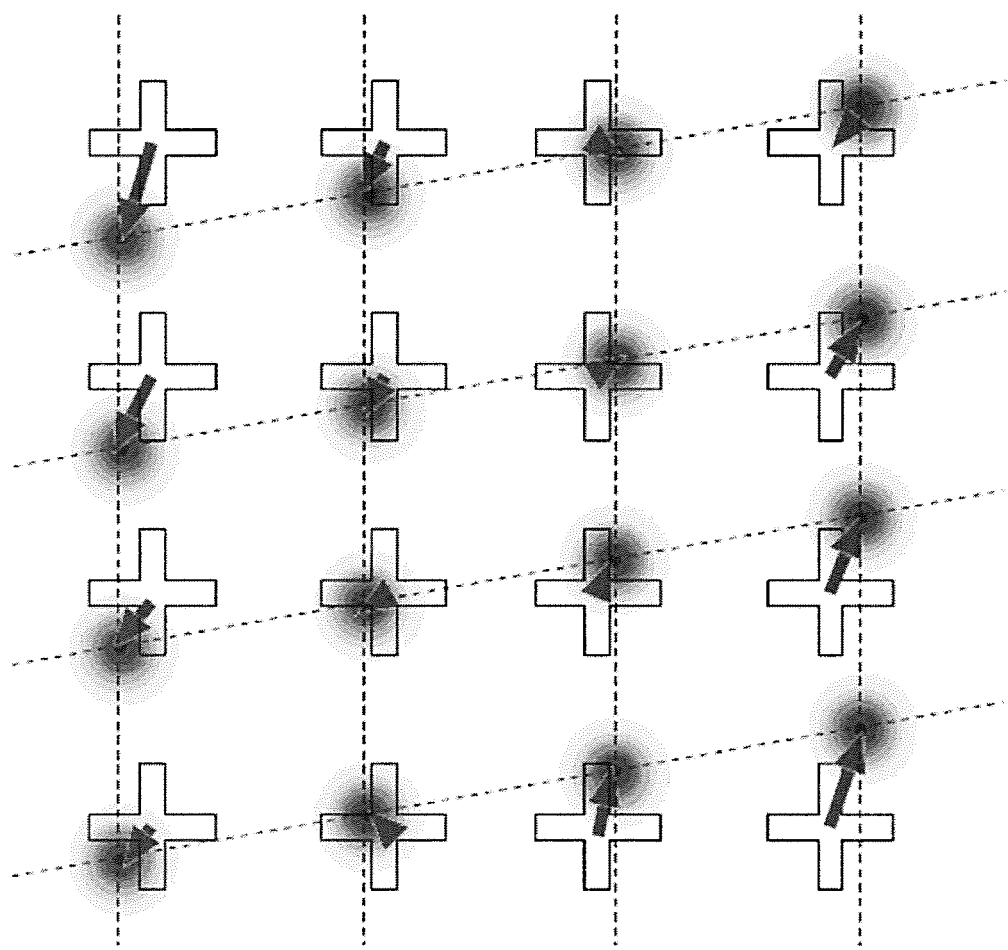
FIG. 17A is a diagram schematically illustrating a situation of correcting the reference signal.

Such a situation of correcting the reference signal is schematically described using FIG. 17A. FIG. 17A is a diagram schematically illustrating a situation of correcting the reference signal.

In FIG. 17A, cross-shaped graphics represent the positions of the reference points on the complex plane that constitute the reference signal determined on the basis of the constellation state of the ideal 16QAM signal. Round circular graphics represent the possible ranges of the respective received symbols of the received signal on the complex plane. The constellation of the received symbols is in a generally distorted state.

Correction of the reference signal is performed by updating the positions of the reference points to the expected central positions of the received symbols in the distorted states as indicated by the arrows in the diagram.

That is, the positions of the reference points constituting the reference symbol are corrected to approach the expected central positions of the respective received symbols on the complex plane, thus performing the process of updating the reference points of the reference signal to the respective corrected reference points.

At this time, the correction is performed according to the following expression [1].

$$r_{n+1} = r_n + \mu(x_n - r_n) \qquad [1]$$

In the expression [1], n denotes the number of updating the reference point, $r_n$ denotes a two-dimensional vector representing the position of the reference point on the complex plane subjected to the n-th updating, $x_n$ denotes a two-dimensional vector representing the position of the received symbol on the complex plane subjected to the n-th updating, μ represents an infinitesimal numerical value that is $10^{-10}$ or more and 0.1 or less, and $r_{n+1}$ denotes a two-dimensional vector representing the position of the corrected reference point on the complex plane.

Figure 17B:
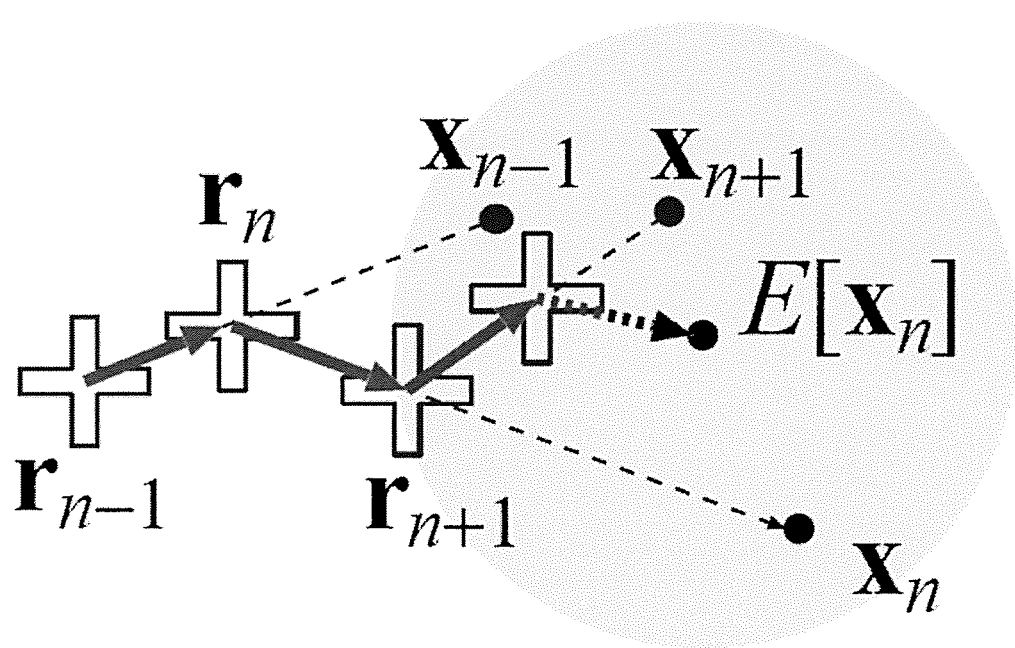
FIG. 17B is a diagram schematically illustrating a situation of correcting the reference point in the reference signal.

Such a situation of correcting the reference point is schematically described with reference to FIG. 17B. FIG. 17B is a diagram schematically illustrating the situation of correcting the reference point in the reference signal.

As shown in FIG. 17B, the reference point $r_{n-1}$ is corrected to the reference point $r_n$ by the received symbol $x_{n-1}$, the reference point $r_n$ is corrected to the reference point $r_{n+1}$ by the next received symbol $x_n$, and furthermore, the reference point $r_{n+1}$ is corrected to the reference point $r_{n+2}$ by the next received symbol $x_{n+1}$ (the diagram only shows cross-shaped symbols that represent the reference points). Repetition of this process causes the reference point to approach the central point $E[x_n]$ that is the expected value of the range of the possible positions of the received symbol (the expected value of the possible complex amplitude value of the received symbol). The ranges of the symbol positions (the range indicated by the circles) and the central points $E[x_n]$ that are the expected values of the ranges are determined from the reception positions of the received symbols and their average values, respectively.

The correction distance from the reference point $r_{n-1}$ to the reference point $r_n$, and the correction distance from the reference point $r_n$ to the reference point depend on the value of $\mu$ in the expression [1]. When the value is less than $10^{-10}$, the convergence is slow. When the value exceeds 0.1, the convergence is rapid but this is a cause of an unstable operation.

Alternatively of repetition of updating the reference point of the reference signal based on the correction process can cause all the reference points in the reference signal to have forms conforming to the distortion of the received symbol. Consequently, even in the case where the received symbol has a distortion caused on the transmission side, decision can be made where the adverse effects of the distortion have been eliminated, the decision-directed adaptive equalizer and the section of calculating the amount of phase correction can normally operate, and the signal can be received without reducing the signal quality.

The timing and the number of received symbols based on which the correction and the update are performed are not limited to specific ones, and appropriate selection can be made in conformity with the purpose.

Figure 18:
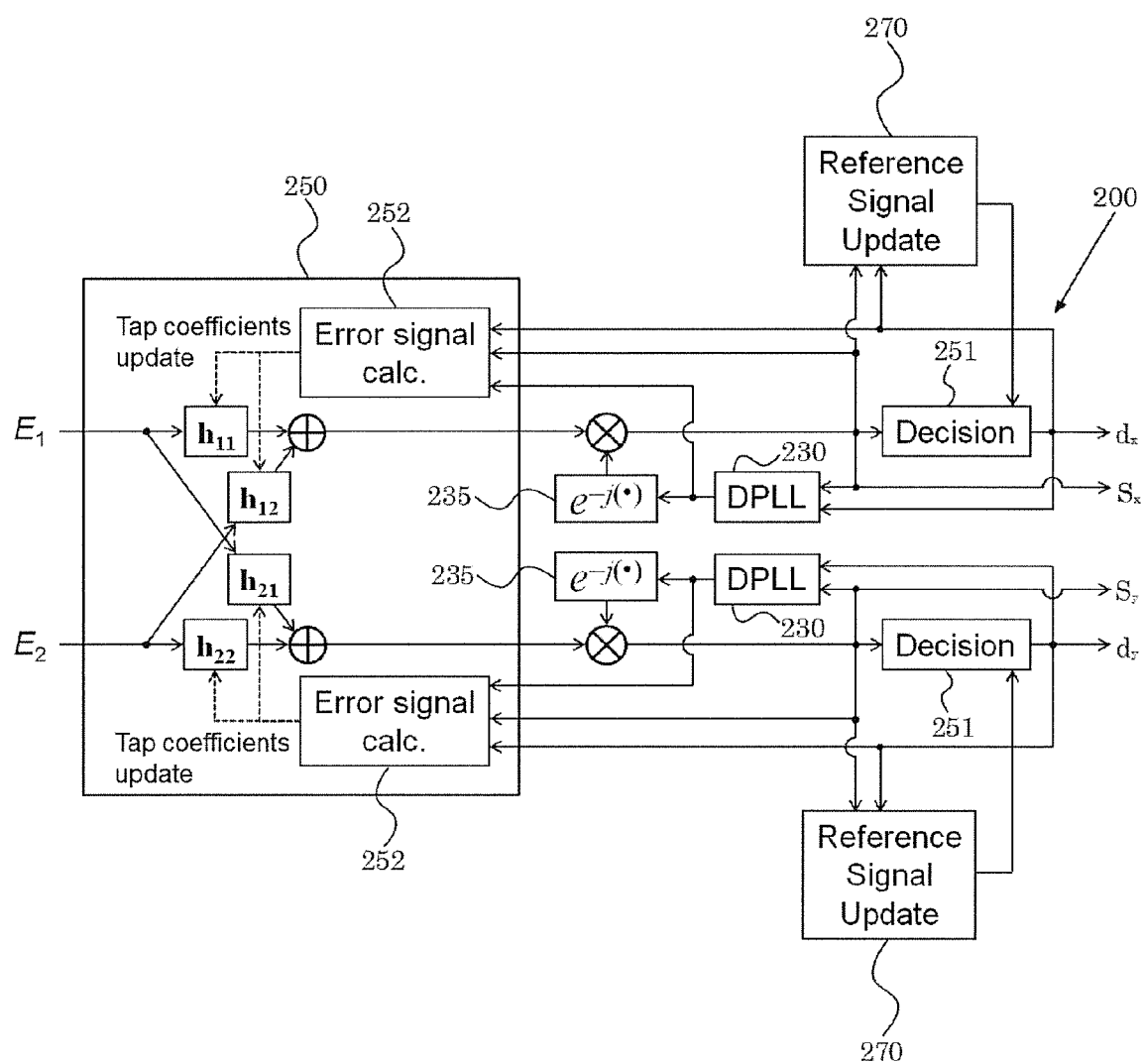
FIG. 18 is a circuit diagram of showing a configuration example of a received signal processing device.

A specific configuration example of the case where the actual decision section that corrects and updates the reference signal is integrated in the single received signal processing device is shown in FIG. 18. FIG. 18 is a circuit diagram of showing the configuration example of the received signal processing device.

As shown FIG. 18, the received signal processing device 200 includes: an adaptive equalizer 250 including a 2×2 butterfly configuration FIR filter and an error signal calculation section and tap coefficient control section 252; a decision element 251; a digital phase locked loop 230; and a phase correcting section 235, the device further including a reference signal updating section 270.

The reference signal updating section 270 corrects the position of the reference point r coinciding with the decided symbol $d_x$ among the reference points constituting the reference signal, on the basis of the input received symbol $s_x$ and decided symbol $d_x$, so as to approach the position of one received symbol x constituting the received symbol $s_x$ on the complex plane according to the expression [1], and performs the updating process of sequentially reflecting the position information on the corrected reference point r on the complex plane in the reference signal to be used in the decision element 251. Alternatively times of repetition of correcting the reference point r in the reference signal updating section 270 and updating the reference point r for the decision element 251 according to the correction of the reference point r can update all the reference points in the reference signal to have desired forms. The decision element 251 decides the reference point r having the shortest Euclidean distance on the complex plane to the subsequent received symbol $s_x$ on the basis of the reference signal updated according to the distortion of the received symbol $s_x$, and outputs the result as a decided symbol $d_x$. This element also makes decision for the received symbol $s_y$ based on the input signal $E_2$ of the Y-polarization component on the basis of the reference signal updated according to the distortion as with the case of the received signal $s_x$, and outputs the result as a decided symbol $d_y$.

Except for executing the process of updating the reference signal of the decision element 251 on the basis of the correction process in the reference signal updating section 270, and for executing the process of calculating the amount of phase correction, the equalization process and the polarization separation process that are for the sake of the carrier recovery, according to the decision signal output from the decision element 251 on the basis of the updated corrected signal, signal processing for the received signal according to procedures of the process of calculating the amount of phase correction, the equalization process and the polarization separation process that are publicly known can obtain the demodulated signal that is the object. The demodulated signal may be the decided symbols $d_x$ and $d_y$ themselves. Alternatively, the signal may be decided symbols obtained by inputting the symbols $s_x$ and $s_y$ having been subjected to each item of the signal processing into a decision element separately provided outside of the received signal processing device 200. In the latter case, the decision element 251 and the decision element separately provided outside may execute decisions according to different decision rules.

The received signal to which the received signal processing device is applicable is not limited to specific one. The signal may be any of a BPSK signal, a QPSK signal and a QAM signal having multi-level complex amplitudes.

Figure 19:
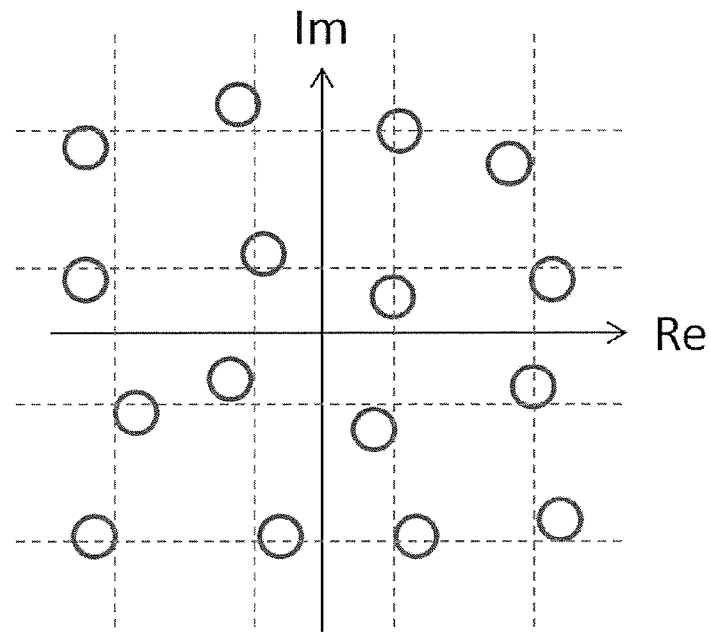
FIG. 19 is a diagram showing a constellation of another signal that can be processed by the received signal processing device.

The received signal processing device is also applicable to any signal having a waveform distortion other than the constellation waveforms shown in FIGS. 14A to 14C unless the range of the possible expected position of the received symbol exceeds the threshold of the ideal wavelength constellation. For example, the device is also applicable to a signal having a constellation as shown in FIG. 19. FIG. 19 is a diagram showing the constellation of another signal that can be processed by the received signal processing device.

On the basis of the above description, a more specific embodiment of the received signal processing device according to the present invention is now described.

Figure 20:
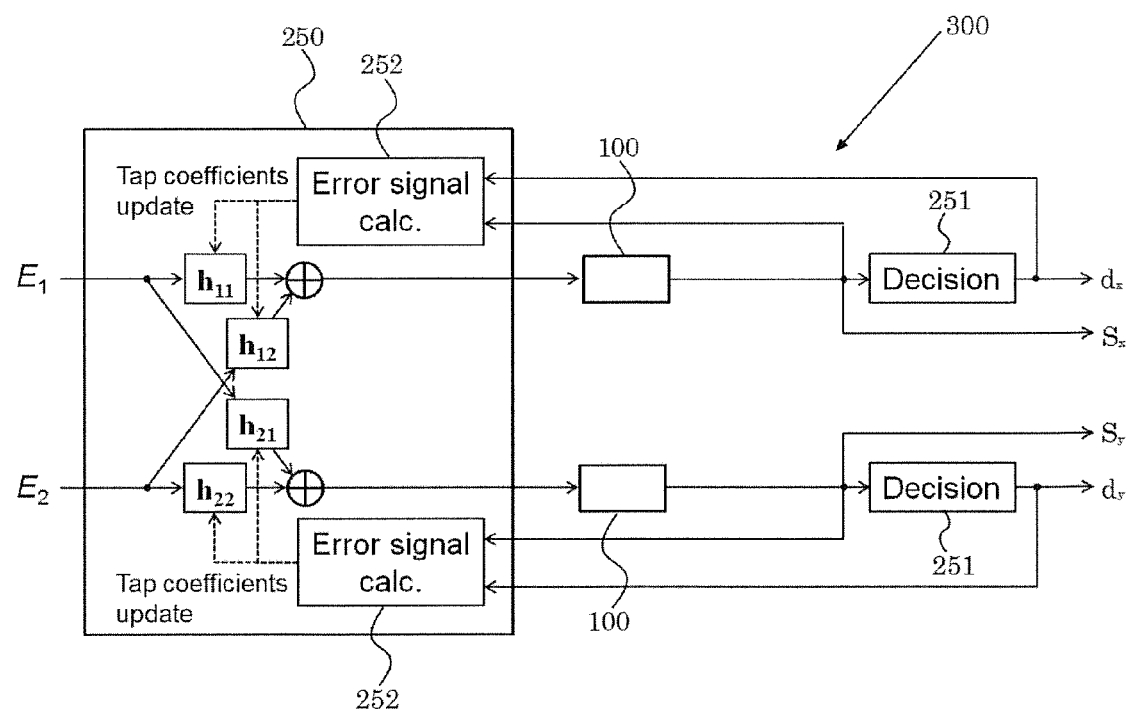
FIG. 20 is a circuit diagram showing a configuration example of a received signal processing device that includes an adaptive equalizer (AEQ) and a carrier recovery unit.

First, such an embodiment may be a received signal processing device that includes the adaptive equalizer (AEQ) and the carrier recovery unit as shown in FIG. 20. FIG. 20 is a circuit diagram showing a configuration example of the received signal processing device that includes the adaptive equalizer (AEQ) and the carrier recovery unit.

As shown in FIG. 20, the received signal processing device 300 pertains to an example where the circuit configuration of the carrier recovery unit 100 included in the received signal processing device shown in FIG. 1 is applied to the received signal processing device shown in FIG. 16, replacing the DPLL 230.

Such a received signal processing device 300 adopts the carrier recovery unit 100 instead of the DPLL 230. Consequently, the device is applicable to optical communication with a high symbol rate, allows accurate carrier recovery for a multi-level signal, such as QAM signal, and enables the adaptive equalizer 250 to control the tap coefficient so as to minimize the difference between the received signal and the decision signal output from the decision element 251.

Figure 21:
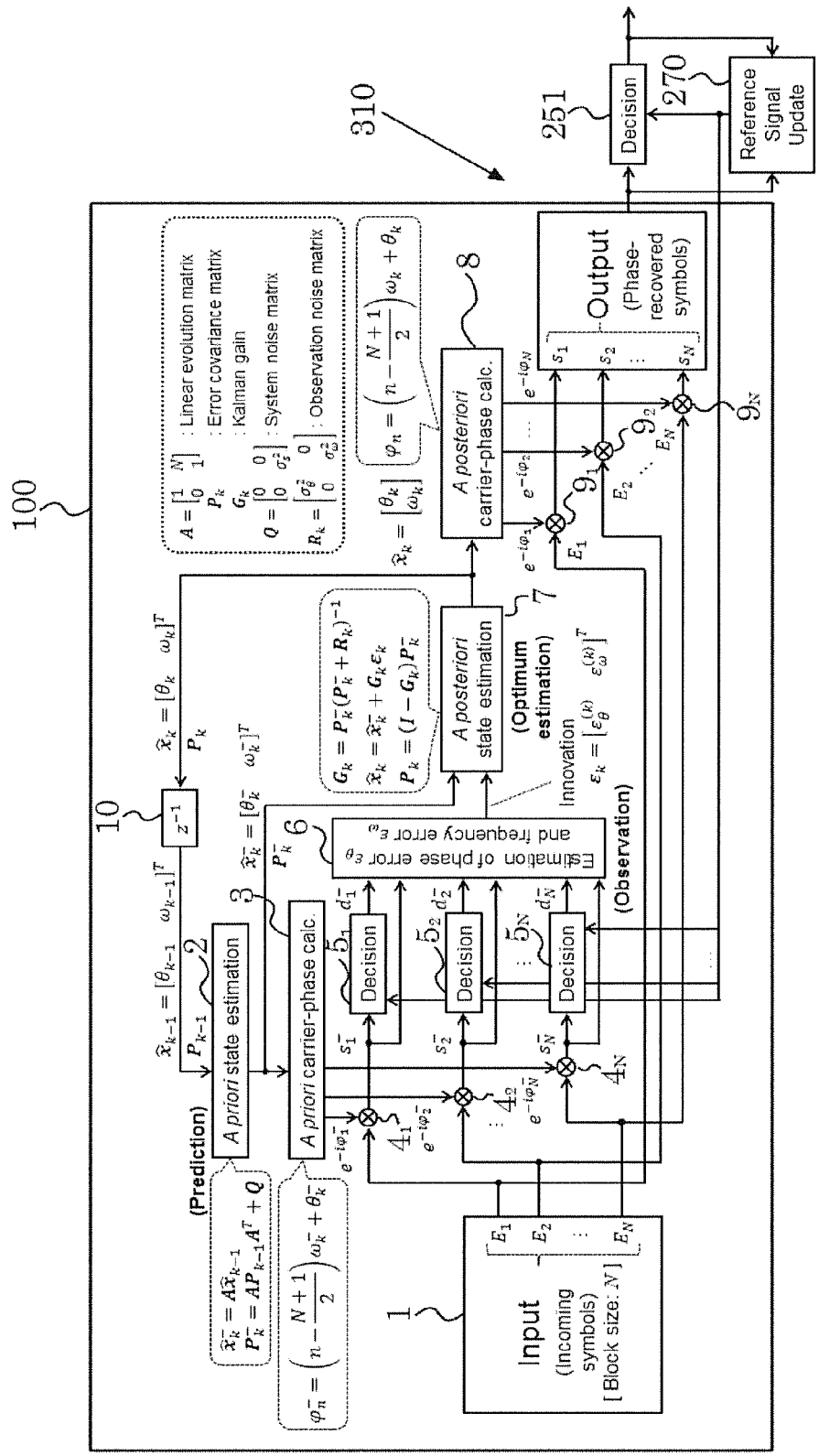
FIG. 21 is a circuit diagram showing a configuration example of a received signal processing device that includes a carrier recovery unit and an actual decision section.

Next, the device may be a received signal processing device that includes the carrier recovery unit, and the actual decision section as shown in FIG. 21. FIG. 21 is a circuit diagram showing a configuration example of a received signal processing device that includes a carrier recovery unit and an actual decision section.

As shown in this FIG. 21, the received signal processing device 310 includes: the carrier recovery unit 100 included in the received signal processing device shown in FIG. 1; and the actual decision section that includes the decision element 251 and reference signal updating section 270 shown in FIG. 18.

As with the received signal processing device 300, such a received signal processing device 310 can achieve accurate carrier recovery, and further allow the reference signal updating section 270 to correct the reference point of the reference signal to be used in the decision element 251 and perform a feedback process of the corrected result to the decision sections $5_1, 5_2, \ldots, 5_N$ in the carrier recovery unit 100 to apply the result to the next decision, thereby allowing decision while eliminating the adverse effect of the distortion occurring on the transmission side even when the received symbol has the distortion.

Figure 22:
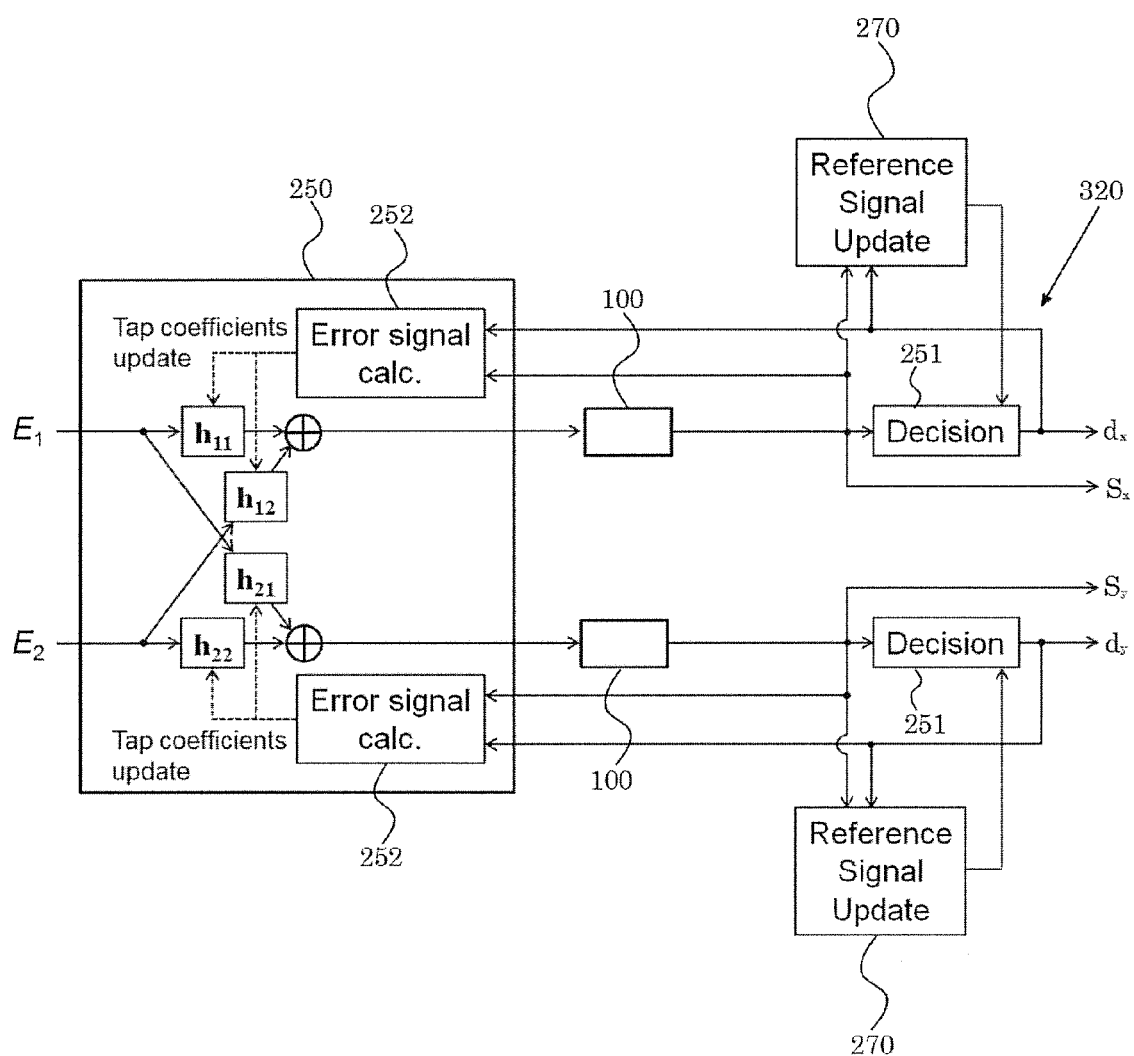
FIG. 22 is a circuit diagram showing a configuration example of a received signal processing device that includes an adaptive equalizer (AEQ), a carrier recovery unit and an actual decision section.

Next, the device may be a received signal processing device that includes the adaptive equalizer (AEQ), the carrier recovery unit, and the actual decision section as shown in FIG. 22. FIG. 22 is a circuit diagram showing a configuration example of the received signal processing device that includes the adaptive equalizer (AEQ), the carrier recovery unit, and the actual decision section.

As shown in this FIG. 22, the received signal processing device 320 includes: the adaptive equalizer 250 shown in FIG. 16; the carrier recovery unit 100 included in the received signal processing device shown in FIG. 1; and the actual decision section that includes the decision element 251 and reference signal updating section 270 shown in FIG. 18.

As with the received signal processing device 300, such a received signal processing device 320 can perform accurate carrier recovery and optimally control the tap coefficient. Furthermore, as with the received signal processing device 310, the device 320 can perform decision eliminating the adverse effect of the distortion occurring on the transmission side even when the received symbol has the distortion.

(Received Signal Processing Method)

A received signal processing method of the present invention is a received signal processing method that regards, as one process, phase compensation for one separated symbol group acquired by separating every certain number of symbols of a modulated received signal and making the symbols form a block, and sequentially performs the process multiple times according to the number of the separated symbol group, the method including a separation and output step, an a priori state estimation step, a provisional compensation step, a decision step, an error estimation step, an a posteriori state estimation step, an actual compensation step, and a feedback processing step.

The separation and output step temporally separates the symbols, having been input into the block in a constant time interval, for every constant number of the symbols to obtain the separated symbol group, and outputs the group in a sequence of the separated symbols constituting the separated symbol group.

Although the number of symbols in the separated symbol group obtained by the separation and output step is not limited to a specific number, it is preferable that this number range from 2 to 1,024.

The a priori state estimation step is a step of obtaining the intra-block a priori estimation frequency and the intra-block a priori estimation central phase, as the a priori estimates that are estimates of the values processed this time, from one intra-block frequency determined on the basis of the phase variation of each of the separated symbols with respect to the time, and the values of the one intra-block central phase processed last time determined as the temporal center of phase of each of the separated symbols.

The provisional compensation step is a step of calculating the a priori estimation phase of each of the separated symbols from the a priori estimate, and provisionally compensating the phase of each of the separated symbols on the basis of the a priori estimation phase.

The decision step is a step of regarding, as the symbol before decision, each of the separated symbols whose phase has been provisionally compensated, performing decision for the symbol before decision on the basis of the reference signal set according to the modulation scheme of the received signal, and obtaining the symbol after decision that coincides with the reference point of the reference signal.

The error estimation step is a step of calculating the frequency error between the observed value of the intra-block frequency and the intra-block a priori estimation frequency which are determined on the basis of the symbol before decision and the symbol after decision, and calculating the phase error between the observed value of the intra-block central phase and the intra-block a priori estimation central phase which are determined on the basis of the symbol before decision and the symbol after decision.

Although the error estimation step is not limited to a specific one, it is preferred to calculate the frequency error and the phase error through maximum likelihood estimation.

The a posteriori state estimation step is a step of correcting the a priori estimates on the basis of the frequency error and the phase error, and obtaining an intra-block a posteriori estimation frequency and intra-block a posteriori estimation central phase as a posteriori estimates obtained by estimating the most likely values processed this time that are of the intra-block frequency and the intra-block central phase.

Preferably, the a posteriori state estimation step is executed by a Kalman filter that outputs the a posteriori state vector as the a posteriori estimate and the a posteriori error covariance matrix where the a priori estimate and the value of the a priori error covariance matrix have been corrected, on the basis of the input of the a priori error covariance matrix for controlling the frequency error, the phase error, the a priori state vector as the a priori estimate, and the gain.

The actual compensation step is a step of calculating the a posteriori estimation phase of each of the separated symbols from the a posteriori estimate, and actually compensating the phase of each of the separated symbols on the basis of the a posteriori estimation phase.

The feedback processing step is a step of performing a feedback process so that the a priori state estimation step can adopt the a posteriori estimates as the values processed last time of the intra-block frequency and the intra-block central phase, and obtaining the a priori estimates for the separated symbol group in the next phase compensation.

In the case where the a posteriori state estimation step is executed by the Kalman filter, the feedback processing step can perform feedback process to provide the a posteriori estimate and the a posteriori error covariance matrix for an execution section of the a priori state estimation step, thereby allowing the a priori state estimation step to provide the Kalman filter with these items as the a priori estimate and the a priori error covariance matrix for the next phase compensation.

The items other than the above items can be configured by applying the items described on the received signal processing device.

The received signal processing method described above can be applied to optical communication with a high symbol rate and achieve accurate carrier recovery even for a multi-level signal, such as QAM signal.

<Received Signal Processing Method (Configuration Example Including Actual Decision Step)>

Preferably, the received signal processing method of the present invention is executed by including: an actual decision step of deciding the reference point having the shortest Euclidean distance on the complex plane from multiple reference points constituting the reference signal determined according to the modulation scheme of the digital modulation to one received symbol of the digitally modulated received signal (here, each of the separated symbols with actually compensated phases); and a reference signal update step of correcting a position of the actually decided reference point so as to approach the position of the received symbol on the basis of the following expression [1], and updating the reference point of the reference signal used in the actual decision step to the corrected reference point.

Appropriate times of repetition of updating the reference signal through such a reference signal update step can update all the reference points in the reference signal so as to coincide with the expected value of the possible complex amplitude value of the received symbol, and can normally operate a decision-directed adaptive equalizer or a section of calculating the amount of phase correction and receive the signal without reducing the signal quality even in the case where the transmission signal has a distortion.

In this Description, the term "actual decision step" is used to have the meaning of a decision step that has a step of correcting the reference signal in the decision step that performs final decision in the received signal processing method. Thus, in the case where only one decision step included in the received signal processing method performs decision for executing decision-directed carrier recovery and adaptive equalization and provides the final decision result, the decision element provided with a step of correcting the reference signal is called "actual decision step". On the other hand, in the case where a decision step in order to execute carrier recovery is provisionally executed and another decision step of executing the final decision for the carrier-recovered received signal is separately executed, the decision step that performs the final decision and is provided with the step of correcting the reference signal is called "actual decision step".

$$r_{n+1} = r_n + \mu(x_n - r_n) \quad [1]$$

In the expression [1], n denotes the number of updating the reference point, $r_n$ denotes a two-dimensional vector representing the position of the reference point on the complex plane subjected to the n-th updating, $x_n$ denotes a two-dimensional vector representing the position of the received symbol on the complex plane subjected to the n-th updating, $\mu$ represents an infinitesimal numerical value that is $10^{-10}$ or more and 0.1 or less, and $r_{n+1}$ denotes a two-dimensional vector representing the position of the corrected reference point on the complex plane.

Preferably, the received signal processing method includes a step of calculating the amount of phase correction. This step adopts, as a control signal, the phase difference between the received signal and the decision signal that is a decision result of the actual decision step based on the reference signal updated by the reference signal update step with respect to the received signal, and calculates the amount of phase correction according to the phase variation of the received signal occurring owing to the fluctuation of the frequency difference between the carrier frequency and the local oscillatory frequency. Adoption of such a step of calculating the amount of phase correction can achieve the carrier recovery based on the control signal.

Preferably, the received signal processing method includes an adaptive equalization step. This step adopts, as the error signal, the difference between the received signal whose noise component has been filtered out through a finite impulse response (FIR) filter and the decision signal that is a decision result of the actual decision step based on the reference signal updated by the reference signal update step with respect to the received signal, controls the tap coefficient of the FIR filter so that the error signal can have the minimum intensity, and performs the equalization process for the subsequent received signal. Adoption of such an adaptive equalization step can achieve the equalization process (filtering process) where the received signal has the maximum quality. Preferably, the adaptive equalization step further includes a polarization separation processing step that applies a polarization separation process to the polarization-multiplexed received signal. Adoption of such a polarization separation step can achieve the equalization process for the polarization-multiplexed received signal.

Each item of the signal processing in the received signal processing method can be executed using the received signal processing device of the present invention.

(Communication System)

A communication system of the present invention includes: a receiver that includes the received signal processing device provided with the actual decision section; a transmitter that transmits a transmission signal to the receiver; and a transmission path for transmitting the transmission signal transmitted from the transmitter, to the receiver. The transmitter adopts, as the distortion of the transmission signal, information based on the difference between the received signal received by the receiver and the decision signal as the decision result by the decision element based on the reference signal updated by the reference signal update section, and performs a feedback process to achieve the state with no distortion.

That is, the decision signal output from the received signal processing device of the present invention has information pertaining to the distortion of the transmission signal. This information can be fed back to the transmission side to be used to eliminate the distortion of the transmission signal. As a result, an intrinsic penalty caused by the distortion of the transmission signal can be eliminated, which can further improve the demodulated signal quality.

Except the received signal processing device, the receiver and the transmitter and the transmission path can be constructed according to publicly known configurations. The transmission path may be a publicly known optical fiber that transmits signals over a long distance, and the like.

Examples

The details of an experiment to which the received signal processing device and the received signal processing method are applied, and the advantageous effects confirmed by the experiment are described. The received signal processing device and the received signal processing method of the present invention are applicable to signals according to any modulation scheme. Here, single polarized 16QAM and 64QAM signals with a symbol rate of 12 Gbaud were used as transmission signals.

Figure 3:
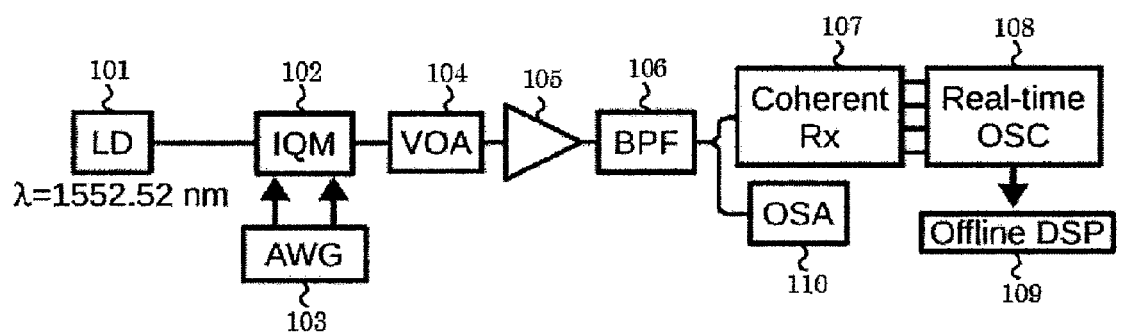
FIG. 3 is a diagram illustrating a communication system used for an experiment.

FIG. 3 shows a diagram illustrating a communication system used in this experiment. As shown in FIG. 3, the communication system includes a laser diode (LD) 101, an IQ modulator (IQM) 102, an arbitrary waveform generator (AWG) 103, a variable optical attenuator (VOA) 104, an optical amplifier 105, a band-pass filter (BPF) 106, a coherent receiver 107, a real-time oscilloscope 108, an offline digital signal processor (DSP) 109, and an optical spectrum analyzer (OSA) 110.

The laser diode 101 outputs continuous light with a frequency of 193.1 THz (wavelength; 1,552.52 nm).

The continuous light output from the laser diode 101 is vector-modulated by the IQ modulator 102, which is a Mach-Zehnder vector modulator, and the 16QAM and 64QAM signals are generated. These modulated signals are obtained using coding with Gray code from pseudo-random bit sequence (PBRS) with a length of $2^{15}-1$.

Electric signals corresponding to the in-phase and quadrature components of the modulated signal output from the arbitrary waveform generator 103 are applied to the IQ modulator 102.

The optical signal to noise ratios (OSNR) of the transmitted 16QAM and 64QAM signals were adjusted using the variable optical attenuator 104 and the optical amplifier 105. Subsequently, the signal out-band optical noise caused owing to optical amplification was removed through the band-pass filter 106. The signals are then received by the coherent receiver 107. Adjustment of the optical signal to noise ratio was executed by setting the input power into the coherent receiver 107 to a constant value of 1 mW and adjusting the amount of attenuation of the variable optical attenuator 104 and the gain of the optical amplifier 105. Furthermore, measurement of the optical signal to noise ratio was executed by the optical spectrum analyzer 110 arranged in parallel to the coherent receiver 107.

The coherent receiver 107 includes a local oscillator (LO) light source, a 90-degree optical hybrid section, and a balanced photodiode. The 16QAM signal and 64QAM signal output from the balanced photodiode were analog-to-digital converted by the real-time oscilloscope 108 at a sampling rate of 80 GSa/s, and saved in the offline digital signal processor 109. The received signal processing device according to Example having a configuration analogous to that of the received signal processing device shown in FIG. 1 was embedded in the offline digital signal processor 109. After application of anti-aliasing filter, resampling was performed at 24 GSaJs, which corresponded to oversampling rate=2, retiming was performed so that the timing could coincide with that at transmission, and subsequently carrier recovery was performed by the received signal processing device according to Example. Subsequently, phase-recovered 16QAM signal and 64QAM signal was demodulated, and the signal quality, such as bit error rate, was evaluated.

A personal computer was adopted as the digital signal processor 109. Each of signal processors including the received signal processing device according to Example was constructed on Matlab, which is calculation software operated on the personal computer.

Initial values of some parameters were set for signal processing based on the received signal processing device according to Example. First, the initial value $P_o$ of the error covariance matrix was configured as a zero matrix of two rows and two columns.

The system noise power $\sigma_f^2$ of this experimental system was configured as $10^{-9}$, and the matrix Q was fixed. In the case where the noise characteristics of the laser diode 101 vary, the value is required to be varied accordingly. However, the same laser was always used here, and the matrix Q was kept fixed. It is assumed that the observation noises $\sigma_\theta^2$ and $\sigma\omega^2$ have initial values of $10^{-2}$ and $10^{-3}$, respectively, and, after a number of observation samples that are statistically sufficient to some extent are obtained during execution of the received signal processing according to Example, a statistically obtained error variance value is used in relation to the error between the observed phase and frequency, and the matrix $R_k$ is appropriately updated.

The phase $\theta_0$ in relation to the initial value $x_0$ of the state vector is configured to be zero, while a value that is correct to some extent is required to be input in relation to the frequency $\omega_0$. In this experiment, for the initially input 1,024 symbols, the scheme described in the following Reference Literature 5 was adopted. That is, this scheme fast Fourier transforms the complex amplitude to the power of four, regards the frequency component that provides the maximum spectral intensity as the approximate value of the carrier frequency, and adopts the value as the initial value of the frequency $\omega_0$.

Reference Literature 5: M. Selmi et al., "Accurate Digital Frequency Offset Estimator for Coherent PolMux QAM Transmission Systems," Proc. ECOC2009, P3.08 (2009).

Figure 4A:
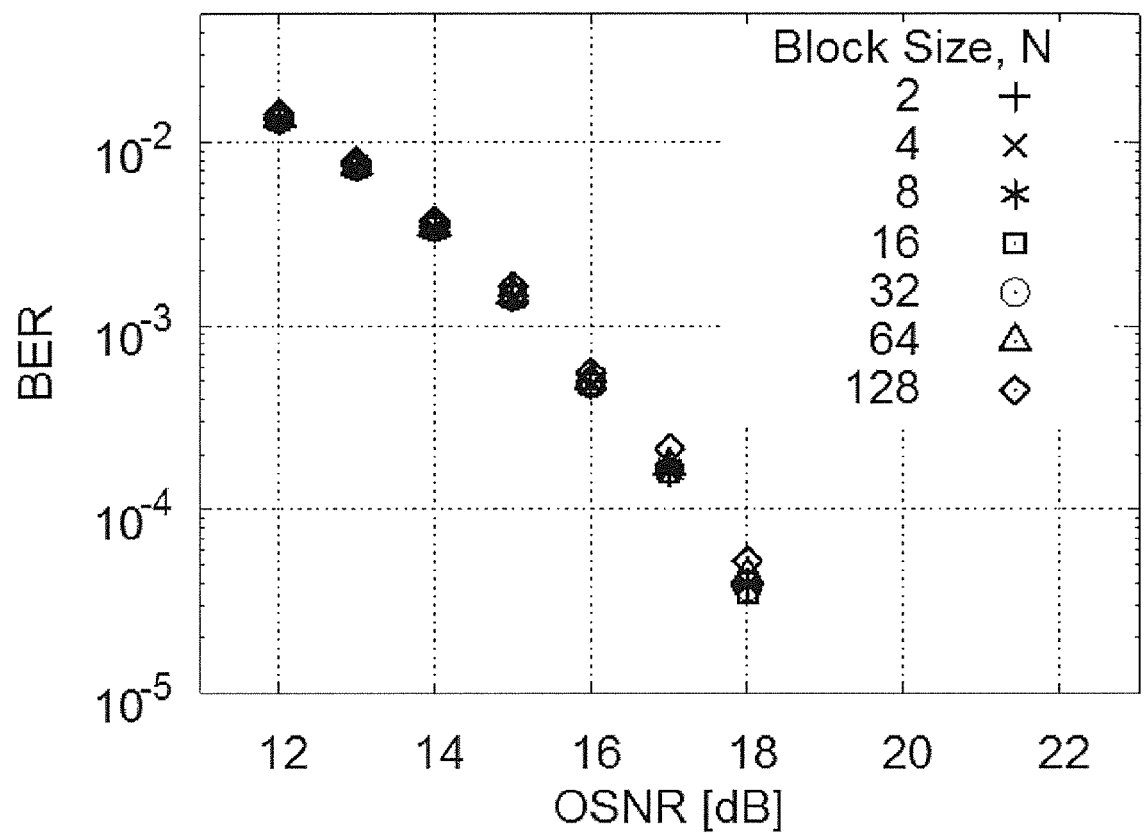
FIG. 4A is a diagram showing a measurement result of the bit error rate (BER).
Figure 4B:
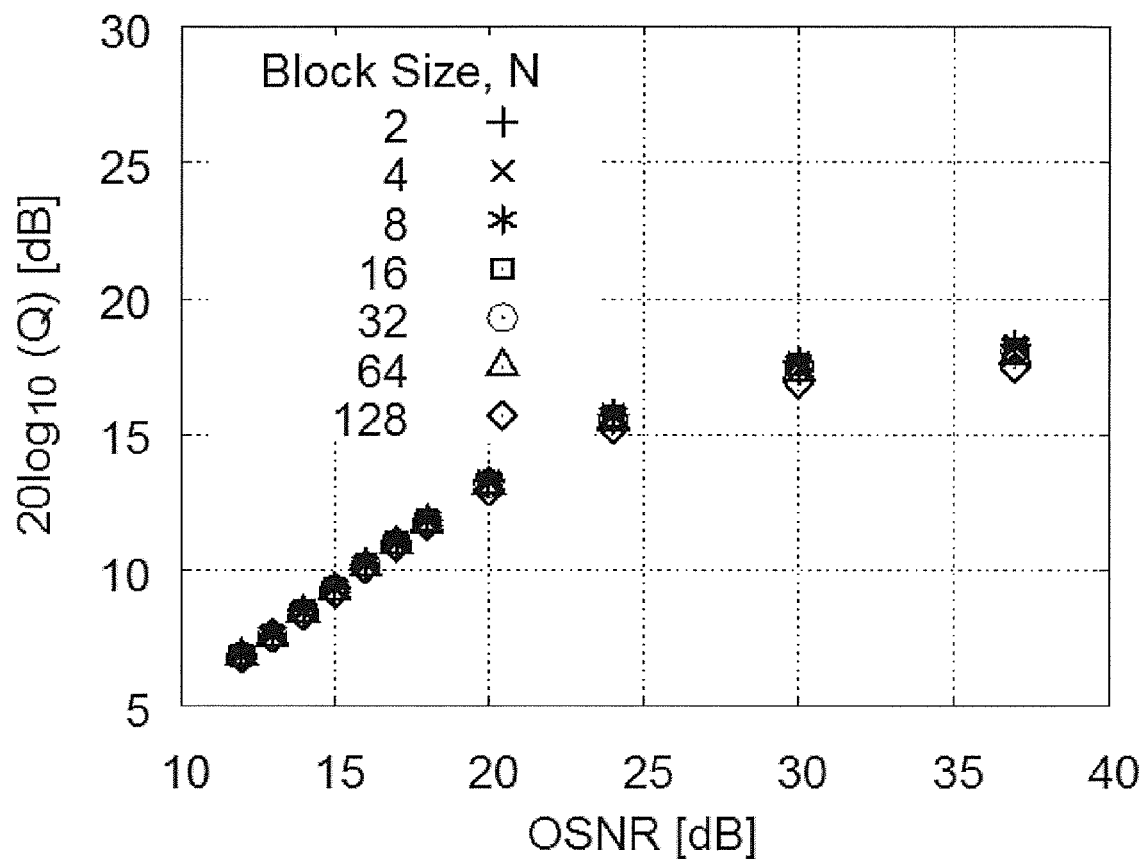
FIG. 4B is a diagram showing a measurement result of a Q factor.

In the above experimental condition, first, the 16QAM signal was received while being varied to have the optical signal to noise ratio (OSNR) from 12 dB to 37 dB, and demodulated by the offline digital signal processor 109. The separation and output section of the received signal processing device had a block size of $N=2^m$ (m=2, 3, . . . , 7), and measurement results of bit error rate (BER) and Q factor (the square of Q value was represented in dB; 20 log 10(Q)[dB]) are shown in FIGS. 4A and 4B. FIG. 4A is a diagram showing a measurement result of bit error rate (BER). FIG. 4B is a diagram showing a measurement result of Q factor.

As shown in these FIGS. 4A and 4B, it can be understood that in the case with any block size, the demodulation process including carrier recovery was succeeded, and the bit error rate (BER) was correctly measured. It can be understood that increase in block size slightly degraded the BER and the Q factor specifically when the optical signal to noise ratio (OSNR) was high.

Figure 5:
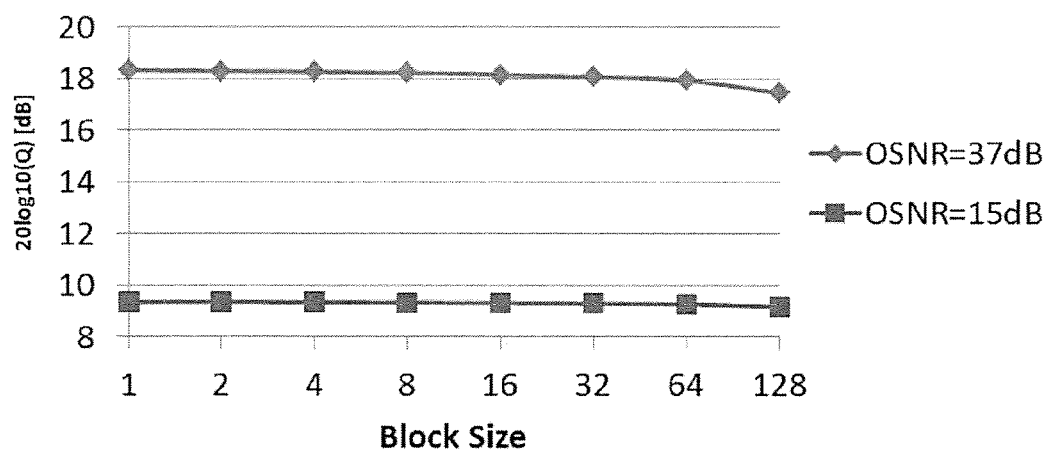
FIG. 5 is a diagram showing the block size dependence of Q factor.

FIG. 5 shows the block size dependence of the Q factor in the cases where the optical signal to noise ratio (OSNR) is 37 dB and 15 dB.

As shown in this FIG. 5, in the case where the optical signal to noise ratio (OSNR) is 37 dB, the Q factor for the block size N of 2 was 18.3 dB, the Q factor for the block size N of 16 was 18.1 dB, and the Q factor for the block size N of 128 was 17.5 dB. It was thus confirmed that increase in block size reduced the Q factor, which degraded the signal quality.

Figure 6A:
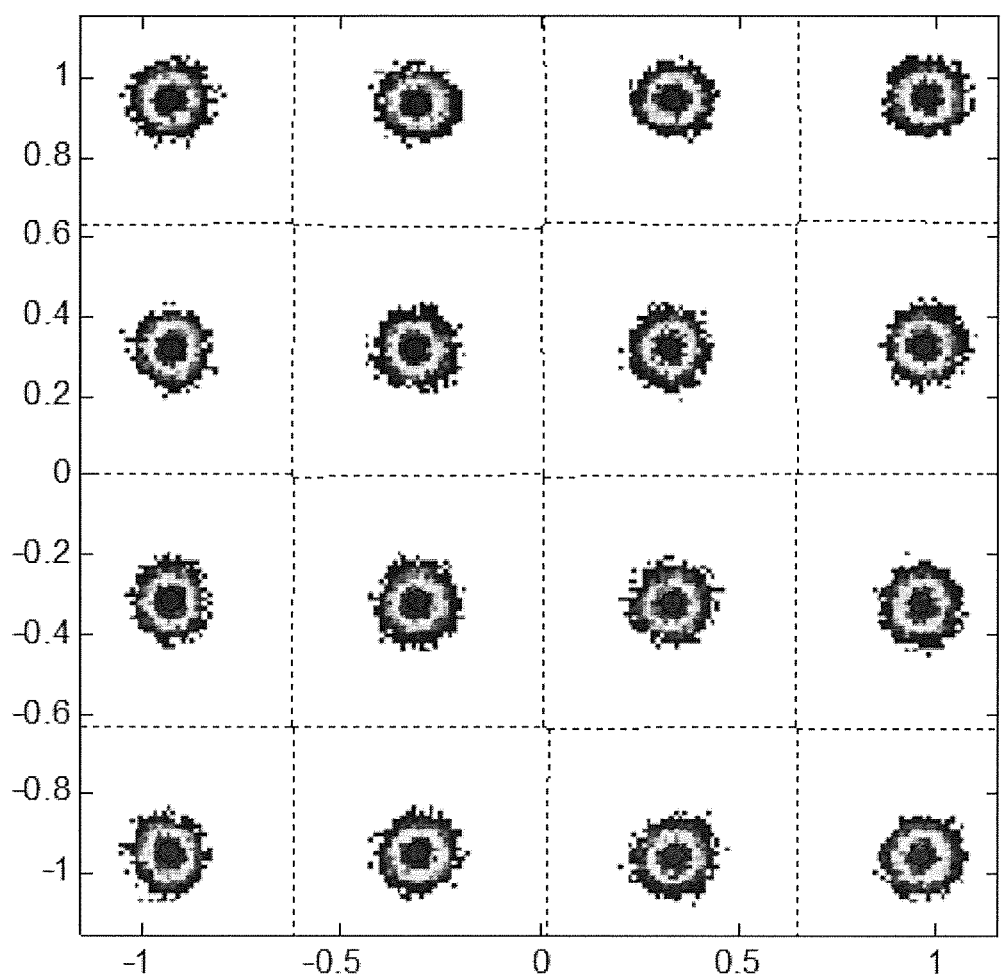
FIG. 6A is a diagram showing a constellation in the case where the block size N is two.
Figure 6B:
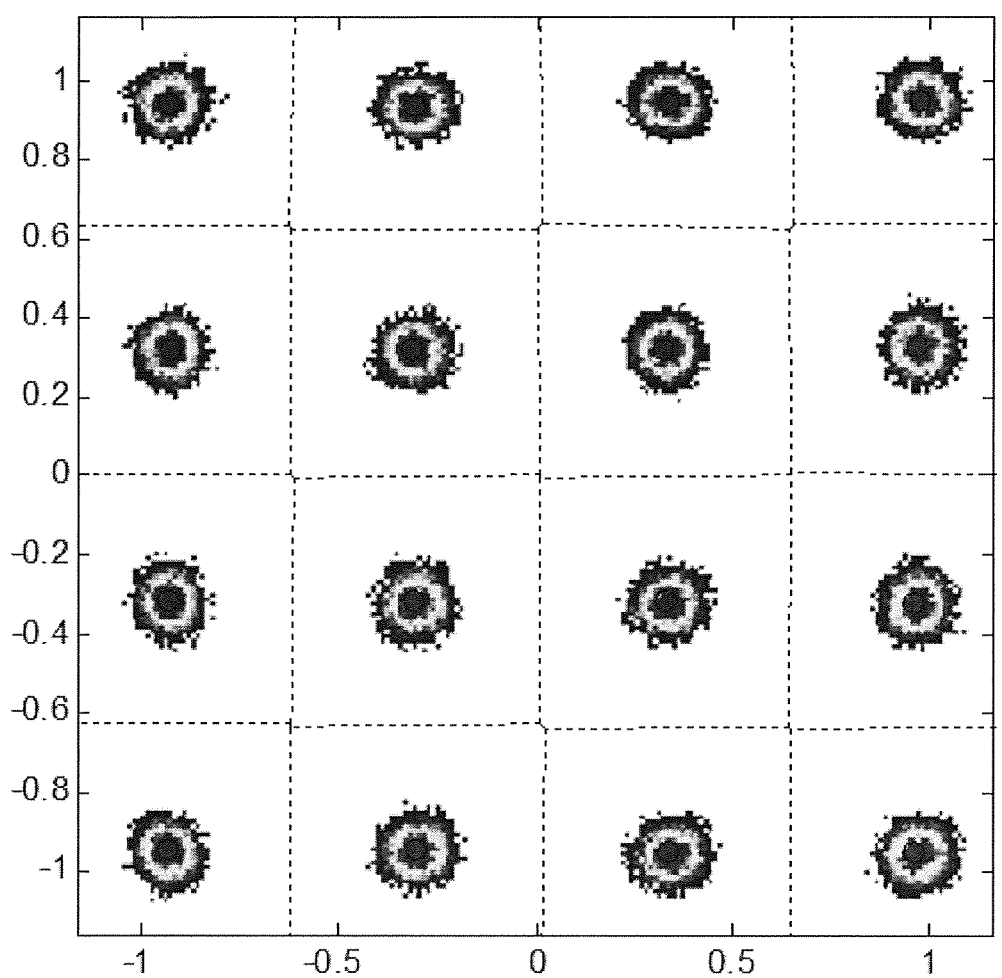
FIG. 6B is a diagram showing a constellation in the case where the block size N is 16.
Figure 6C:
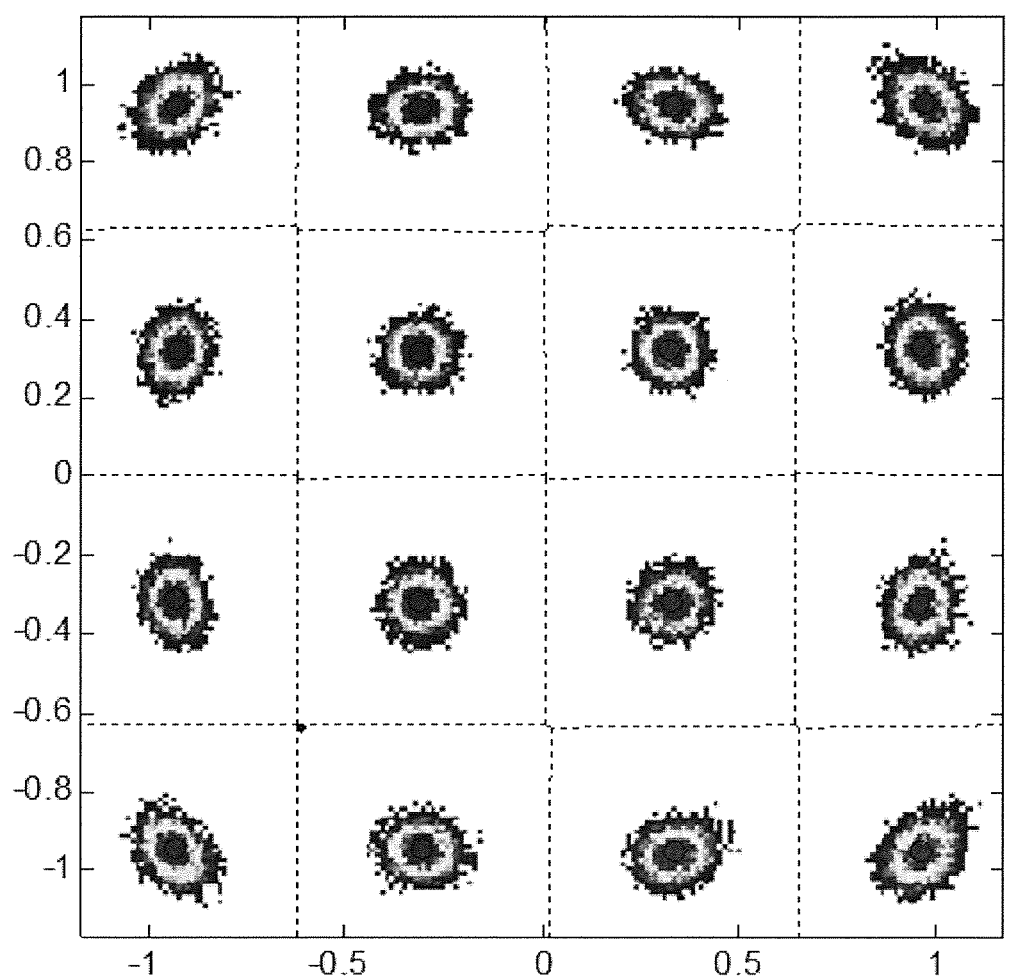
FIG. 6C is a diagram showing a constellation in the case where the block size N is 128.

In this context, the constellations of received symbols in the cases where the optical signal to noise ratio (OSNR) was 37 dB and the block sizes N are 2, 16 and 128 were shown in FIGS. 6A to 6C. FIG. 6A is a diagram showing the constellation in the case where the block size N was 2. FIG.

6B is a diagram showing the constellation in the case where the block size N was 16. FIG. 6C is a diagram showing the constellation in the case where the block size N was 128.

As shown in FIGS. 6A to 6C, increase in block size N increased the distortion of constellation, and specifically caused a phase error and resultantly degraded the Q factor. The cause that the large block size N causes the phase error is that the assumption "the carrier frequency offset is kept to have a constant value in the block" becomes unsatisfied. It can be considered that adoption of a laser with a narrower line width as the light source of the signal source or the local oscillator reduces the degree of temporal variation in carrier frequency offset, and resultantly reduces the degradation of the quality in the case with a large block size N.

On the other hand, in FIG. 5, in the case where the optical signal to noise ratio (OSNR) was 15 dB, the amount of degradation of the Q factor against increase in block size N was significantly small. For example, the Q factors in the cases where the block size N was 2 and 128 were 9.36 dB and 9.18 dB, respectively. This is because when the optical signal to noise ratio (OSNR) is low, quality degradation due to amplified spontaneous emission (ASE) noise is dominant to allow the effect of the phase noise accompanying carrier recovery to be substantially ignored. An actual communication system is designed to allow reception while a constant margin is secured on the minimum optical signal to noise ratio (OSNR) that allows error free characteristics through error correction code (FEC: forward error correction code). As an example, in the case of using the error correction code (FEC) provided with an overhead of 7%, the bit error rate (BER) of $3.9 \times 10^{-3}$ or less or the Q factor of 8.5 dB or more can achieve error free characteristics. That is, in such a system, even in the case where the block size N is 128, the amount of degradation of Q factor can be considered approximately 0.2 dB. The value can be that within a sufficiently allowable range.

The symbol rate in this experiment was 12 Gbaud. Consequently, in the case where the block size N was 64, the time corresponding to one block, or 64 symbols, was 5.3 nanoseconds. This time may be converted into the clock frequency of repetitive process on a block-by-block basis, that is, 187.5 MHz. The clock frequency is a low value that can be sufficiently processed by a practical digital signal processor (DSP).

Subsequently, as to the received 16QAM signal, the carrier frequency offset dependence of the demodulated signal quality is described. Here, in the cases where the lasers were configured to have frequencies so that the values of the carrier frequency offsets could range from 0 GHz to about 1.2 GHz and the optical signal to noise ratio (OSNR) of the 16QAM signal was 37 dB and 15 dB, the signal was received and demodulated, and the BER and Q factor for a measurement result of the carrier frequency offset found from a result of carrier recovery were measured, and the carrier frequency offset dependence was confirmed.

Figure 7A:
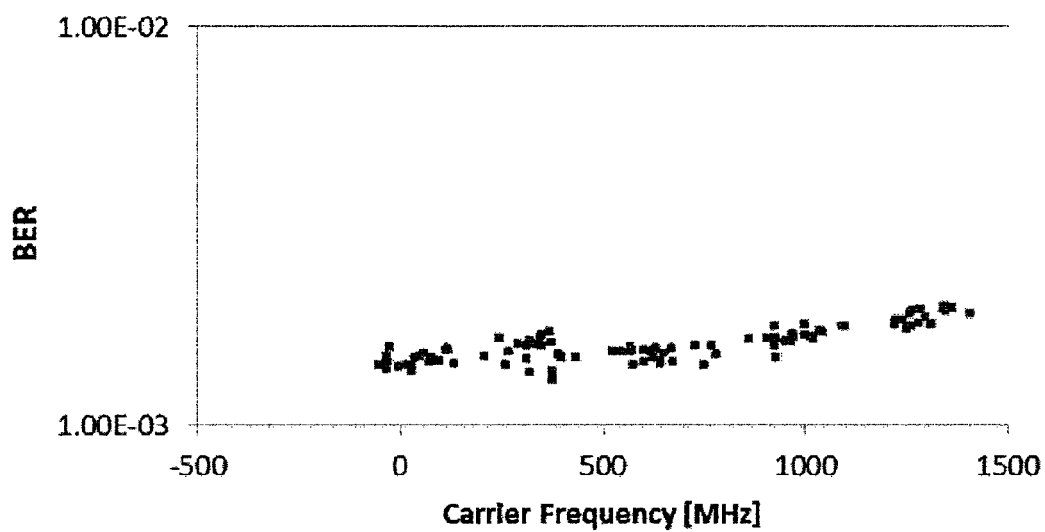
FIG. 7A is a diagram showing a measurement result of the bit error rate (BER) for a measurement result of the carrier frequency offset in the case where the optical signal to noise ratio (OSNR) is 15 dB.
Figure 7B:
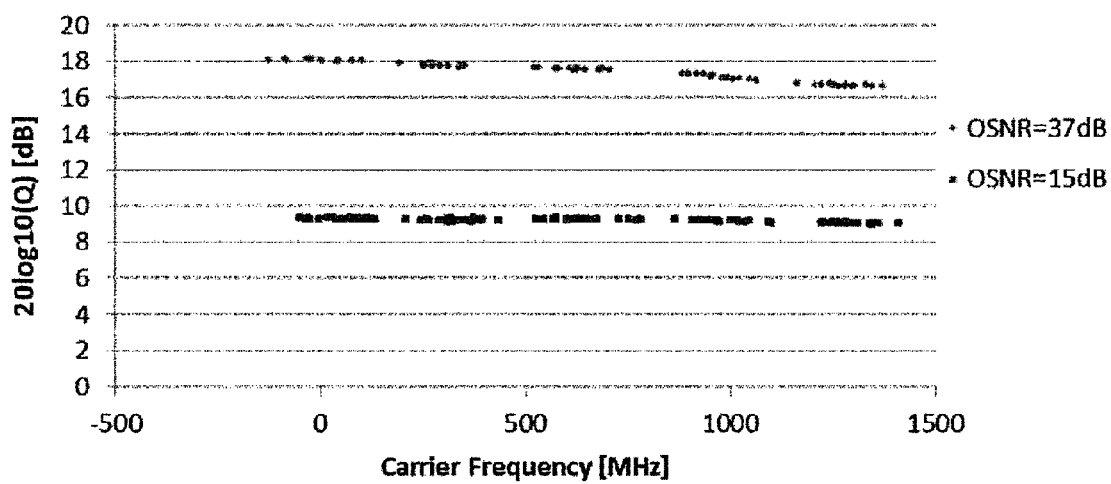
FIG. 7B is a diagram showing a measurement result of the Q factor for a measurement result of the carrier frequency offset in the cases where the optical signal to noise ratio (OSNR) is 15 dB and 37 dB.

FIG. 7A is a diagram showing a measurement result of the bit error rate (BER) for a measurement result of the carrier frequency offset in the cases where the optical signal to noise ratio (OSNR) was 15 dB. Although not shown, in the case where the optical signal to noise ratio (OSNR) was 37 dB, the demodulation process including carrier recovery succeeded for every carrier frequency offset value and no bit error was observed at all in this time. FIG. 7B is a diagram showing a measurement result of the Q factor for a measurement result of the carrier frequency offset in the cases where the optical signal to noise ratio (OSNR) was 15 dB and 37 dB.

As described above, the scheme described in NPL 3 assumes that the carrier frequency offset is zero. Consequently, this scheme cannot perform processing in the case where the carrier frequency offset has a large value. On the contrary, the received signal processing device and the received signal processing method of the present invention can achieve operation even for a large carrier frequency offset value.

Meanwhile, in view of focusing on the Q factor, as shown in FIG. 7B, the value is degraded with increase in carrier frequency offset. The case of an optical signal to noise ratio (OSNR) of 37 dB had a larger amount of degradation than the case 15 dB. In the case of an optical signal to noise ratio (OSNR) of 15 dB, the amount of degradation of the Q factor was small while in view of focusing on the bit error rate (BER), it can be understood that the rate was slightly degraded with increase in carrier frequency offset value (see FIG. 7A).

The cause of degradation of the signal quality in the case with a large carrier frequency offset is considered that the received signal processing device and the received signal processing method of the present invention have a certain amount of estimation error when the carrier frequency is estimated, and the larger the value of the carrier frequency offset, the higher the ratio of the estimation error that is reflected in the phase error is.

Figure 8A:
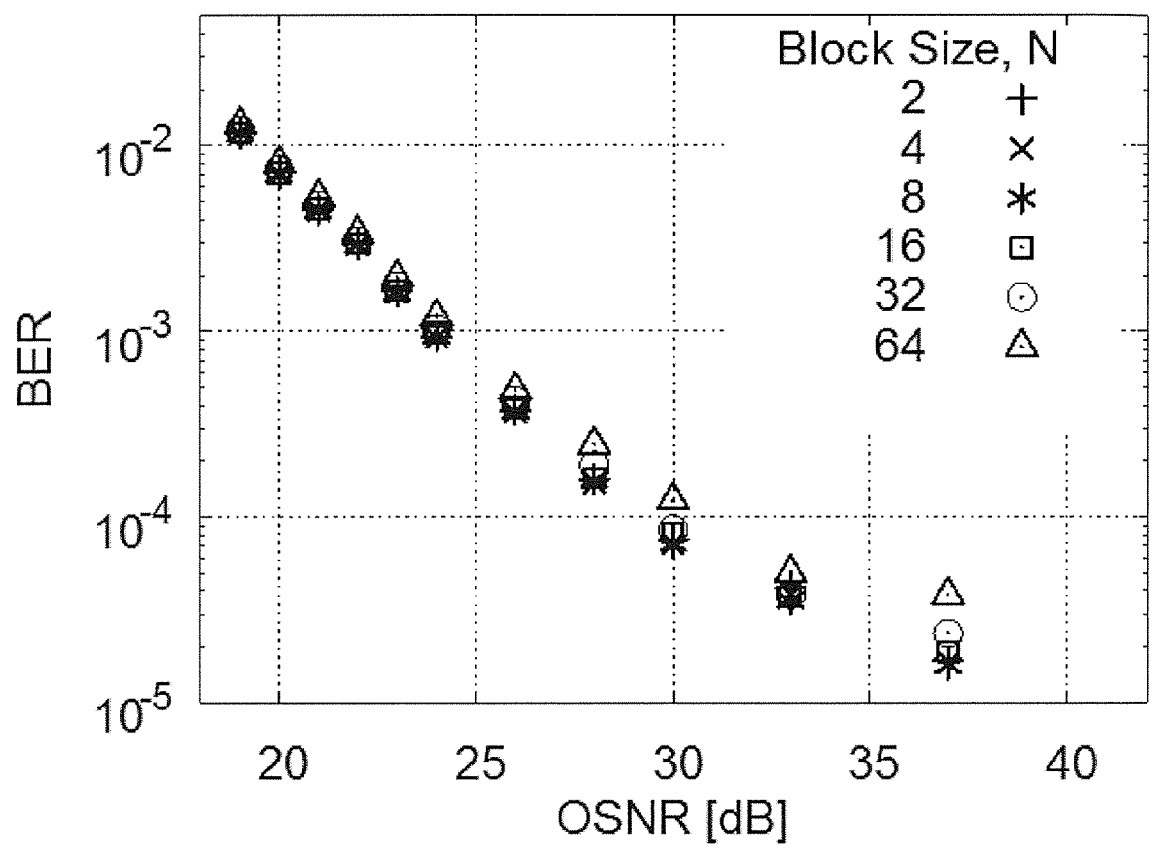
FIG. 8A is a diagram showing a measurement result of the bit error rate (BER).
Figure 8B:
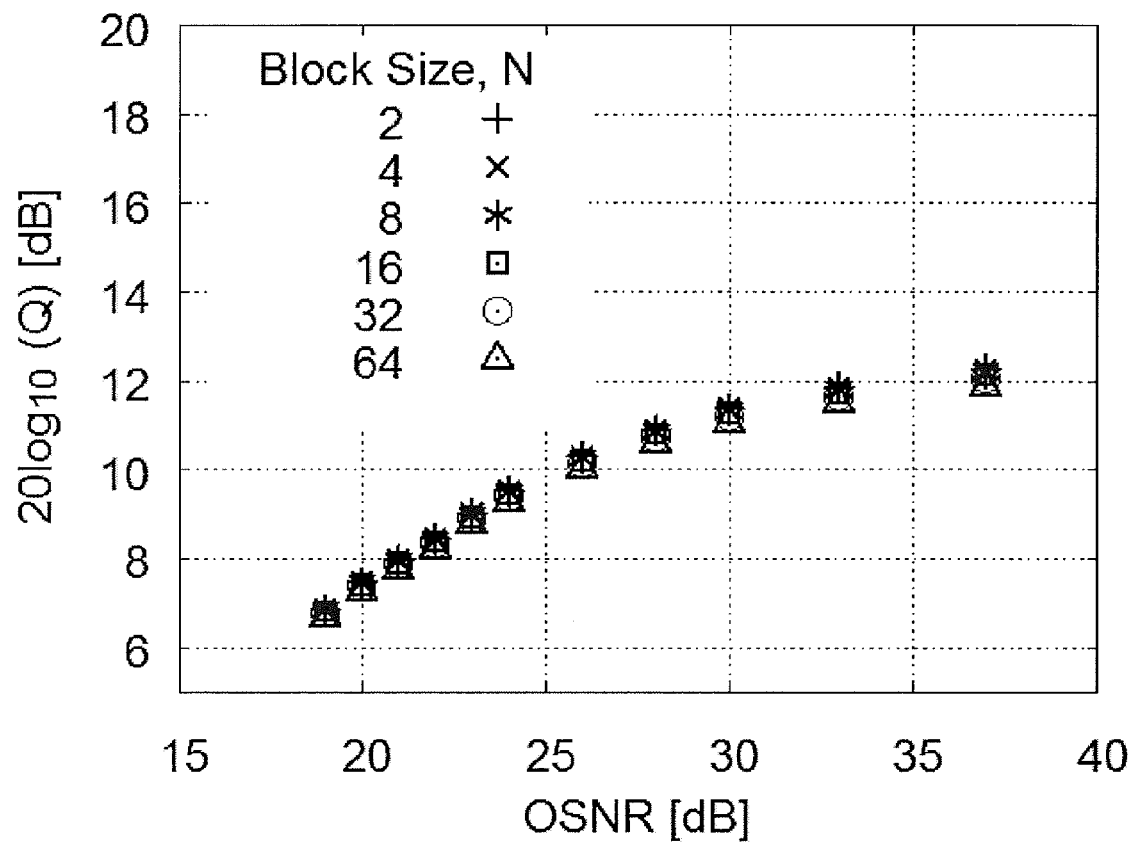
FIG. 8B is a diagram showing a measurement result of the Q factor.

Next, the 64QAM signal was received while being varied to have the optical signal to noise ratio (OSNR) from 20 dB to 37 dB, and demodulated by the offline digital signal processor 109. The separation and output section of the received signal processing device had a block size of $N=2^m$ (m=2, 3, . . . , 6), and measurement results of bit error rate (BER) and Q factor are shown in FIGS. 8A and 8B. FIG. 8A is a diagram showing a measurement result of bit error rate (BER). FIG. 8B is a diagram showing a measurement result of Q factor.

As shown in these FIGS. 8A and 8B, it can be understood that in the case with any block size, the demodulation process including carrier recovery was succeeded, and the bit error rate (BER) was correctly measured. As with the case of 16QAM signal, in the case of 64QAM signal, increase in block size slightly degraded the bit error rate (BER) and the Q factor specifically in the case with a high optical signal to noise ratio (OSNR). An error floor occurred in a region with a high optical signal to noise ratio (OSNR). However, this was caused by the noise component included in the communication system of this experiment but was not by the carrier recovery through the received signal processing device and the received signal processing method.

Figure 9:
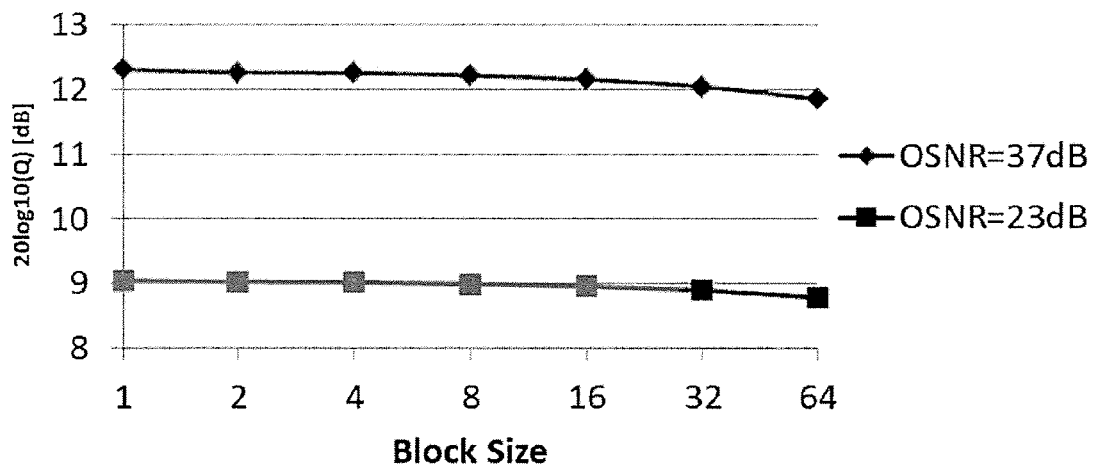
FIG. 9 is a diagram showing the block size dependence of Q factor.

FIG. 9 shows the block size dependence of the Q factor in the cases where the optical signal to noise ratio (OSNR) is 37 dB and 23 dB.

As shown in this FIG. 9, in the case where the optical signal to noise ratio (OSNR) was 37 dB, the Q factor for the block size N of 2 was 12.3 dB, the Q factor for the block size N of 16 was 12.2 dB, and the Q factor for the block size N of 64 is 11.9 dB. It is confirmed that such increase in block size reduced the Q factor, and degraded the signal quality. As with the case of 16QAM signal, this degradation was caused by the phase error.

Figure 10A:
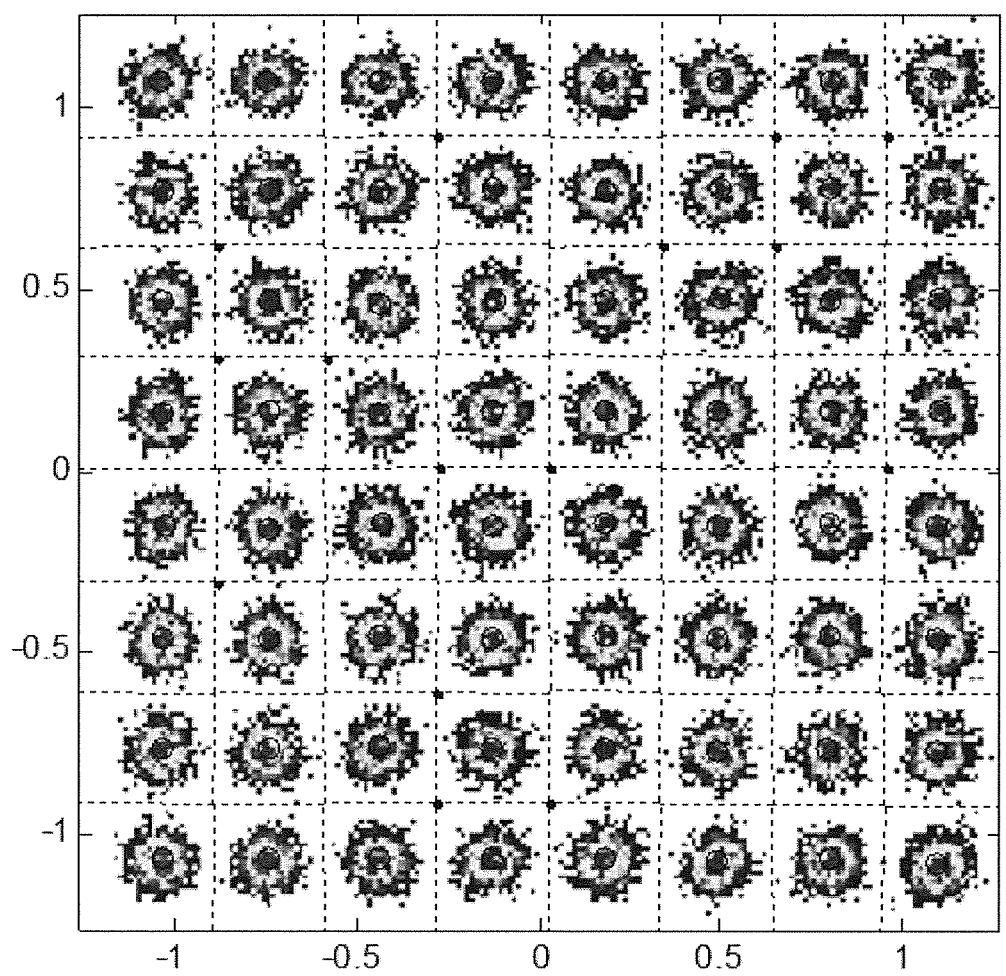
FIG. 10A is a diagram showing a constellation in the case where the block size N is two.
Figure 10B:
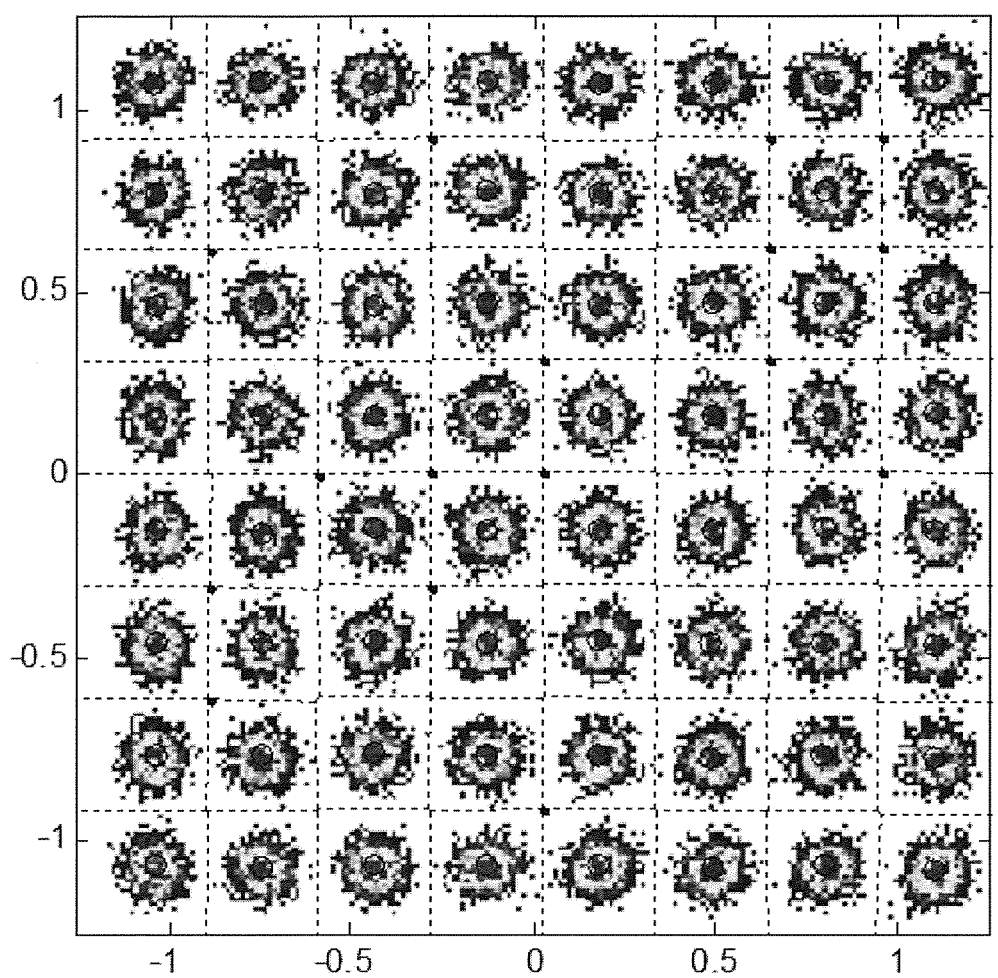
FIG. 10B is a diagram showing a constellation in the case where the block size N is 16.
Figure 10C:
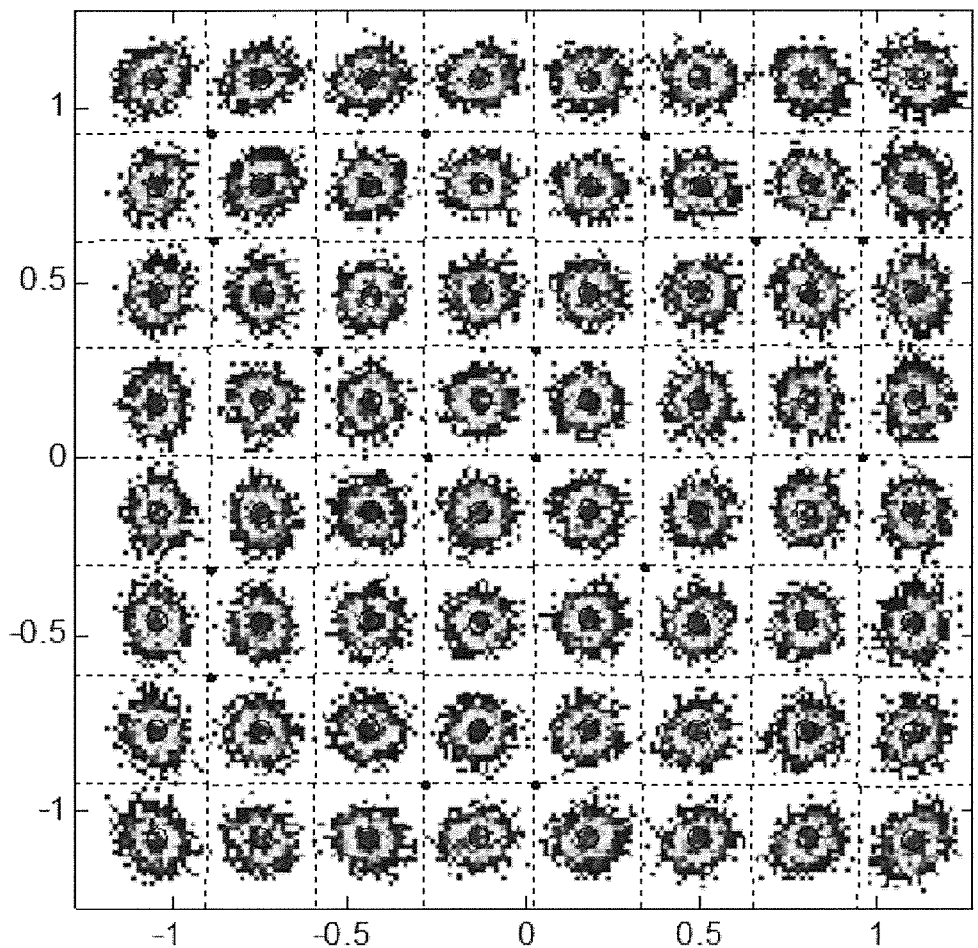
FIG. 10C is a diagram showing a constellation in the case where the block size N is 64.

In this context, the constellations of received symbols in the cases where the optical signal to noise ratio (OSNR) was 37 dB and the block sizes N are 2, 16 and 64 were shown in FIGS. 10A to 10C. FIG. 10A is a diagram showing the constellation in the case where the block size N was 2. FIG. 10B is a diagram showing the constellation in the case where the block size N was 16. FIG. 10C is a diagram showing the constellation in the case where the block size N was 64.

As shown in FIGS. 10A to 10C, increase in block size N increased the distortion of constellation, and specifically caused a phase error and resultantly degraded the Q factor. On the other hand, as with the case of the 16QAM signal, in FIG. 9, in the case where the optical signal to noise ratio (OSNR) was 23 dB, the amount of degradation of the Q factor against increase in block size was significantly small. For example, the Q factors in the cases where the block size was 2 and 64 were 9.02 dB and 8.78 dB, respectively.

Subsequently, as to the received 64QAM signal, the carrier frequency offset dependence of the demodulated signal quality was described. Here, in the cases where the lasers were configured to have frequencies so that the values of the carrier frequency offsets could range from 0 GHz to about 1.2 GHz and the optical signal to noise ratio (OSNR) of the 64QAM signal was 37 dB and 23 dB, the signal was received and demodulated, and the BER and Q factor for a measurement result of the carrier frequency offset found from a result of carrier recovery were measured, and the carrier frequency offset dependence was confirmed.

Figure 11A:
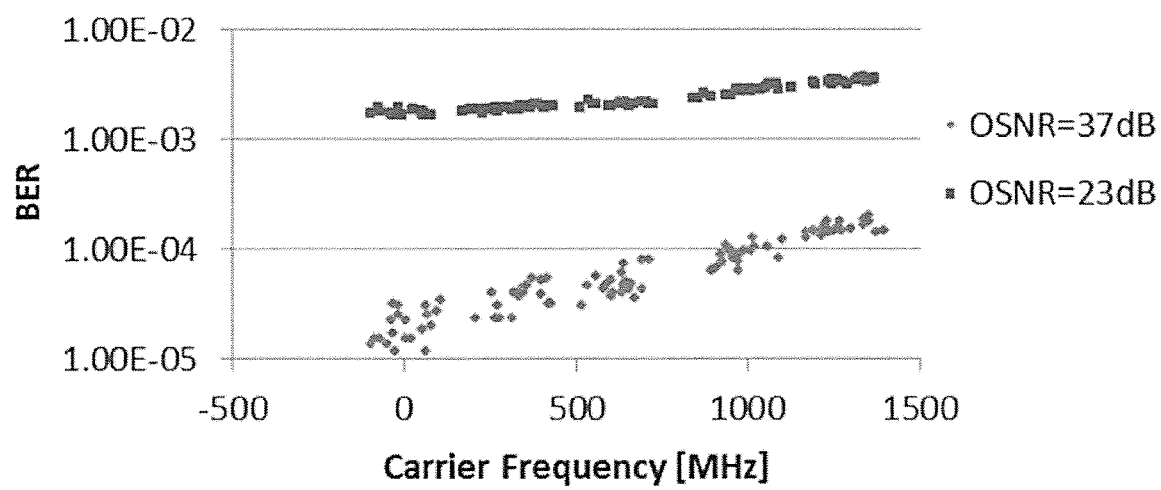
FIG. 11A is a diagram showing a measurement result of the bit error rate (BER) for a measurement result of the carrier frequency offset in the cases where the optical signal to noise ratio (OSNR) is 37 dB and 23 dB.
Figure 11B:
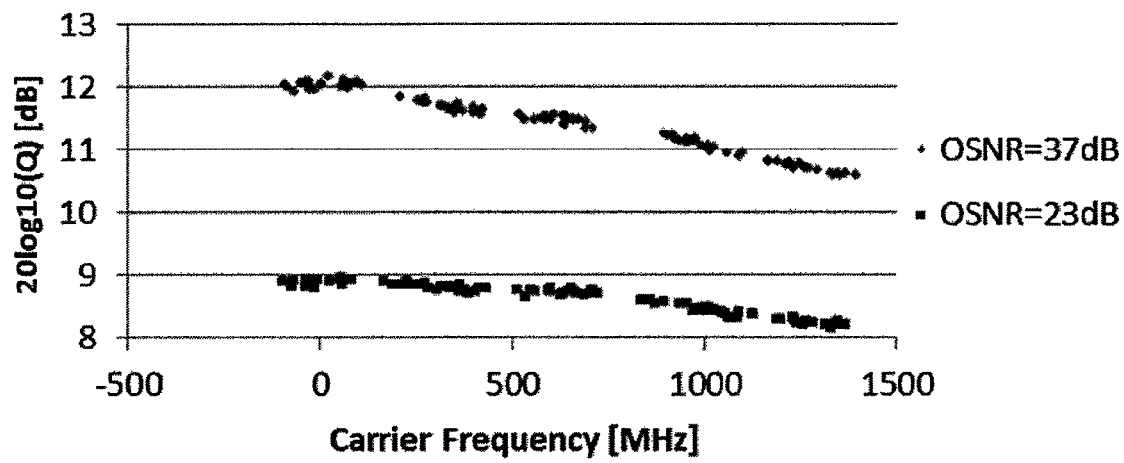
FIG. 11B is a diagram showing a measurement result of the Q factor for a measurement result of the carrier frequency offset in the cases where the optical signal to noise ratio (OSNR) is 23 dB and 37 dB.

FIG. 11A is a diagram showing a measurement result of the bit error rate (BER) for a measurement result of the carrier frequency offset in the cases where the optical signal to noise ratio (OSNR) is 37 dB and 23 dB. FIG. 11B is a diagram showing a measurement result of the Q factor for a measurement result of the carrier frequency offset in the cases where the optical signal to noise ratio (OSNR) was 23 dB and 37 dB.

As shown in these FIGS. 11A and 11B, also as to the 64QAM signal, the demodulation process can normally operate even in the case of a high carrier frequency offset exceeding 1 GHz. However, in comparison with the results of 16QAM signal (see FIGS. 7A and 7B), degradation in signal quality in the case of increase in carrier frequency offset was significant. This was because the interval between symbols of 64QAM signal was smaller than that of the 16QAM signal and the amount of degradation in Q factor for the same phase error was large. As to the 64QAM signal, in the case where the optical signal to noise ratio (OSNR) was 23 dB and the carrier frequency offset was 1 GHz, the Q factor penalty for the case with a carrier frequency offset of zero was approximately 0.5 dB.

Finally, results are shown where the 64QAM signal was transmitted over a long distance to be received and decoded using the proposed carrier recovery scheme. That is, the communication system shown in FIG. 3 was configured to have an increased transmission distance between the IQ modulator 102 and the optical attenuator 104, and an experiment was performed. The transmission path includes two spans of 80 km standard single mode fibers (SSMF), whose total transmission distance was 160 km. On an incident side of each span, an optical amplifier is arranged. The power of signal incident onto the span is −7 dBm. Before entrance into the coherent receiver 107, the gains of optical attenuator 104 and the optical amplifier 105 were adjusted, which changed the optical signal to noise ratio (OSNR). The offline digital signal processor 109 for demodulation initially performed variance compensation through a digital filter in addition to the methods having been described. The variance compensation in this experiment was configured to be 2,648.1 ps/nm.

Figure 12:
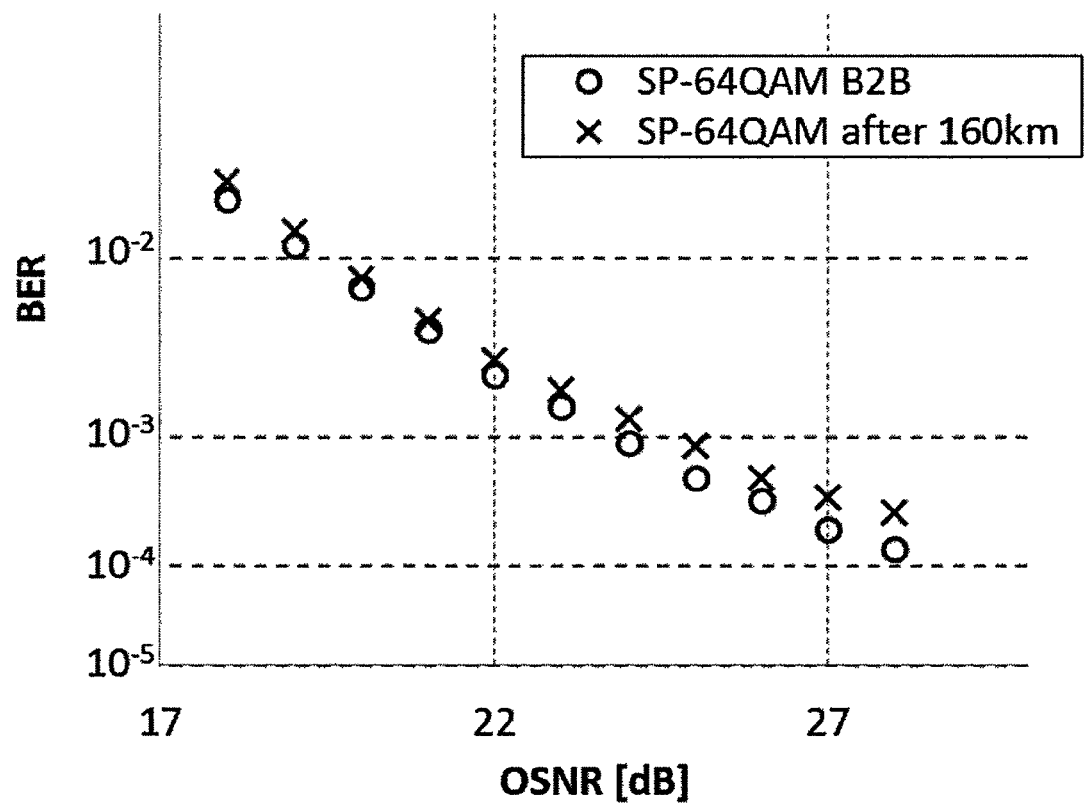
FIG. 12 shows back-to-back and a BER measurement result of the transmitted signal in the case where the block size N is 16.

FIG. 12 shows back-to-back and a BER measurement result of the transmitted signal in the case where the block size N was 16. As shown in this FIG. 12, it can be understood that a penalty accompanying transmission slightly occurred but reception and demodulation processes were normally performed.

As described above, the received signal processing device and the received signal processing method of the present invention can be applied to communication with a high symbol rate, and perform accurate carrier recovery even for a multi-level signal, such as QAM signal. Consequently, the device and method can be used in a communication field, specifically in a digital signal processing process in a receiver in an optical fiber communication field in a preferable manner.

The details of an experiment to which the actual decision section and the actual decision step described as the preferable configuration example and the preferable execution method of the received signal processing device and method of the present invention (hereinafter, simply called the actual decision section and actual decision step) were applied, and advantageous effects confirmed through the experiment are described. The received signal processing device and method (the actual decision section and actual decision step) are applicable to signals according to any modulation scheme. However, description is herein made in view of focusing on 16 QAM modulation scheme. Here, in order to confirm the effectiveness of the actual decision section and the actual decision step themselves, a carrier recovery scheme performed signal processing to a symbol where the carrier phase had been recovered using a decision-directed DPLL as a scheme of carrier recovery. Alternatively, the signal processing can be performed for each of the separated symbols whose carrier phase has been recovered, on the basis of the received signal processing device and method of the present invention (the carrier recovery unit and the signal processing method through this unit).

Figure 23:
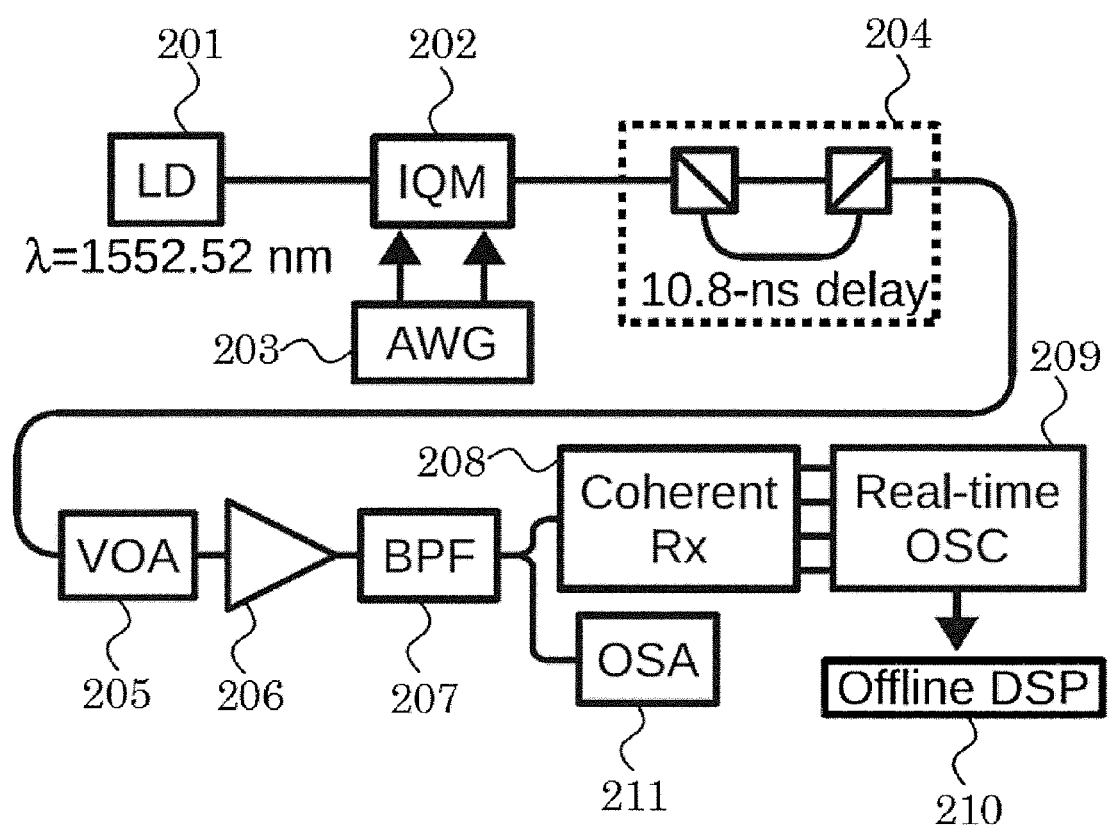
FIG. 23 is a diagram illustrating a communication system used for an experiment.

FIG. 23 shows a communication system used in this experiment. FIG. 23 is a diagram illustrating a communication system used for the experiment.

As shown in FIG. 23, the communication system includes a laser diode (LD) 201, an IQ modulator (IQM) 202, an arbitrary waveform generator (AWG) 203, a polarization-multiplexing emulator 204, a variable optical attenuator (VOA) 205, an optical amplifier 206, a band-pass filter (BPF) 207, a coherent receiver 208, a real-time oscilloscope 209, an offline digital signal processor (DSP) 210, and an optical spectrum analyzer (OSA) 211.

The laser diode 201 outputs continuous light with a central wavelength of 1,552.52 nm.

The continuous light output from the laser diode 201 was vector-modulated by the IQ modulator 202, and the 16QAM signal were generated. The 16QAM signal was obtained using coding with Gray code from pseudo-random bit sequence (PRBS) with a symbol rate of 12 Gaud and a length of $2^{15}-1$.

Electric signals that were output from the arbitrary waveform generator 203 and corresponded to the in-phase component and quadrature component of the 16QAM signal were applied to the IQ modulator 202. In the case of adopting the ideal constellation as shown in FIG. 13B as the waveform of 16QAM signal transmitted, electric signals that were output from the arbitrary waveform generator 203 to the IQ modulator 202, had the ideal constellation and corresponded to the in-phase component and quadrature component of the 16QAM signal are applied as they were. On the other hand, in the case of adopting the distorted constellation as shown in FIG. 14C, the output amplitude of the arbitrary waveform generator 203 was adjusted, the amplitude of the quadrature component was set smaller by 20% than the in-phase component, the processed output was applied to the IQ modulator 202, further the bias voltage applied to the IQ modulator 202 was adjusted, and the angle between the in-phase component and the quadrature component was reduced by 20 degrees from 90 degrees, which is the ideal value, on the complex plane, and the quadrature phase error was provided.

This experiment treated, as transmission signals, both the single polarized 16QAM signal (SP-16QAM) and polarization-multiplexed 16QAM signal (DP-16QAM). In the case of using a DP-16QAM signal, the polarization-multiplexing emulator 204 that included a polarizing beam splitter (PBS) and a fiber delay line was used to perform polarization multiplication. That is, this experiment adopted each of 16QAM signals having waveforms with an ideal constellation and a distorted constellation in SP-16QAM and DP-16QAM. The 16QAM signals in total four states were thus adopted as transmission signals.

The optical signal to noise ratios (OSNR) of each 16QAM signal transmitted was adjusted using the variable optical attenuator 205 and the optical amplifier 206. Subsequently, the signal out-band optical noise caused owing to optical amplification was removed through the band-pass filter 207. The signal was then received by the coherent receiver 208. Note that the optical signal to noise ratio was measured by the optical spectrum analyzer 211 arranged in parallel to the coherent receiver 208.

Each 16QAM signal received by the coherent receiver 208 was analog-to-digital converted by the real-time oscilloscope 209, and obtained as a digital signal. The sampling rate in the analog-to-digital conversion was configured to have 80 GSa/s in the case of SP-16QAM, and 40 GSa/s in the case of DP-16QAM.

Each 16QAM signal obtained as the digital signal was output to the offline digital signal processor 210, resampled at 24 GSa/s, which corresponds to two samples per symbol, and subsequently demodulated through execution of a signal processing program constructed on the digital signal processor 210. A personal computer was adopted as the digital signal processor 210, and the signal processing program was constructed on Matlab, which is calculation software operated on the personal computer as the received signal processing device according to Reference Example and Example described hereinafter.

(Reference Example)

A demodulation process of the 16QAM signal output to the digital signal processor 210 (see FIG. 23) was performed by a received signal processing device that had the same circuit configuration as the circuit configuration of the received signal processing device including the adaptive equalizer 250 shown in FIG. 16 described above and was Reference Example. According to the circuit configuration, the digital phase locked loop 230 shown in FIG. 16 was configured to have the same circuit configuration as the circuit configuration shown in FIG. 15, and the damping factor $\zeta$ natural frequency $\omega_n$, and sample time interval $T_s$, which were set as the operation characteristics of the digital phase locked loop were set as follows.

$\zeta = 0.707$ $\omega_n = 2\pi \times 50$ [MHz]

$T_s = (12 \times 10^9)^{-1} = 83.3$ [ps]

The reference signal used for decision in the decision element 251 was configured to have a shape having the ideal constellation of 16QAM signal shown in FIG. 13B according to the modulation scheme of the received signal. The reference signal had an arbitrariness in bias (translation) and amplitude value with respect to the in-phase component (real axis direction) and quadrature component (imaginary axis direction) as elements other than the shape. Here, as one method, the bias of the reference signal was set to zero, and the amplitude value was adjusted so that the average power of the reference signal could coincide with the average power of the received signal.

The received signal processing device (see FIG. 16) to which the adaptive equalizer according to the Reference Example had been applied executed an equalization process (including polarization separation process in the case of the DP-16QAM signal) and carrier recovery process, separately decided the symbols having been subjected to demodulation process, using the decision element provided outside of the received signal processing device, and analyzed the bit error rate (BER) and error vector magnitude (EVM). Furthermore, the constellation waveform of the 16QAM signal having been subjected to the demodulation process was observed. It was assumed that when the decision was executed separately for the 16QAM signal having been subjected to the demodulation process, the distortion of the signal to be transmitted had been preliminarily identified and the reference signal conforming to the distortion could be used from the beginning. Thus, the distortion of the transmission signal did not affect the decision after the demodulation process. In view of focusing only on the operations of the adaptive equalizer and the digital phase locked loop connected to the adaptive equalizer (see FIG. 16 for these elements), the effects of the wavelength distortion of the transmission signal were evaluated.

Here, the EVM analysis was performed with the value of root-mean square (rms) of the EVM being defined according to the following expression [2].

$$EVM_{rms} = \left[ \frac{\frac{1}{N}\sum_{n=1}^{N} \|r(x_n) - x_n\|^2}{\frac{1}{M}\sum_{m=1}^{M} \|r_m\|^2} \right]^{\frac{1}{2}} \quad (2)$$

Note that in the expression [2], M denotes the number of complex amplitude values in the reference signal and M=16 in the case of the 16QAM signal, $r_m$ denotes a two-dimensional vector representing the m-th complex amplitude value in the reference signal, N denotes the number of received symbols, $x_n$ denotes the two-dimensional vector representing the n-th received symbol, and $r(x_n)$ is the two-dimensional vector representing the complex amplitude in the reference signal obtained by decision for $x_n$.

Analysis for the BER and the EVM was performed by a calculation block constructed in the signal processing program. Observation of the constellation waveform was performed by a constellation waveform deriving block constructed in the signal processing program.

Figure 24A:
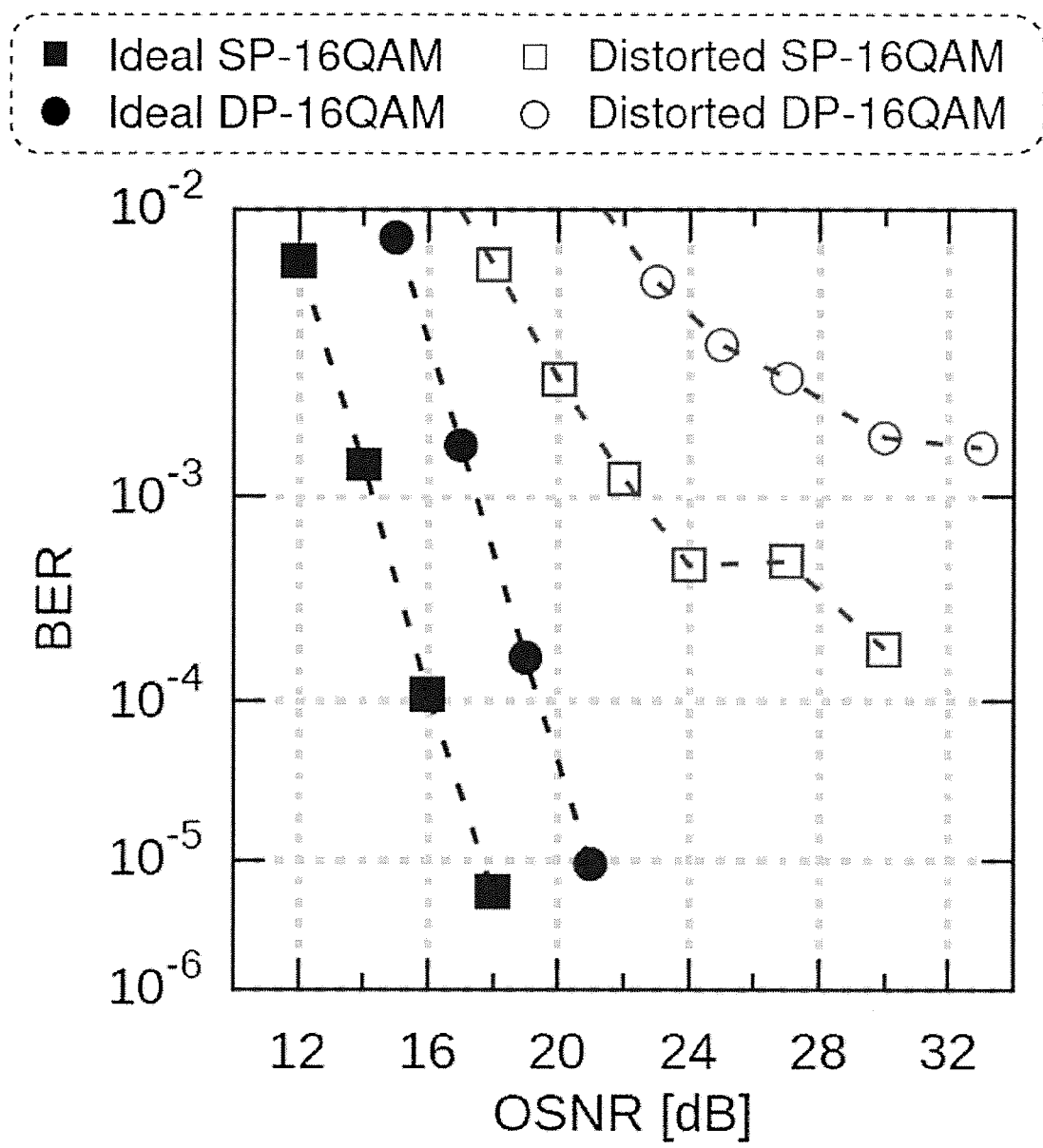
FIG. 24A is a diagram showing a BER measurement result of a received signal processing device according to Reference Example.
Figure 24B:
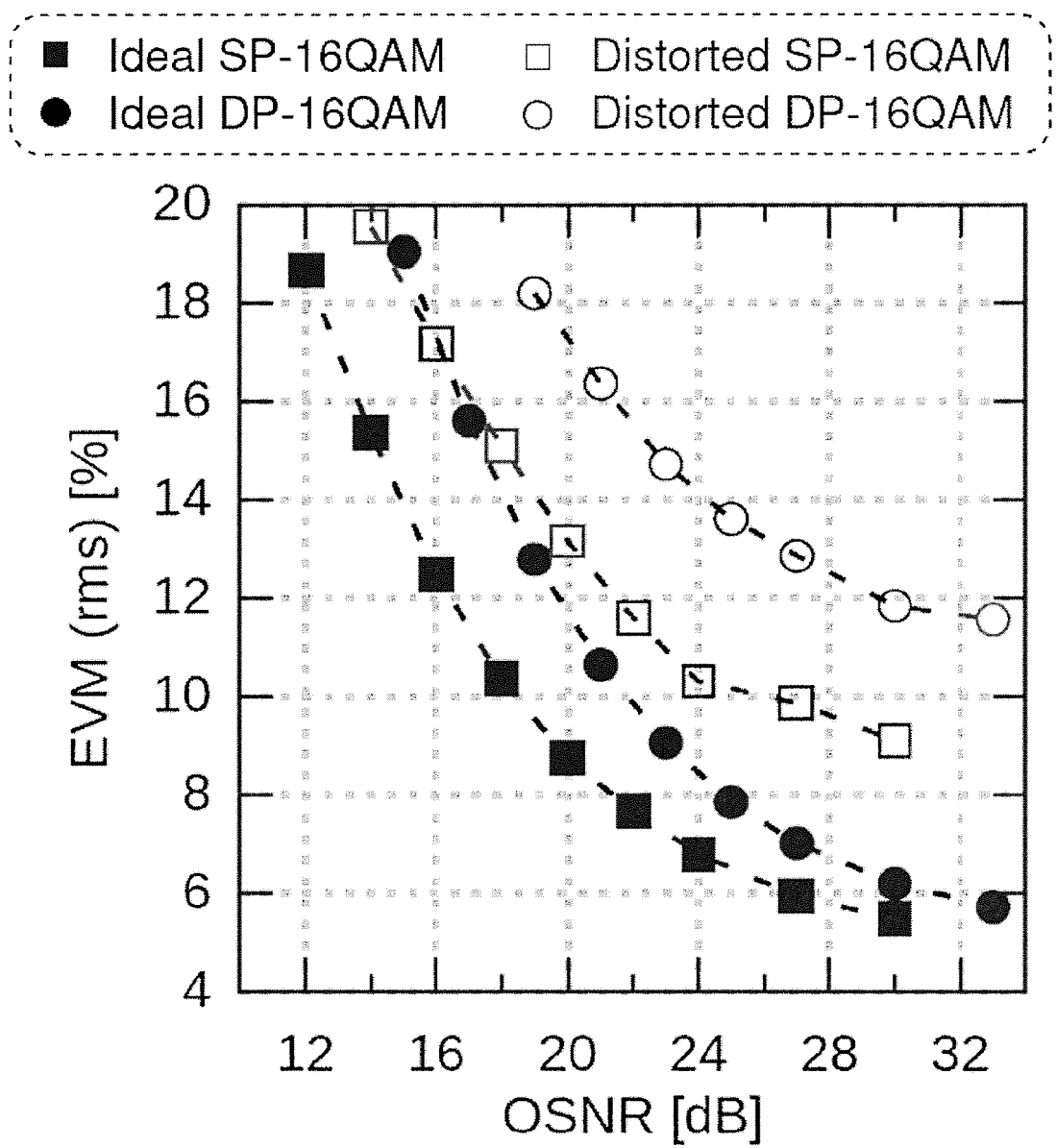
FIG. 24B is a diagram showing an EVM measurement result of the received signal processing device according to Reference Example.

FIG. 24A shows the BER measurement result of the received signal processing device according to Reference Example. FIG. 24B shows the EVM measurement result of the received signal processing device according to Reference Example.

As shown in these diagrams, it can be understood that in the received signal processing device according to Reference Example, as to both SP-16QAM and DP-16QAM, the received result for the distorted waveforms (see Distorted SP-16QAM and DP-16QAM in the diagrams) shows occurrence of an error floor and a large penalty with respect to the received result for the ideal waveform (see Ideal SP-16QAM and DP-16QAM in the diagrams).

Figure 24C:
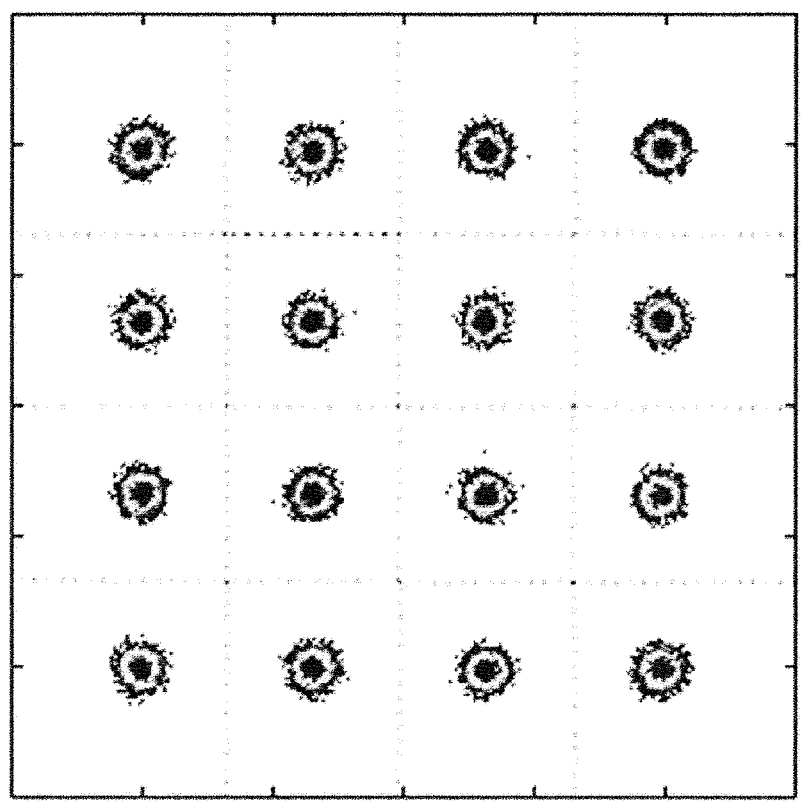
FIG. 24C is a diagram showing a constellation waveform in the case where the received signal processing device according to Reference Example demodulated an SP-16QAM signal having an ideal waveform.
Figure 24D:
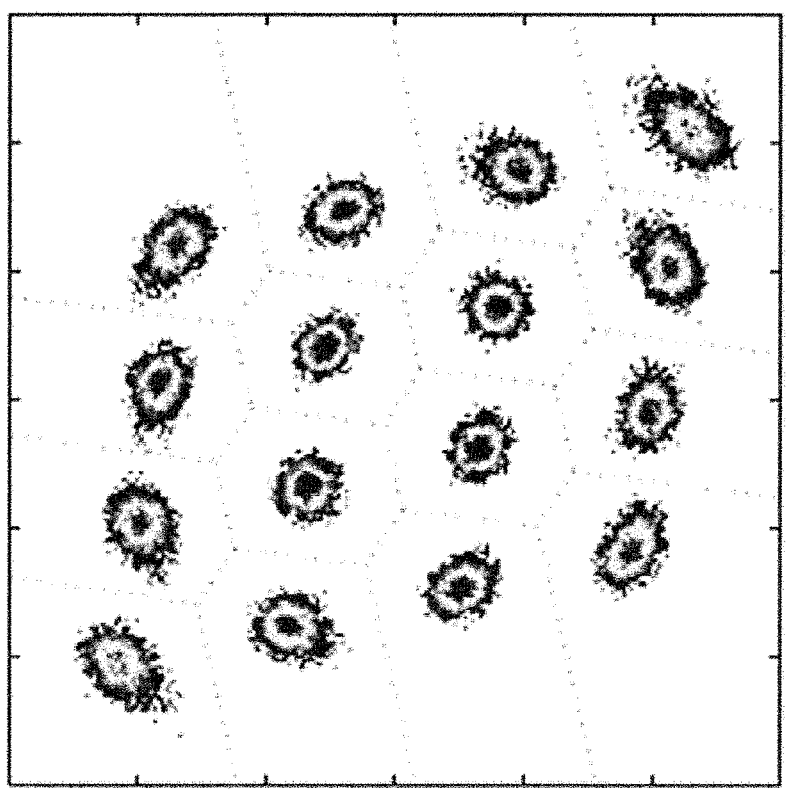
FIG. 24D is a diagram showing a constellation waveform in the case where the received signal processing device according to Reference Example demodulated an SP-16QAM signal having a distortion.

FIG. 24C is a diagram showing a constellation waveform in the case where the received signal processing device according to Reference Example demodulated the SP-16QAM signal having an ideal waveform. FIG. 24D is a diagram showing a constellation waveform in the case where the received signal processing device according to Reference Example demodulated the SP-16QAM signal having a distortion. Both the constellation waveforms were obtained in the case of an optical signal to noise ratio (OSNR) of the received signal of 30 dB.

Unlike FIG. 24C, in FIG. 24D, occurrence of a large phase noise for the symbol with a large amplitude value was identified, and it can be considered that the operation of the section of calculating the amount of phase correction (DPLL) was degraded owing to many errors occurring during decision. In actuality, the standard deviation of the oscillatory frequency of the numerically controlled oscillator (NCO) used in the DPLL was 4 MHz in the case of the SP-16QAM signal with no distortion. On the contrary, the standard deviation was increased to 12 MHz in the case of the SP-16QAM signal with distortion. This means that the operation of the DPLL including the NCO was unstable.

Figure 24E:
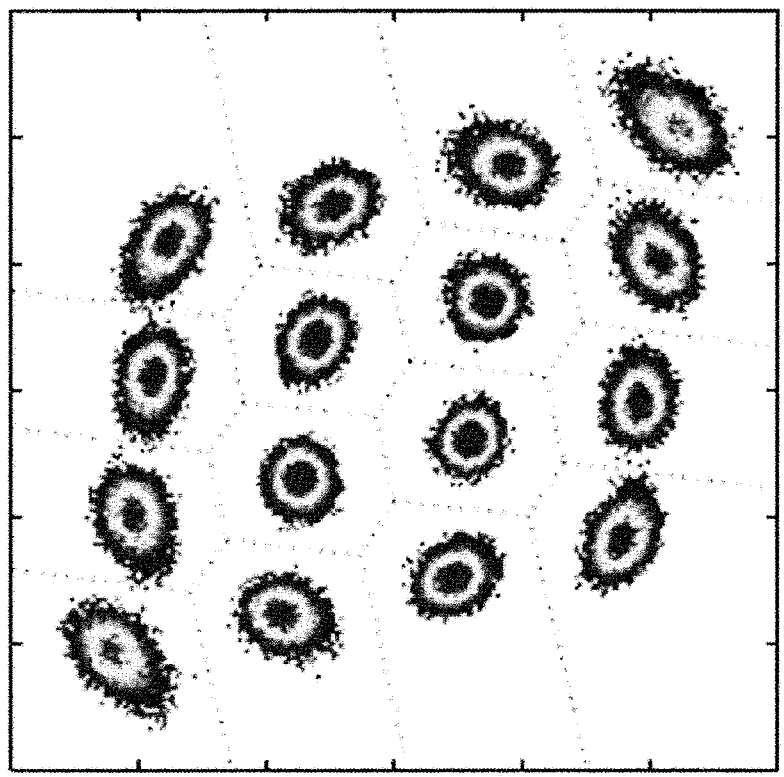
FIG. 24E is a diagram showing a constellation waveform in the case where the received signal processing device according to Reference Example demodulated a DP-16QAM signal having a distortion.

FIG. 24E is a diagram showing a constellation in the case where the received signal processing device according to Reference Example demodulated the DP-16QAM signal having a distortion.

As shown in FIG. 24E, occurrence of a larger noise component in the DP-16QAM signal can be identified than that in the case of SP-16QAM signal. The constellation waveform shown in FIG. 24E was obtained in the case of the OSNR of 33 dB. It can be understood that in addition to the phase noise for the symbol with a large amplitude value, a large noise component in an overall view was added. The OSNR per polarized wave of the DP-16QAM signal was the same as that in the case of SP-16QAM. It can be considered that this result was obtained because the operation of the adaptive equalizer was degraded owing to many decision errors, which affected the polarization separation performance.

As described above, it can be understood that when the 16QAM signal with a distorted waveform was received and demodulated using the decision-directed adaptive equalizer and the section of calculating the amount of phase correction based on the reference signal with the ideal waveform, the received signal quality was largely degraded.

(Example)

In Example, for the method of demodulating the 16QAM signal output to the digital signal processor 210 (see FIG. 23), an experiment was performed that was analogous to that in Reference Example except adoption of the same circuit configuration as the circuit configuration of the received signal processing device 200 shown in FIG. 18 described above. Note that the received signal processing device according to Example was configured as a test device for verifying the advantageous effect in the case of applying actual decision section, without applying the carrier recovery unit shown in FIG. 1.

The reference signal updating section 270 of the received signal processing device according to Example set the value of μ in expression [1] to 0.005 and corrected and updated the reference point.

In a state where the adaptive equalizer 250 operated according to an error signal obtained by the constant modulus algorithm (CMA) and only the digital phase locked loop circuit 230 (DPLL) operated in the decision-directed operation mode, the received signal processing device according to Example performed the reference signal updating process for first received 16,000 received symbols. Furthermore, after transition to the decision-directed operation mode, the Adaptive equalizer 250 also updated subsequent 10,000 received symbols. In both cases, all the reference points r in the reference signal converged on the center (complex amplitude expected value) of the range of possible positions of received symbols x, and the reference signal could be appropriately updated.

Figure 25A:
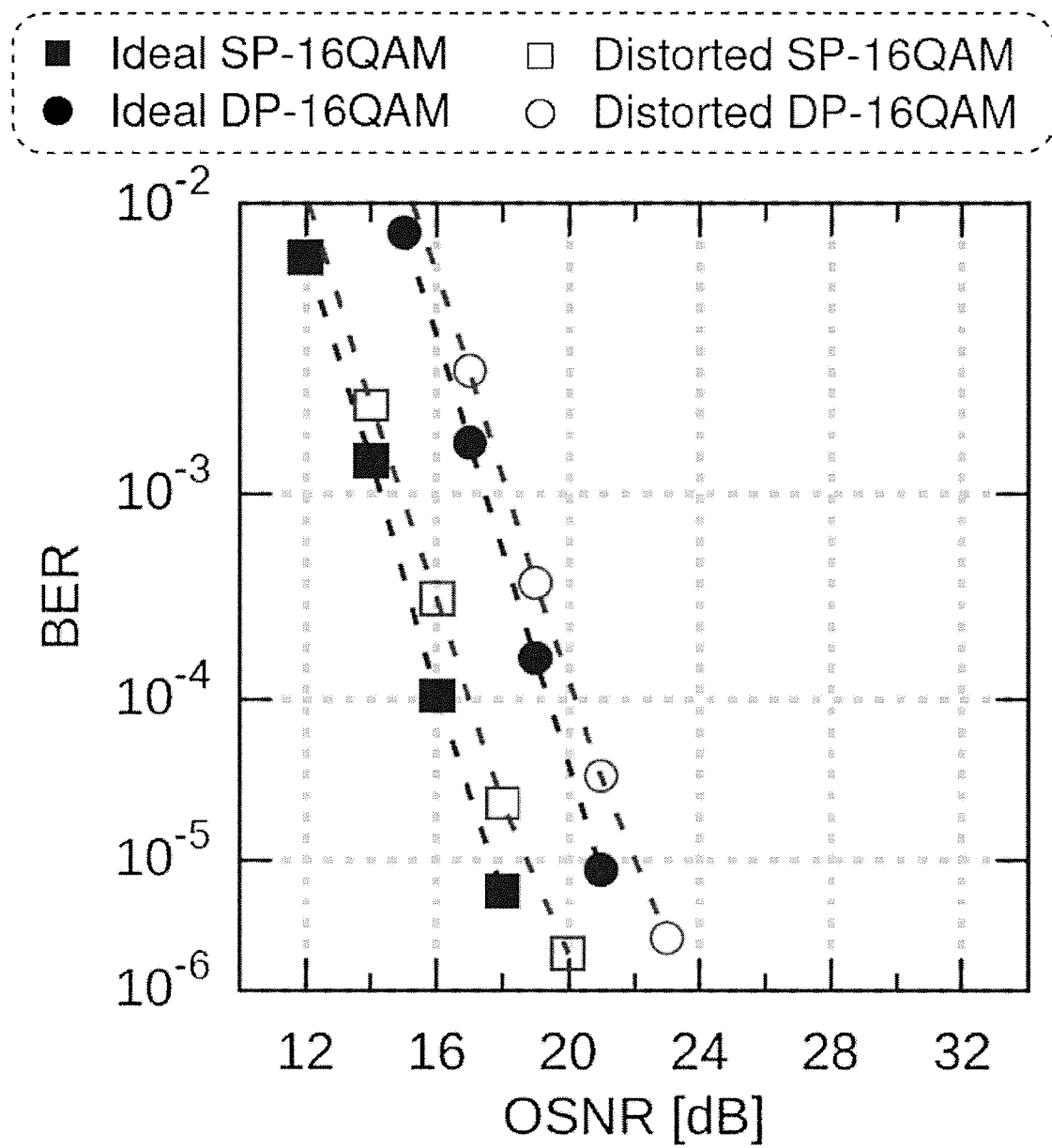
FIG. 25A is a diagram showing a BER measurement result of a received signal processing device according to Example.
Figure 25B:
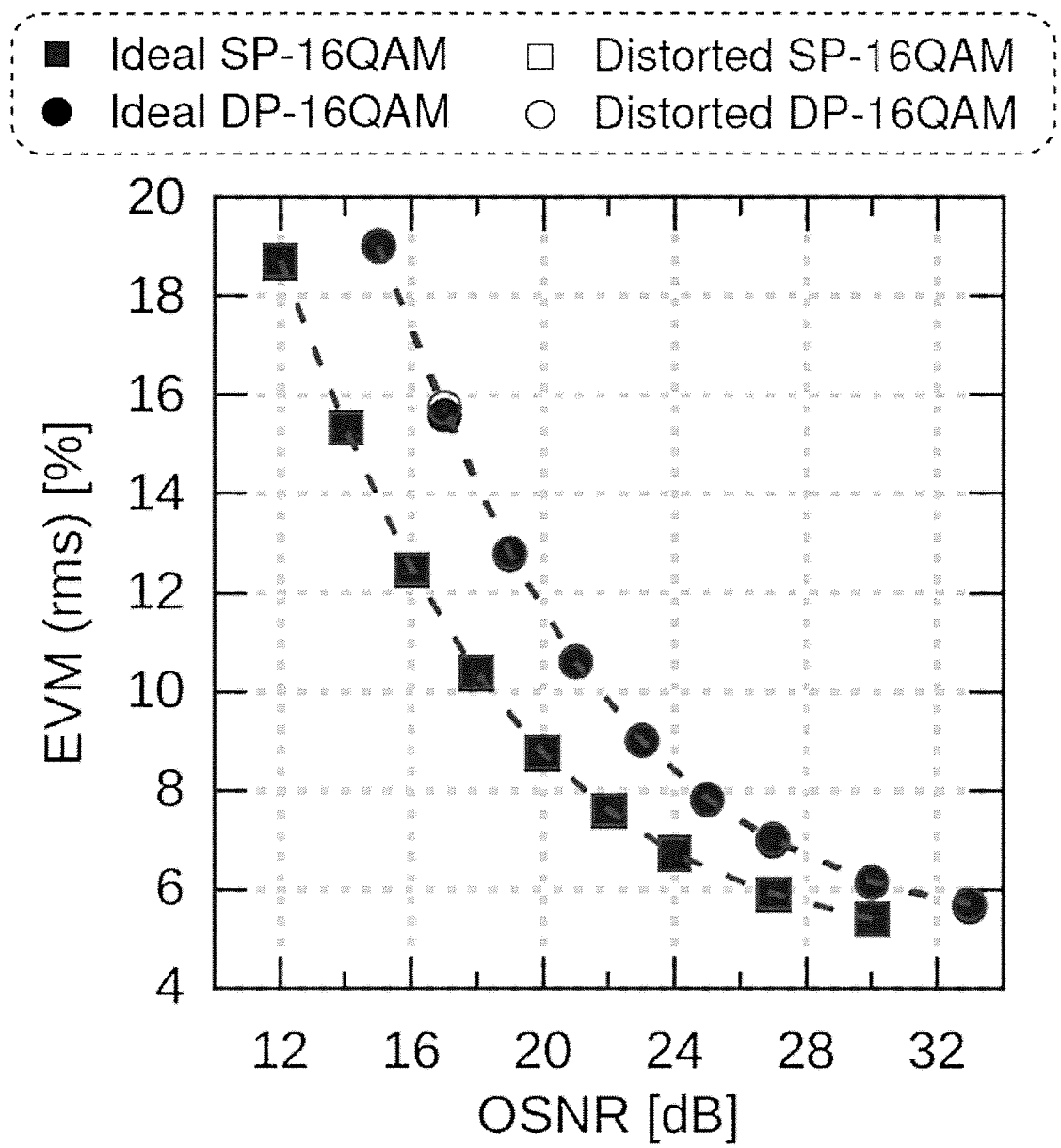
FIG. 25B is a diagram showing an EVM measurement result of the received signal processing device according to Example.

FIG. 25A shows the BER measurement result of the received signal processing device according to Example. FIG. 25B shows the EVM measurement result of the received signal processing device according to Example. These measurement results were obtained by performing measurement according to a method analogous to that of Reference Example except correction and update of the reference signal based on the reference signal updating section 270 and the decision element 251.

As shown in these diagrams, it can be understood that even in the case of adding distortions to waveforms of both SP-16QAM and DP-16QAM, the signals could be received without causing a large penalty (see Ideal SP-16QAM, DP-16QAM, and Distorted SP-16QAM, DP-16QAM in the diagrams).

No penalty occurred in the EVM shown in FIG. 25B, while the OSNR penalty of about 1 dB occurred in the BER shown in FIG. 25A. This was intrinsic because according to adding a wavelength distortion to 16QAM signal, as a result of reduction in quadrature component amplitude by 20% in comparison with the in-phase component, the symbol interval on the quadrature axis at the same average power decreased by 12%, and consequently, a 1.29 times larger average power, i.e., +1.1 dB, is required to achieve the same BER. In an actual usage scene, such an intrinsic penalty caused by the distortion of the transmission signal can be eliminated by causing the communication system according to the present invention to feed back, to the transmission side, information on the distortion included in the decision signal as the decision result of the decision element based on the reference signal updated by the reference signal updating section and to correct the distortion included in the transmission signal.

Figure 25C:
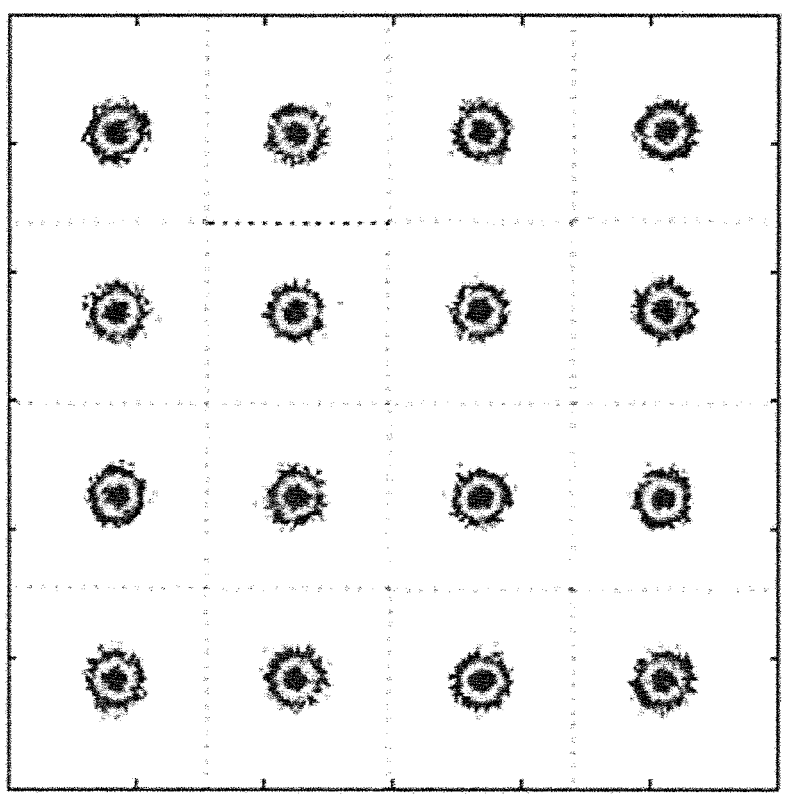
FIG. 25C is a diagram showing a constellation waveform in the case where the received signal processing device according to Example demodulated the SP-16QAM signal having an ideal waveform.
Figure 25D:
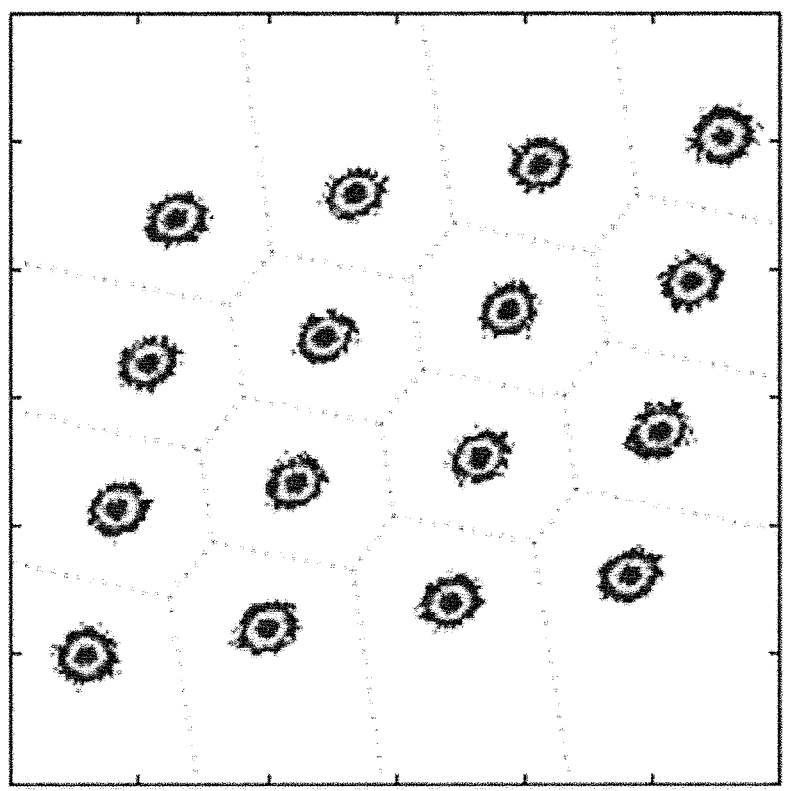
FIG. 25D is a diagram showing a constellation waveform in the case where the received signal processing device according to Example demodulated the SP-16QAM signal having a distortion.
Figure 25E:
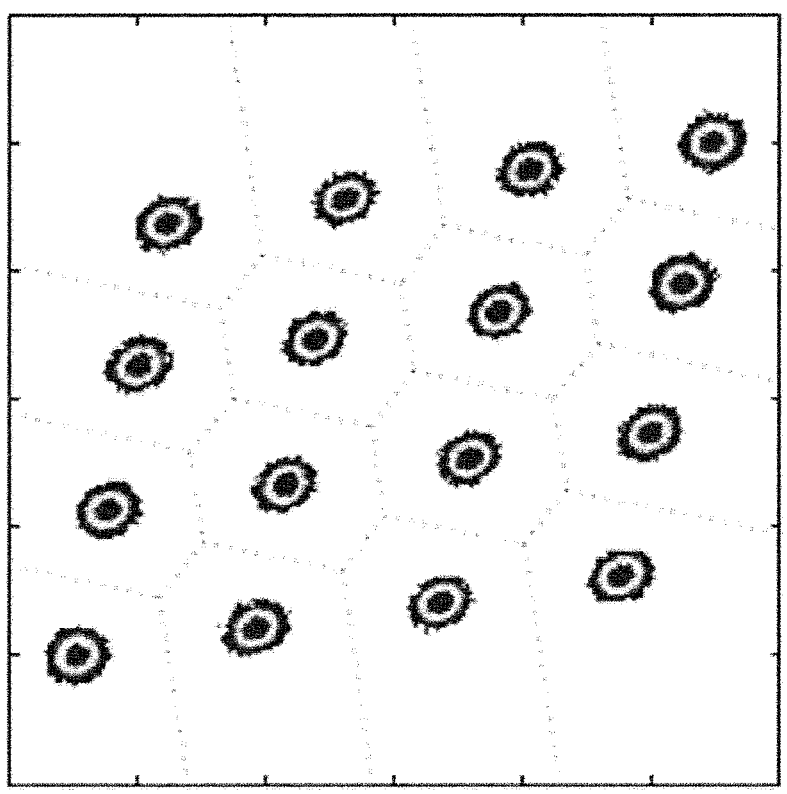
FIG. 25E is a diagram showing a constellation waveform in the case where the received signal processing device according to Example demodulated the DP-16QAM signal having a distortion.

FIG. 25C is a diagram showing a constellation waveform in the case where the received signal processing device according to Example demodulated the SP-16QAM signal having an ideal waveform. FIG. 25D is a diagram showing a constellation waveform in the case where the received signal processing device according to Example demodulated the SP-16QAM signal having a distortion. FIG. 25E is a diagram showing a constellation waveform in the case where the received signal processing device according to Example demodulated the DP-16QAM signal having a distortion.

As shown in these diagrams, in the case of demodulation through use of the received signal processing device according to Example, occurrence of a large noise was not identified in the constellation waveform, and the adaptive equalizer (AEQ) and the section of calculating the amount of phase correction (DPLL) could normally operate.

Next, an EVM measurement result in the case of varying the degree of distortion added to the transmission signal is described. The EVM measurement result shows the EVM in the case of generating the DP-16QAM signal when the amplitude reduced ratio of the quadrature component with respect to the in-phase component was varied from 0% to 45% and further the quadrature phase error was varied from 0 degree to 25 degrees, the OSNR was received as 35 dB, and in the case of performing the demodulation process by the received signal processing device according to Example.

Figure 26A:
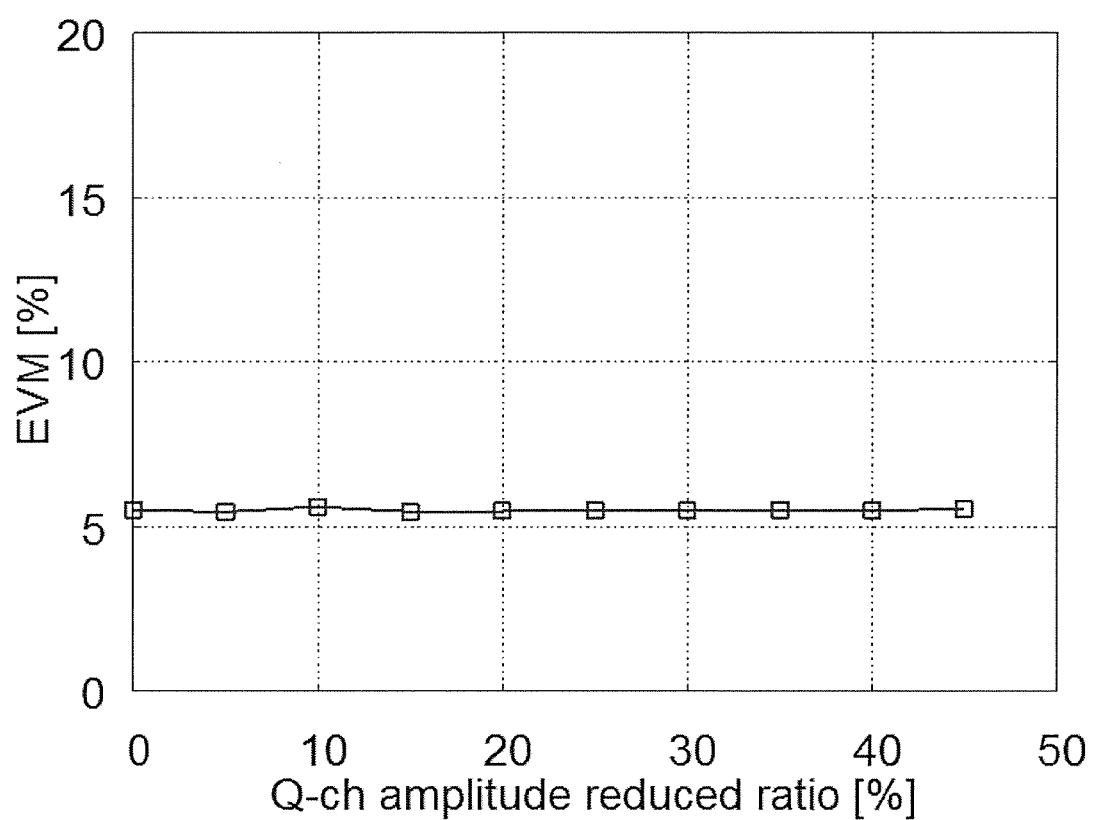
FIG. 26A is a diagram showing an EVM measurement result when each DP-16QAM signal was demodulated with the amplitude reduced ratio of the quadrature component with respect to the in-phase component being varied from 0% to 45% in the case of a quadrature phase error of 0 degree.
Figure 26B:
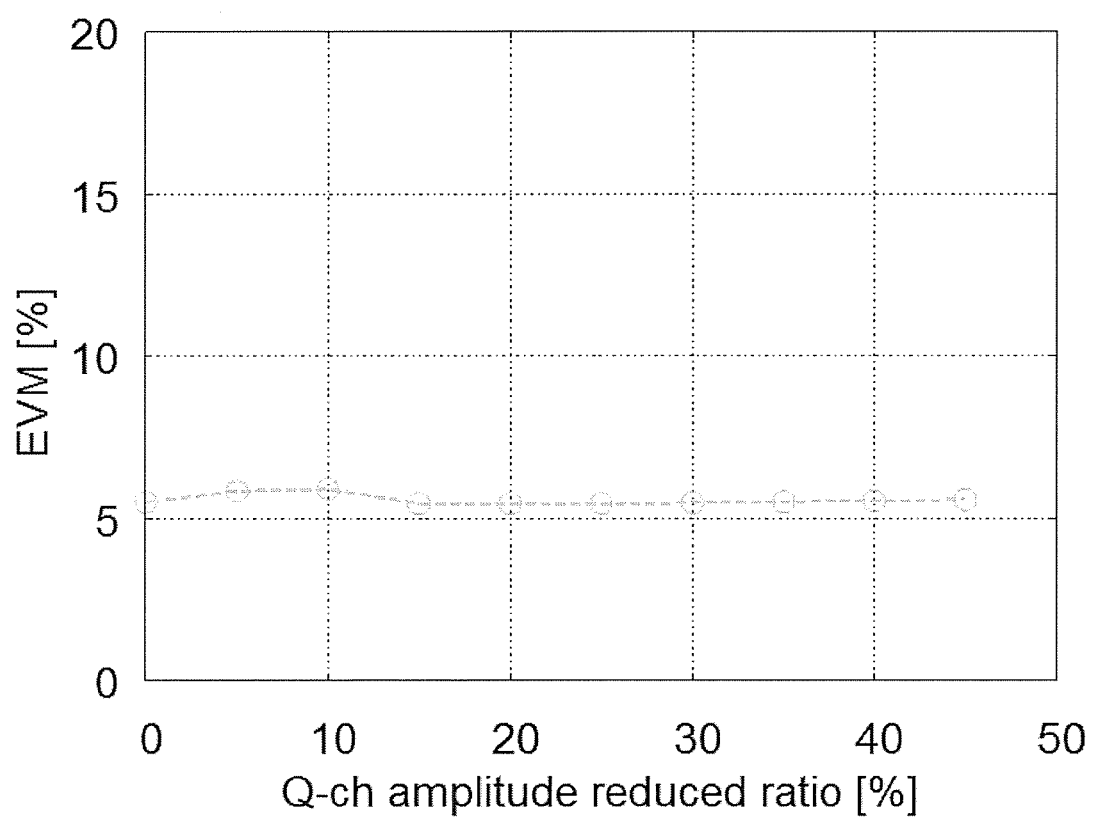
FIG. 26B is a diagram showing an EVM measurement result when each DP-16QAM signal was demodulated with the amplitude reduced ratio of the quadrature component with respect to the in-phase component being varied from 0% to 45% in the case of a quadrature phase error of 5 degrees.
Figure 26C:
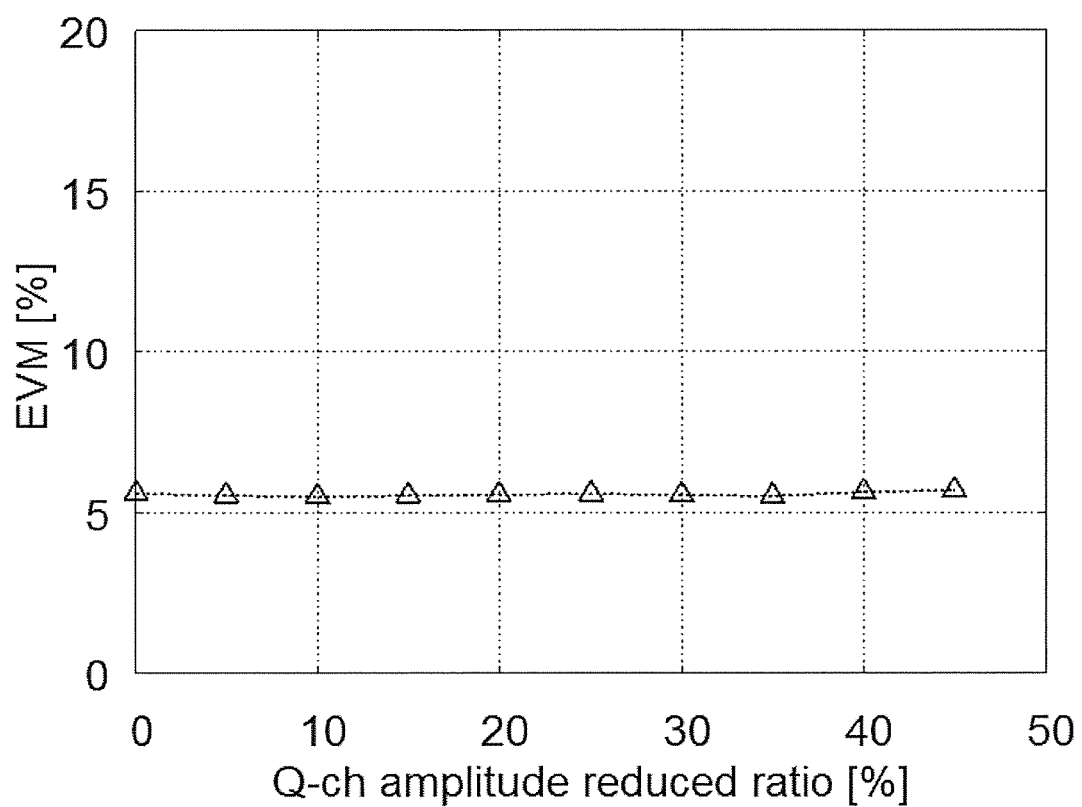
FIG. 26C is a diagram showing an EVM measurement result when each DP-16QAM signal was demodulated with the amplitude reduced ratio of the quadrature component with respect to the in-phase component being varied from 0% to 45% in the case of a quadrature phase error of 10 degrees.
Figure 26D:
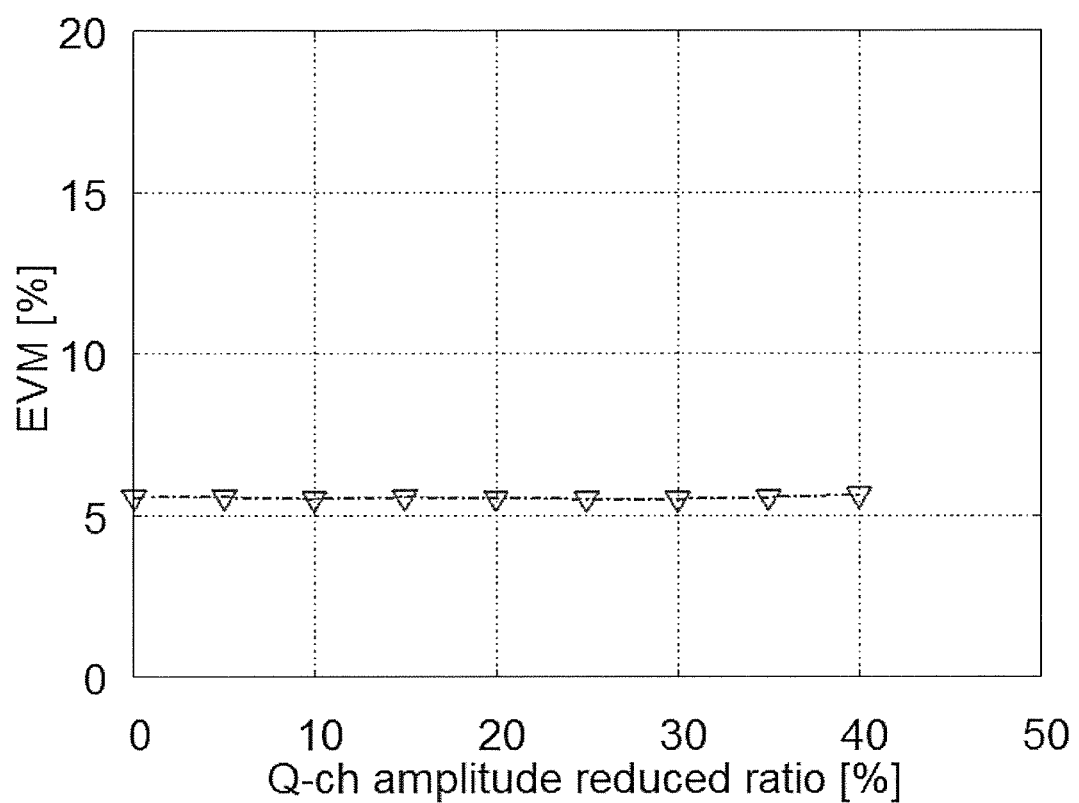
FIG. 26D is a diagram showing an EVM measurement result when each DP-16QAM signal was demodulated with the amplitude reduced ratio of the quadrature component with respect to the in-phase component being varied from 0% to 40% in the case of a quadrature phase error of 15 degrees.
Figure 26E:
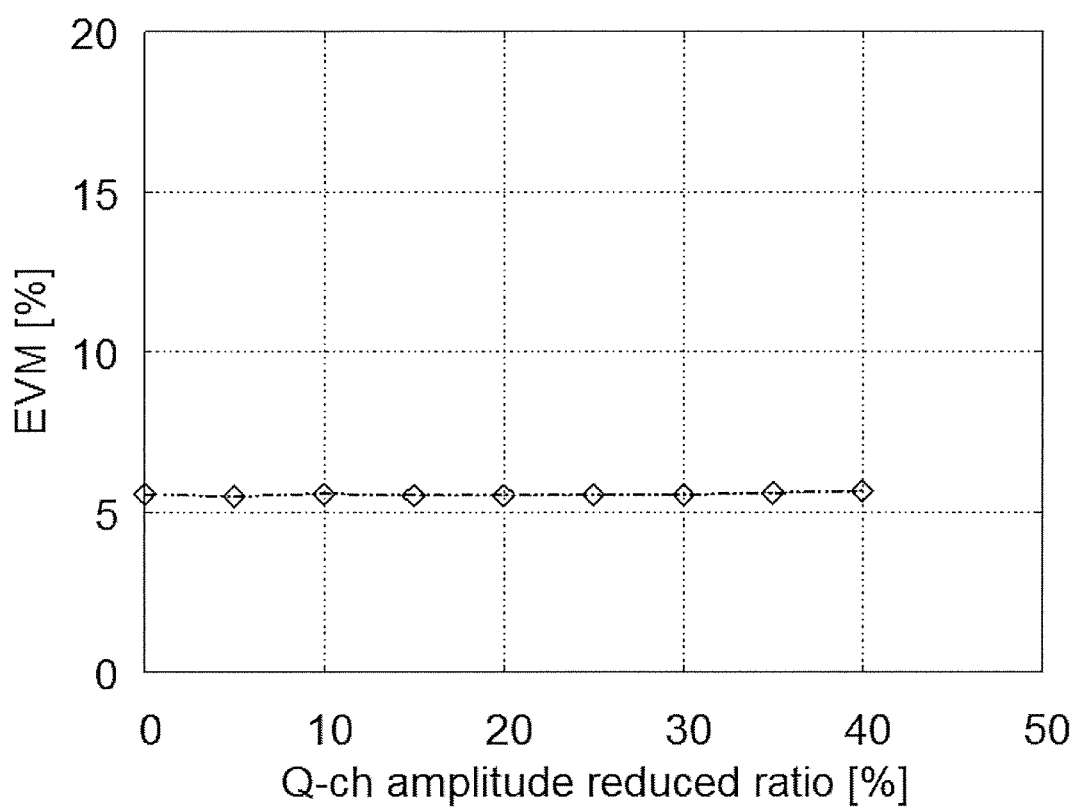
FIG. 26E is a diagram showing an EVM measurement result when each DP-16QAM signal was demodulated with the amplitude reduced ratio of the quadrature component with respect to the in-phase component being varied from 0% to 40% in the case of a quadrature phase error of 20 degrees.
Figure 26F:
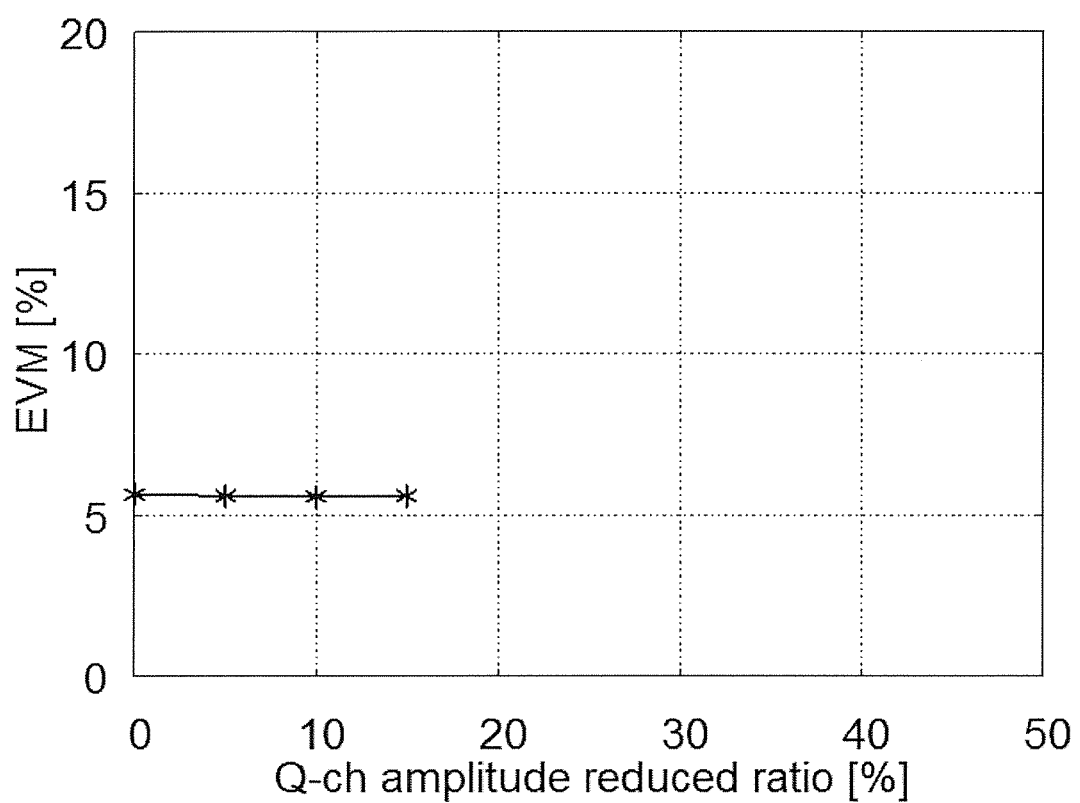
FIG. 26F is a diagram showing an EVM measurement result when each DP-16QAM signal was demodulated with the amplitude reduced ratio of the quadrature component with respect to the in-phase component being varied from 0% to 15% in the case of a quadrature phase error of 25 degrees.

As to the EVM measurement result, FIGS. 26A to 26F show the EVM measurement results when the DP-16QAM signal was demodulated with the amplitude reduced ratio of the quadrature component with respect to the in-phase component being varied from 0% to 45%. Here, it is shown that conditions whose measurement results were not shown had a distortion degree large enough to exceed the application range of the received signal processing device and the demodulation process could not be executed. FIG. 26A shows the EVM measurement result in the case of a quadrature phase error of 0 degree, FIG. 26B shows that in the case of a quadrature phase error of 5 degrees, FIG. 26C shows that in the case of a quadrature phase error of 10 degrees, FIG. 26D shows that in the case of a quadrature phase error of 15 degrees, FIG. 26E shows that in the case of a quadrature phase error of 20 degrees, and FIG. 26F shows that in the case of a quadrature phase error of 25 degrees. In each diagram, the abscissa axis shows the amount of amplitude reduction of quadrature component represented in percentage in the case the amplitude of in-phase component was set to one. For example, the abscissa axis having a value of 20% means that the amplitude of quadrature component decreased by 20%, and the amplitude ratio between the in-phase component and quadrature component were 5:4.

As shown in FIGS. 26A to 26C, when the quadrature phase error was 10 degrees or less, the maximum allowance of the amount of amplitude attenuation of the quadrature component was 45%. As shown in FIGS. 26D to 26E, when the quadrature phase error was 15 degrees and 20 degrees, the maximum allowance of the amount of amplitude attenuation of the quadrature component was 40%. As shown in FIG. 26F, when the quadrature phase error was 10 degrees or less, the maximum allowance of the amount of amplitude attenuation of the quadrature component was 15%.

The maximum allowance is mainly determined by the central position (complex amplitude expected value) of each symbol of the distorted received signal. The distortion is allowed when the central position does not exceed a threshold in the case of using the ideal constellation as the reference signal. When the distortion of the transmission signal was the maximum allowance or less, the demodulation process by the received signal processing device according to Example normally operated, and the penalty of the EVM was small enough to be ignored.

Figure 26G:
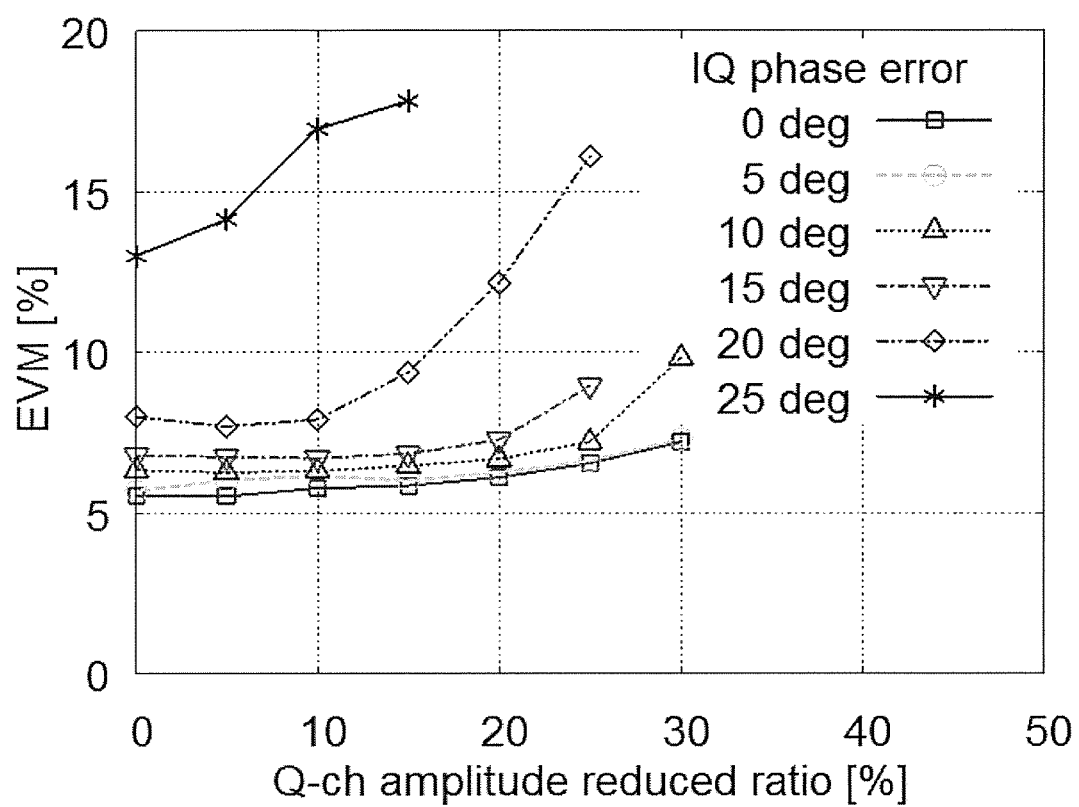
FIG. 26G is a diagram integrally showing the EVM measurement results when each DP-16QAM signal was demodulated with the amplitude reduced ratio of the quadrature component with respect to the in-phase component being varied from 0% to 45% and with the quadrature phase error being varied from 0 degree to 25 degrees in the case without correction of the reference signal.

On the contrary, measurement results in the case of performing the EVM measurement using the received signal processing device according to Reference Example is shown in FIG. 26G. That is, this FIG. 26G is a diagram integrally showing the EVM measurement results when the amplitude reduced ratio of the quadrature component with respect to the in-phase component was varied from 0% to 45% and each DP-16QAM signal was demodulated with the quadrature phase error being varied from 0 degree to 25 degrees in the case without correction of the reference signal.

As shown in this FIG. 26G, it can be understood that the amount of amplitude attenuation of the quadrature component and the maximum allowance of the quadrature phase error that can be regarded as practical were 20% and 15 degrees, respectively, and the practical range was significantly narrowed in comparison with the case of application of the present invention, and the EVM penalty occurred even when demodulation succeeded.

As described above, the received signal processing device including the actual decision section, the communication system, and the received signal processing method including the actual decision step can normally operate the decision-directed adaptive equalizer and the section of calculating the amount of phase correction and can receive the signal without reducing the signal quality even in the case where the transmission signal has a distortion. Consequently, the device, system and method can be widely used in the communication field. In particular, application to the optical fiber communication field can accurately estimate the frequency and phase of the carrier even for the QAM signal with a large number of modulation levels, and perform the signal demodulating process.

REFERENCE SIGNS LIST

1 Separation and output section
2 A priori state estimation section
3 A priori estimation phase calculation section
$4_1$, $4_2$, $4_N$ Multiplier
$5_1$, $5_2$, $5_N$ Decision section
6 Error estimation section
7 A posteriori state estimation section
8 A posteriori carrier-phase calculation section
$9_1$, $9_2$, $9_N$ Multiplier
10 Feedback processing section
100 Received signal processing device (carrier recovery unit)
101 Laser diode (LD)
102 IQ modulator (IQM)
103 Arbitrary waveform generator (AWG)
104 Variable optical attenuator (VOA)
105 Optical amplifier
106 Band-pass filter (BPF)
107 Coherent receiver
108 Real-time oscilloscope
109 Digital signal processor (DSP)
110 Optical spectrum analyzer (OSA)
201 Laser diode (LD)
202 IQ modulator (IQM)
203 Arbitrary waveform generator (AWG)
204 Polarization-multiplexing emulator
205 Variable optical attenuator (VOA)
206 Optical amplifier
207 Band-pass filter (BPF)
208 Coherent receiver
209 Real-time oscilloscope
210 Digital signal processor (DSP)
211 Optical spectrum analyzer (OSA)
230 Digital phase locked loop (DPLL)
231 Phase error operation processing section
232 Phase difference calculation section
233 Loop filter section
234 Numerically controlled oscillator
235 Phase correcting section
250 Adaptive equalizer
251 Decision element
252 Error signal calculation section and tap coefficient control section
270 Reference signal updating section
200 Received signal processing device including actual decision section
300, 310, 320 Received signal processing device

The invention claimed is:

1. A received signal processing device that regards, as one process, phase compensation for one separated symbol group acquired by separating every certain number of symbols of a modulated received signal and making the symbols form a block, and sequentially performs the process multiple times according to the number of the separated symbol group, the device comprising: a carrier recovery unit that includes:
- a separation and output section that temporally separates the symbols input into the block in a constant time interval, for every constant number of symbols to obtain the separated symbol group, and outputs the group in a sequence of the separated symbols constituting the separated symbol group;
- an a priori state estimation section that obtains an intra-block a priori estimation frequency and an intra-block a priori estimation central phase, as a priori estimates that are estimates of values processed $k^{th}$ time, from values processed $(k-1)^{th}$ time of one intra-block frequency determined based on phase variation of each of the separated symbols with respect to time, and one intra-block central phase determined as a temporal center of each phase of each of the separated symbols;
- a provisional compensation section that calculates an a priori estimation phase of each of the separated symbols from the a priori estimate, and provisionally compensates the phase of each of the separated symbols based on the a priori estimation phase;
- a decision section that regards, as a symbol before decision, each of the separated symbols whose phase has been provisionally compensated, performs decision for the symbol before decision based on a reference signal set according to a modulation scheme of the received signal, and obtains a symbol after decision that coincides with a reference point of the reference signal;
- an error estimation section that calculates a frequency error between an observed value of the intra-block frequency and the intra-block a priori estimation frequency which are determined based on the symbol before decision and the symbol after decision, and calculates a phase error between an observed value of the intra-block central phase and the intra-block a priori estimation central phase which are determined based on the symbol before decision and the symbol after decision;
- an a posteriori state estimation section that corrects the a priori estimates based on the frequency error and the phase error, and obtains an intra-block a posteriori estimation frequency and an intra-block a posteriori estimation central phase as a posteriori estimates obtained by estimating most likely values processed $k^{th}$ time that are of the intra-block frequency and the intra-block central phase;
- a compensation section that calculates an a posteriori estimation phase of each of the separated symbols from the a posteriori estimate, and actually compensates the phase of each of the separated symbols based on the a posteriori estimation phase; and
- a feedback processing section that performs a feedback process so that the a priori state estimation section can adopt the a posteriori estimates as the values processed $(k-1)^{th}$ time of the intra-block frequency and the intra-block central phase, and obtains the a priori estimates for the separated symbol group in the next phase compensation.

2. The received signal processing device according to claim 1, wherein the number of symbols of the separated symbol group obtained in the separation and output section is 2 to 1,024.

3. The received signal processing device according to claim 1, wherein the error estimation section calculates the frequency error and the phase error through maximum likelihood estimation.

4. The received signal processing device according to claim 1, wherein the a posteriori state estimation section includes a Kalman filter that outputs the a posteriori state vector as the a posteriori estimate and the a posteriori error covariance matrix where the a priori estimate and the value of the a priori error covariance matrix have been corrected, based on an input of the a priori error covariance matrix for controlling the frequency error, the phase error, the a priori state vector as the a priori estimate, and a gain, and the feedback processing section performs the feedback process so as to input the a posteriori estimate and the a posteriori error covariance matrix into the a priori state estimation section to allow the a priori state estimation section to output, to the Kalman filter, these items as the a priori estimate and the a priori error covariance matrix for the next phase compensation.

5. The received signal processing device according claim 1, further comprising an actual decision section that includes:
- a decision element that decides a reference point having a shortest Euclidean distance on a complex plane among multiple reference points constituting a reference signal determined according to a modulation scheme for digital modulation with respect to one received symbol of a digitally modulated received signal output from the carrier recovery unit; and
- a reference signal update section that corrects a position of the decided reference point so as to approach a position of the received symbol, based on a following expression [1], and updates the reference point of the reference signal used in the decision element to the corrected reference point, $$r_{n+1} = r_n + \mu(x_n - r_n) \quad [1]$$

where in the expression [1], n denotes the number of updating the reference point, $r_n$ denotes a two-dimensional vector representing the position of the reference point on the complex plane subjected to an n-th updating, $x_n$ denotes a two-dimensional vector representing the position of the received symbol on the complex plane subjected to the n-th updating, μ represents an infinitesimal numerical value that is $10^{-10}$ or more and 0.1 or less, and $r_{n+1}$ denotes a two-dimensional vector representing the position of the corrected reference point on the complex plane.

6. The received signal processing device according to claim 5, further comprising a section of calculating the amount of phase correction that adopts, as a control signal, the phase difference between the received signal and the decision signal that is a decision result of the decision element based on the reference signal updated by the reference signal update section with respect to the received signal, and calculates the amount of phase correction according to the phase variation of the received signal occurring owing to the fluctuation of the frequency difference between the carrier frequency of the received signal and the frequency of a local oscillator used in the receiver.

7. The received signal processing device according to claim 5, further comprising an adaptive equalizer that adopts, as the error signal, the difference between the received signal whose noise component has been filtered out according to a tap coefficient and the decision signal that is a decision result of the decision element based on the reference signal updated by the reference signal update section with respect to the received signal, controls the tap coefficient so that the error signal can have a minimum intensity, and performs the equalization process for the subsequent received signal.

8. The received signal processing device according to claim 7, wherein the adaptive equalizer includes a polarization separation processing section that applies a polarization separation process to a polarization-multiplexed received signal.

9. A communication system comprising:
a receiver that includes the received signal processing device according to claim 5;
a transmitter that transmits a transmission signal to the receiver; and
a transmission path for transmitting the transmission signal transmitted from the transmitter, to the receiver, wherein the transmitter adopts, as the distortion of the transmission signal, information based on the difference between the received signal received by the receiver and the decision signal as the decision result by the decision element based on the reference signal updated by the reference signal update section, and performs a feedback process to achieve the posteriori state with no distortion.

10. A received signal processing method that regards, as one process, phase compensation for one separated symbol group acquired by separating every certain number of symbols of a modulated received signal and making the symbols form a block, and sequentially performs the process multiple times according to the number of the separated symbol group, the method comprising:
separating and outputting of temporally separating symbols input into the block in a constant time interval, for every constant number of the symbols to obtain the separated symbol group, and outputting the group in a sequence of the separated symbols constituting the separated symbol group;
a priori state estimating of obtaining an intra-block a priori estimation frequency and an intra-block a priori estimation central phase, as a priori estimates that are estimates of values processed $k^{th}$ time, from values processed $(k-1)^{th}$ time of one intra-block frequency determined based on phase variation of each of the separated symbols with respect to time, and one intra-block central phase determined as a temporal center of each phase of each of the separated symbols;
provisional compensating of calculating an a priori estimation phase of each of the separated symbols from the a priori estimate, and provisionally compensating the phase of each of the separated symbols based on the a priori estimation phase;
performing for each of the separated symbols whose phase has been provisionally compensated, based on a reference signal to a modulation scheme of the received signal, and obtaining a symbol after decision that coincides with a reference point of the reference signal;
an error estimation of calculating a frequency error between an observed value of the intra-block frequency and the intra-block a priori estimation frequency which are determined based on the symbol before decision and the symbol after decision, and calculating a phase error between an observed value of the intra-block central phase and the intra-block a priori estimation central phase which are determined based on the symbol before decision and the symbol after decision;
a posteriori state estimating of correcting the a priori estimates based on the frequency error and the phase error, and obtaining an intra-block a posteriori estimation frequency and an intra-block a posteriori estimation central phase as a posteriori estimates obtained by estimating most likely values processed $k^{th}$ time that are of the intra-block frequency and the intra-block central phase;
compensating of calculating an a posteriori estimation phase of each of the separated symbols from the a posteriori estimate, and actually compensating the phase of each of the separated symbols based on the a posteriori estimation phase; and
feedback processing of performing a feedback process so that the a priori state estimating can adopt the a posteriori estimates as the values processed $(k-1)^{th}$ time of the intra-block frequency and the intra-block central phase, and obtaining the a priori estimates for the separated symbol group in the next phase compensation.

11. The received signal processing method according to claim 10, wherein the number of symbols of the separated symbol group obtained in the separating and outputting is 2 to 1,024.

12. The received signal processing method according to claim 10, wherein the error estimating calculates the frequency error and the phase error through maximum likelihood estimation.

13. The received signal processing method according claim 10, wherein the a posteriori state estimating is executed by a Kalman filter that outputs the a posteriori state vector as the a posteriori estimate and the a posteriori error covariance matrix where the a priori estimate and the value of the a priori error covariance matrix have been corrected, based on an input of the a priori error covariance matrix for controlling the frequency error, the phase error, the a priori state vector as the a priori estimate, and a gain, and the feedback processing performs the feedback process so as to provide the a posteriori estimate and the a posteriori error covariance matrix for an execution section for the a priori state estimating to allow the a priori state estimating to provide the Kalman filter with these items as the a priori estimate and the a priori error covariance matrix for the next phase compensation.

14. The received signal processing method according to claim 10, further comprising:
deciding a reference point having a shortest Euclidean distance on a complex plane among multiple reference points constituting a reference signal determined according to a modulation scheme for digital modulation with respect to one received symbol of a digitally modulated received signal with an actually compensated phase; and
reference signal updating of correcting a position of the deciding reference point so as to approach a position of the received symbol, based on a following expression [1], and updates the reference point of the reference signal used in the deciding to the corrected reference point, $$r_{n+1} = r_n + \mu(x_n - r_n) \quad [1]$$

wherein in the expression [1], n denotes the number of updating the reference point, $r_n$ denotes a two-dimensional vector representing the position of the reference point on the complex plane subjected to the n-th updating, $x_n$ denotes a two-dimensional vector representing the position of the received symbol on the complex plane subjected to the n-th updating, μ represents an infinitesimal numerical value that is $10^{-10}$ or more and 0.1 or less, and $r_{n+1}$ denotes a two-dimensional vector representing the position of the corrected reference point on the complex plane.

15. The received signal processing method according to claim 14, further comprising calculating of the amount of phase correction that adopts, as a control signal, the phase difference between the received signal and the decision signal that is a decision result of the actual deciding based on the reference signal updated by the reference signal updating with respect to the received signal, and calculates the amount of phase correction according to the phase variation of the received signal occurring by a fluctuation of the frequency difference between the carrier frequency of the received signal and the frequency of a local oscillator used in the receiver.

16. The received signal processing method according to claim 14, further comprising adaptive equalizing of adopting, as the error signal, the difference between the received signal whose noise component has been filtered out according to a tap coefficient and the decision signal that is a decision result of the deciding based on the reference signal updated by the reference signal updating with respect to the received signal, controlling the tap coefficient so that the error signal can have a minimum intensity, and performing the equalization process for the subsequent received signal.

17. The received signal processing method according to claim 16, wherein the adaptive equalizing includes polarization separation processing of applying a polarization separation process to a polarization-multiplexed received signal.

\* \* \* \* \*